US008007266B2

(12) United States Patent
Parrinello et al.

(10) Patent No.: US 8,007,266 B2
(45) Date of Patent: Aug. 30, 2011

(54) COMPRESSION MOULDING APPARATUS

(75) Inventors: Fiorenzo Parrinello, Medicina (IT);
Zeno Zuffa, Borgo Tossignano (IT);
Maurizio Borgatti, Imola (IT);
Alessandro Balboni, Granarolo
Dell'Emilia (IT); Matteo Camerani,
Russi (IT); Mauro Battilani, Imola (IT);
Dario Beltrandi, Imola (IT)

(73) Assignee: Sacmi Cooperative Meccanici Imola Societa' Cooperativa, Imolo (BO) (IT)

( * ) Notice: Subject to any disclaimer, the term of this patent is extended or adjusted under 35 U.S.C. 154(b) by 1103 days.

(21) Appl. No.: 11/587,312

(22) PCT Filed: Apr. 22, 2005

(86) PCT No.: PCT/IB2005/001085
§ 371 (c)(1),
(2), (4) Date: Oct. 23, 2006

(87) PCT Pub. No.: WO2005/102641
PCT Pub. Date: Nov. 3, 2005

(65) Prior Publication Data
US 2007/0196531 A1 Aug. 23, 2007

(30) Foreign Application Priority Data

| Apr. 23, 2004 | (IT) | RE2004A0039 |
| Apr. 23, 2004 | (IT) | RE2004A0040 |
| Apr. 23, 2004 | (IT) | RE2004A0041 |
| Apr. 23, 2004 | (IT) | RE2004A0042 |
| Apr. 13, 2005 | (WO) | PCT/IB2005/000968 |
| Apr. 14, 2005 | (WO) | PCT/IB2005/000989 |
| Apr. 15, 2005 | (WO) | PCT/IB2005/001001 |
| Apr. 15, 2005 | (WO) | PCT/IB2005/001005 |

(51) Int. Cl.
*B29C 31/06* (2006.01)

(52) U.S. Cl. .................... 425/261; 425/297; 425/348 R; 425/809

(58) Field of Classification Search .................. 425/297, 425/348 R, 261, 809
See application file for complete search history.

(56) References Cited

U.S. PATENT DOCUMENTS

| 3,867,081 A | 2/1975 | Everett |
| 4,277,431 A | 7/1981 | Peller |
| 4,979,282 A * | 12/1990 | Alieri et al. .................. 29/527.1 |
| 5,088,915 A | 2/1992 | Korsch et al. |
| 5,807,592 A | 9/1998 | Alieri |
| 5,811,044 A | 9/1998 | Rote et al. |
| 5,863,571 A | 1/1999 | Santais et al. |

(Continued)

FOREIGN PATENT DOCUMENTS

DE 34 26 713 A1 1/1986

(Continued)

OTHER PUBLICATIONS

International Search Report of PCT/IB2005/001085, mailed Dec. 9, 2005.

(Continued)

*Primary Examiner* — Yogendra N Gupta
*Assistant Examiner* — Joseph Leyson
(74) *Attorney, Agent, or Firm* — Nixon & Vanderhye P.C.

(57) ABSTRACT

An apparatus comprises: forming means movable along a first path for compression moulding doses of plastics; a plurality of transfer means for transferring said doses to said forming means; a plurality of arm means, each arm means being associated with a corresponding transfer means for moving said transfer means along a second path having a portion substantially coinciding with a further portion of said first path.

37 Claims, 56 Drawing Sheets

U.S. PATENT DOCUMENTS

| | | |
|---|---|---|
| 6,349,838 B1 | 2/2002 | Saito et al. |
| 7,284,974 B2 * | 10/2007 | Pucci ........................ 425/126.1 |
| 7,510,386 B2 * | 3/2009 | Parrinello et al. .......... 425/126.1 |
| 2003/0066180 A1 * | 4/2003 | Bassi .............................. 29/430 |
| 2005/0031723 A1 * | 2/2005 | Zoppas .................... 425/348 R |
| 2010/0289171 A1 * | 11/2010 | Balboni et al. ................ 264/148 |

FOREIGN PATENT DOCUMENTS

| | | |
|---|---|---|
| DE | 196 54 350 A1 | 6/1998 |
| JP | 2000 108127 A | 4/2000 |
| JP | 2000 280248 A | 10/2000 |
| WO | WO 03/047831 | 6/2003 |
| WO | 2005/007378 A1 | 1/2005 |

OTHER PUBLICATIONS

Database WPI, Section Ch, Week 200513, Derwent Publications Ltd., AN 2005-122716, XP0023398300.

Australian Examiner's Report for co-pending Australian Application No. 2005235002, dated Aug. 27, 2009, 4 pages.

* cited by examiner

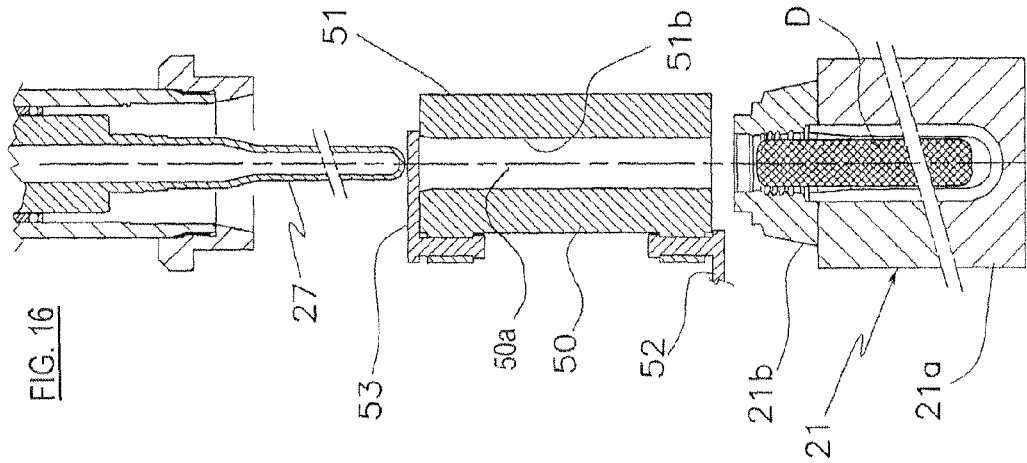
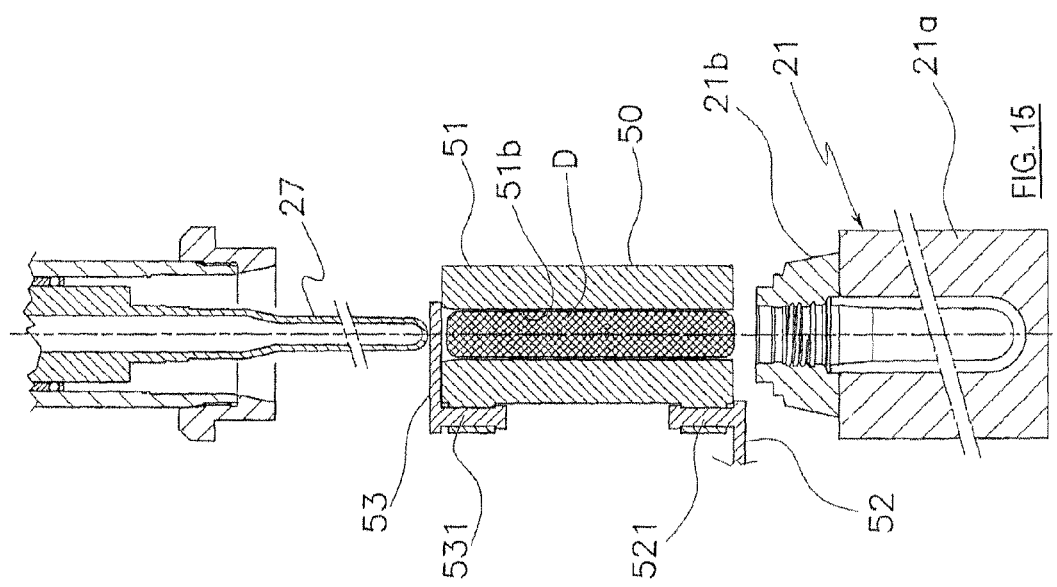
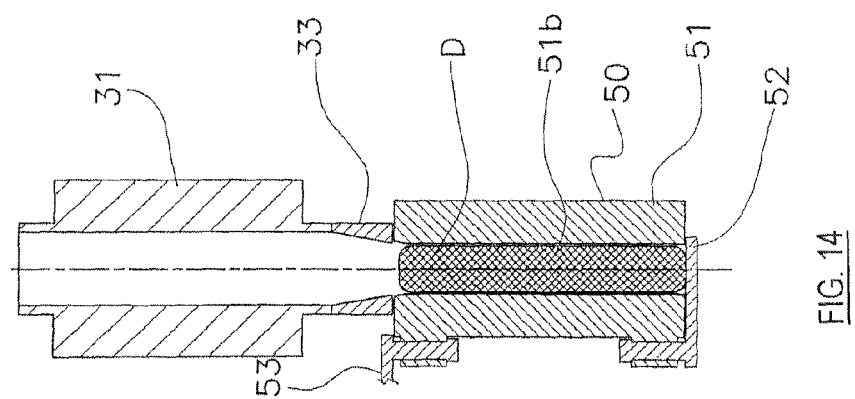

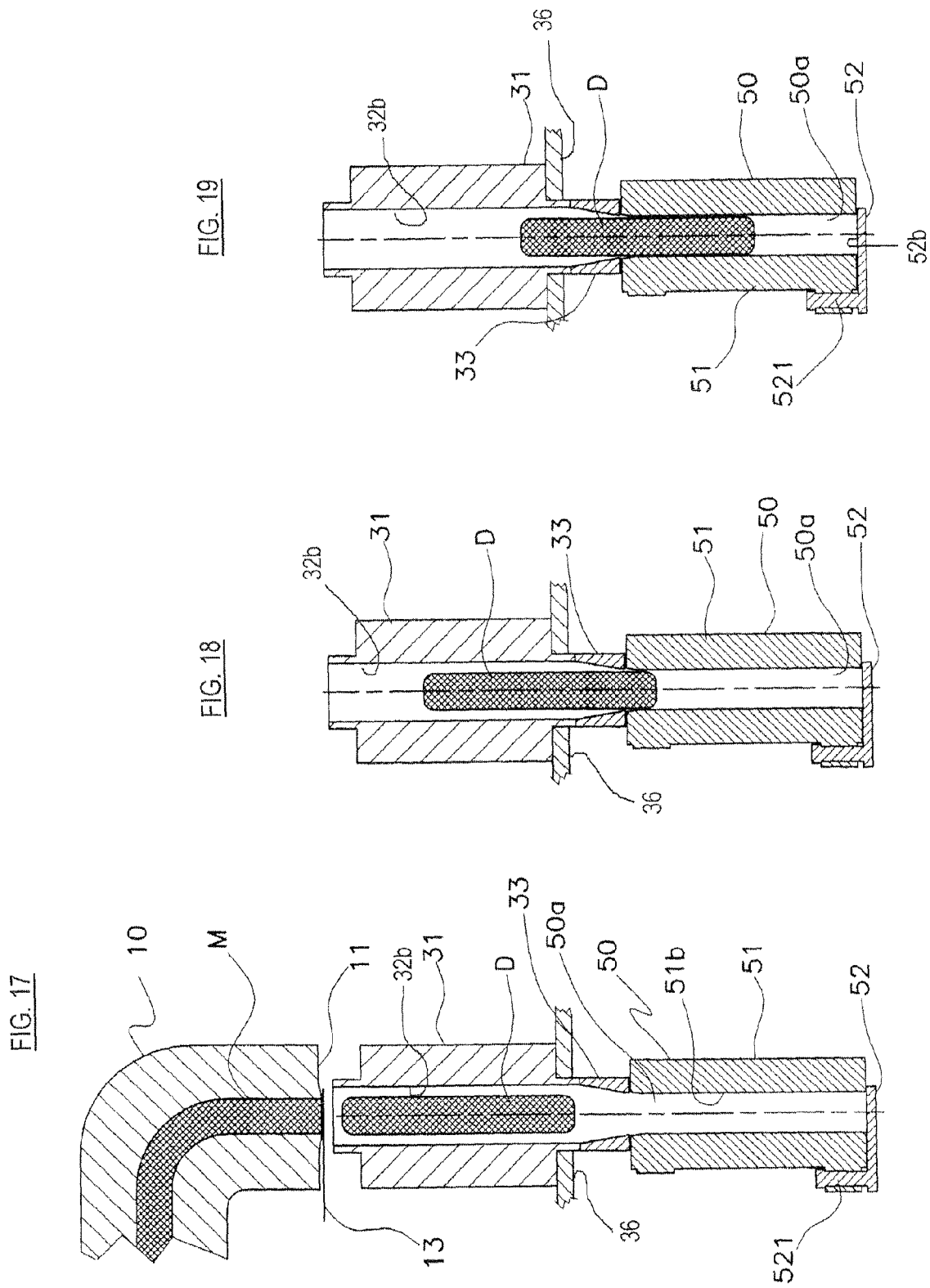

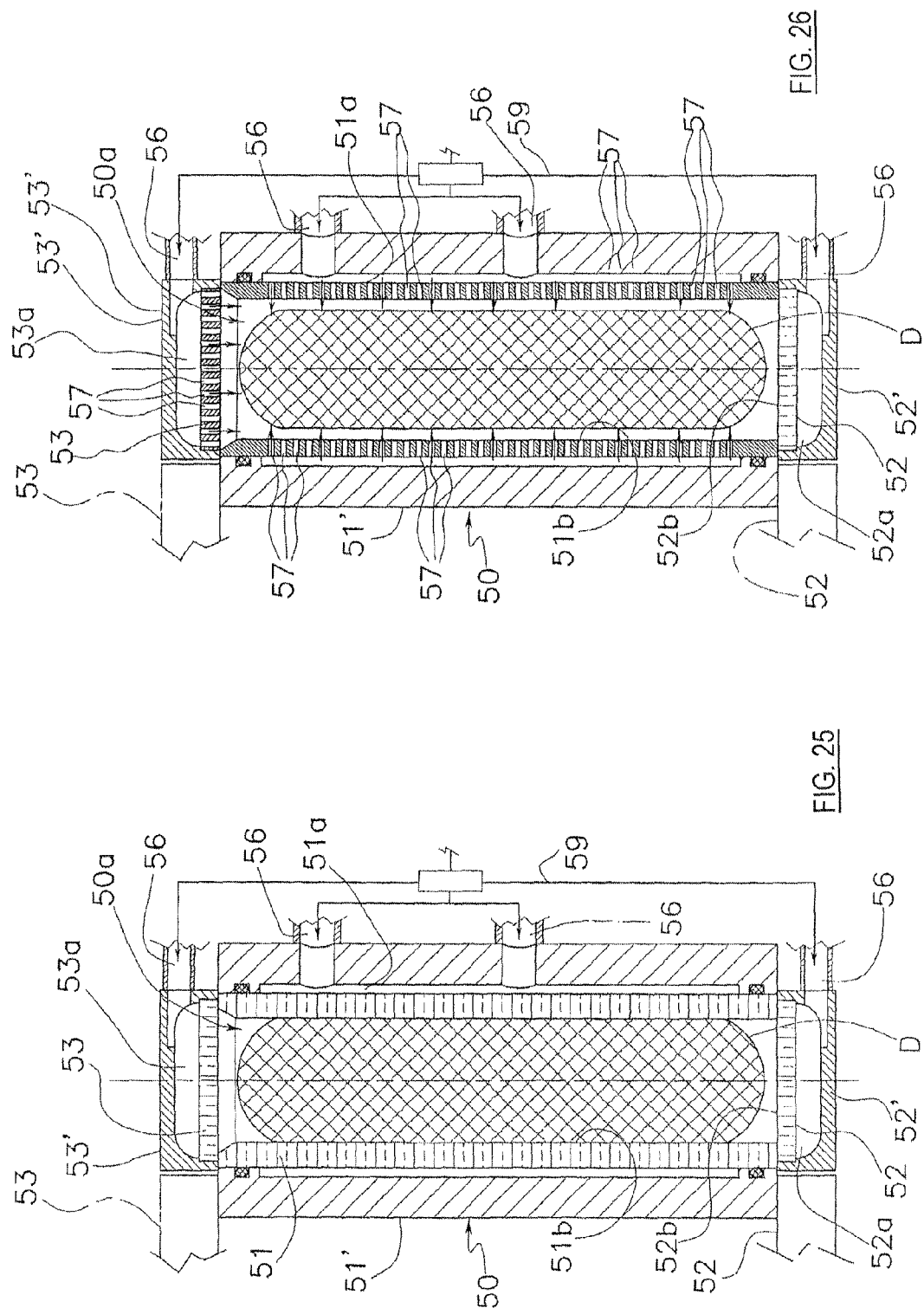

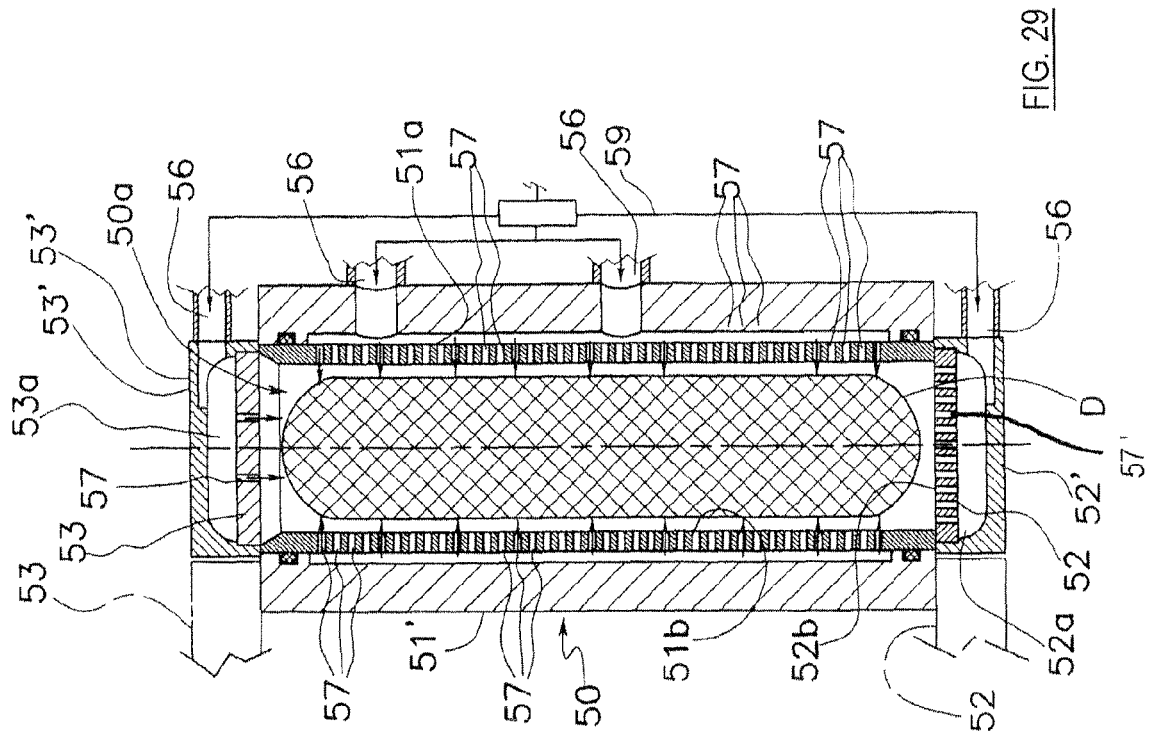
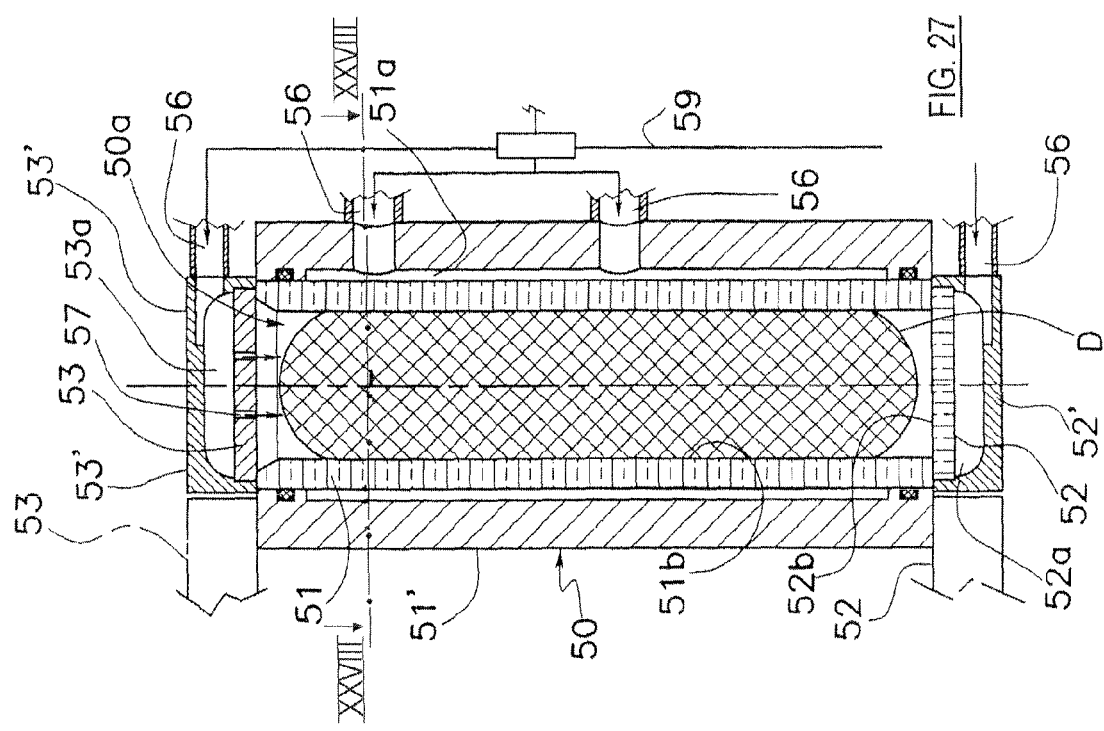

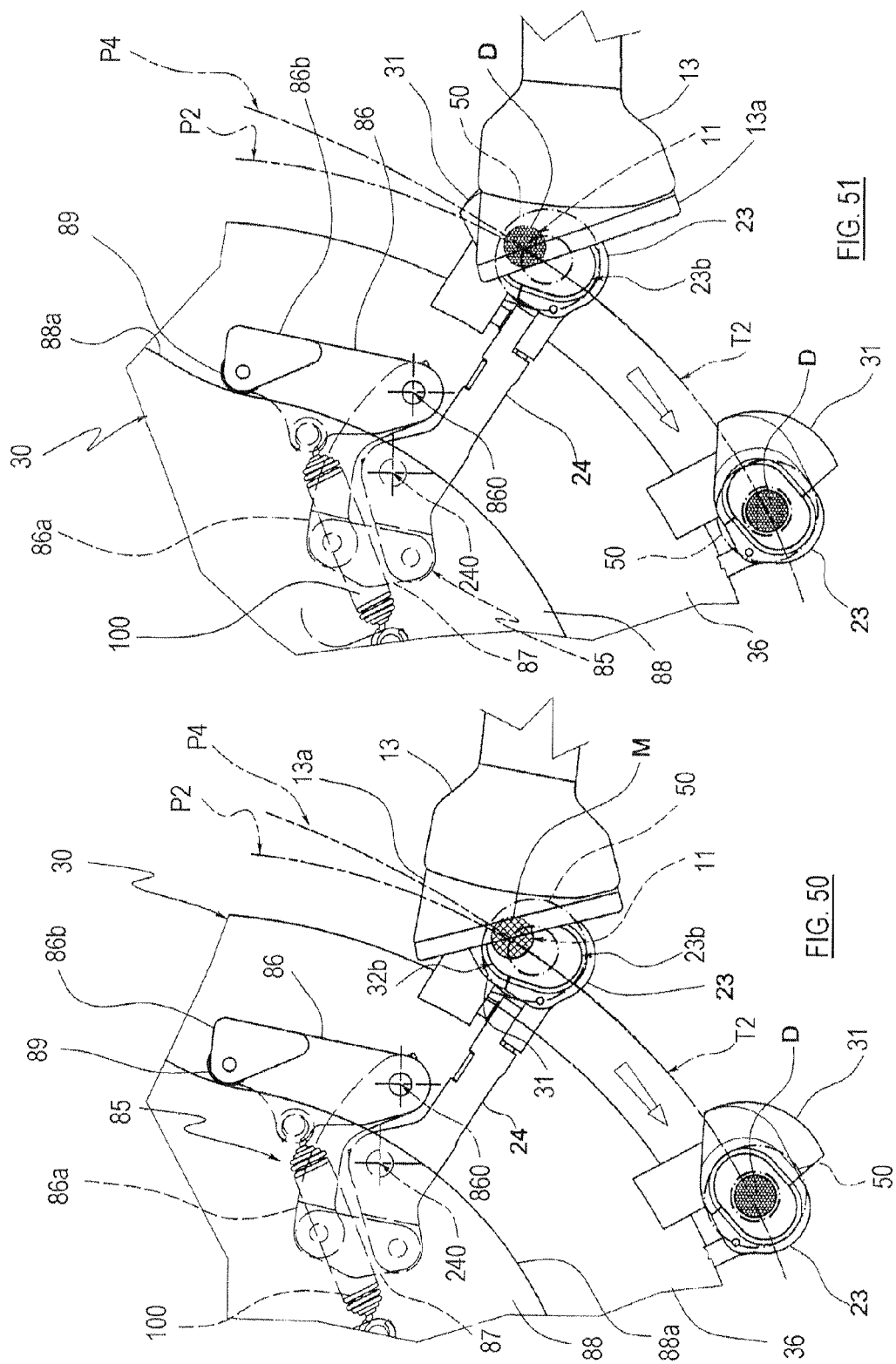

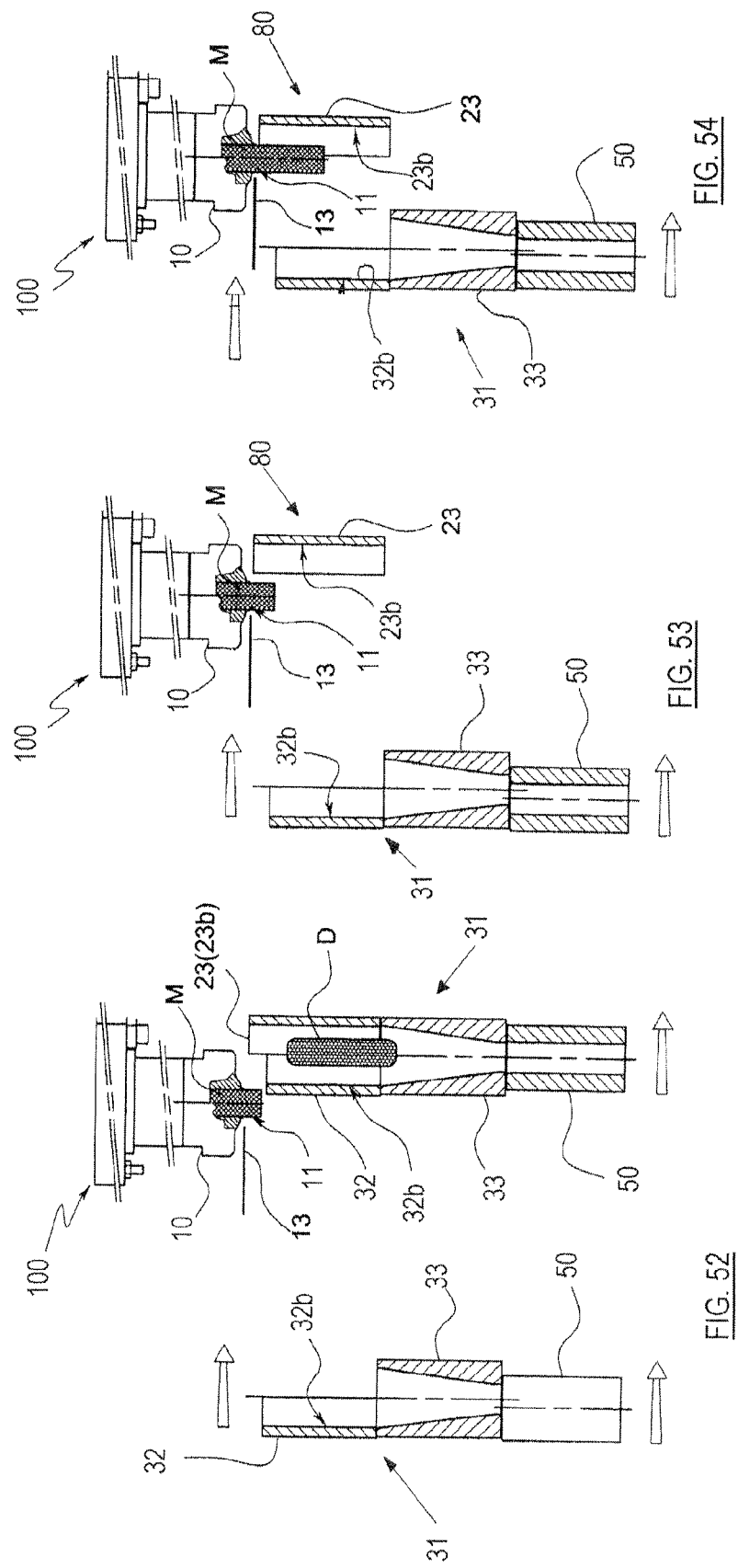

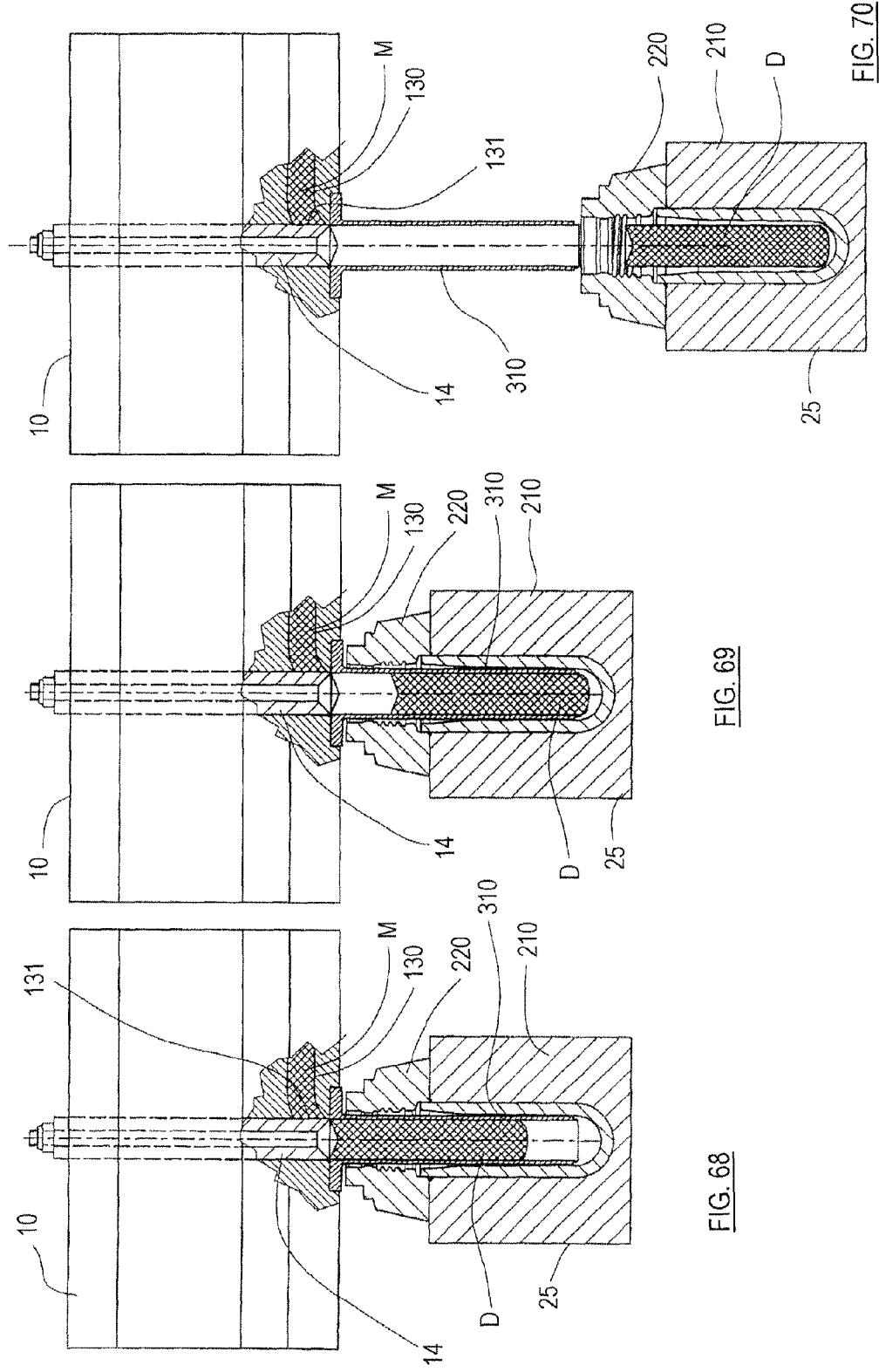

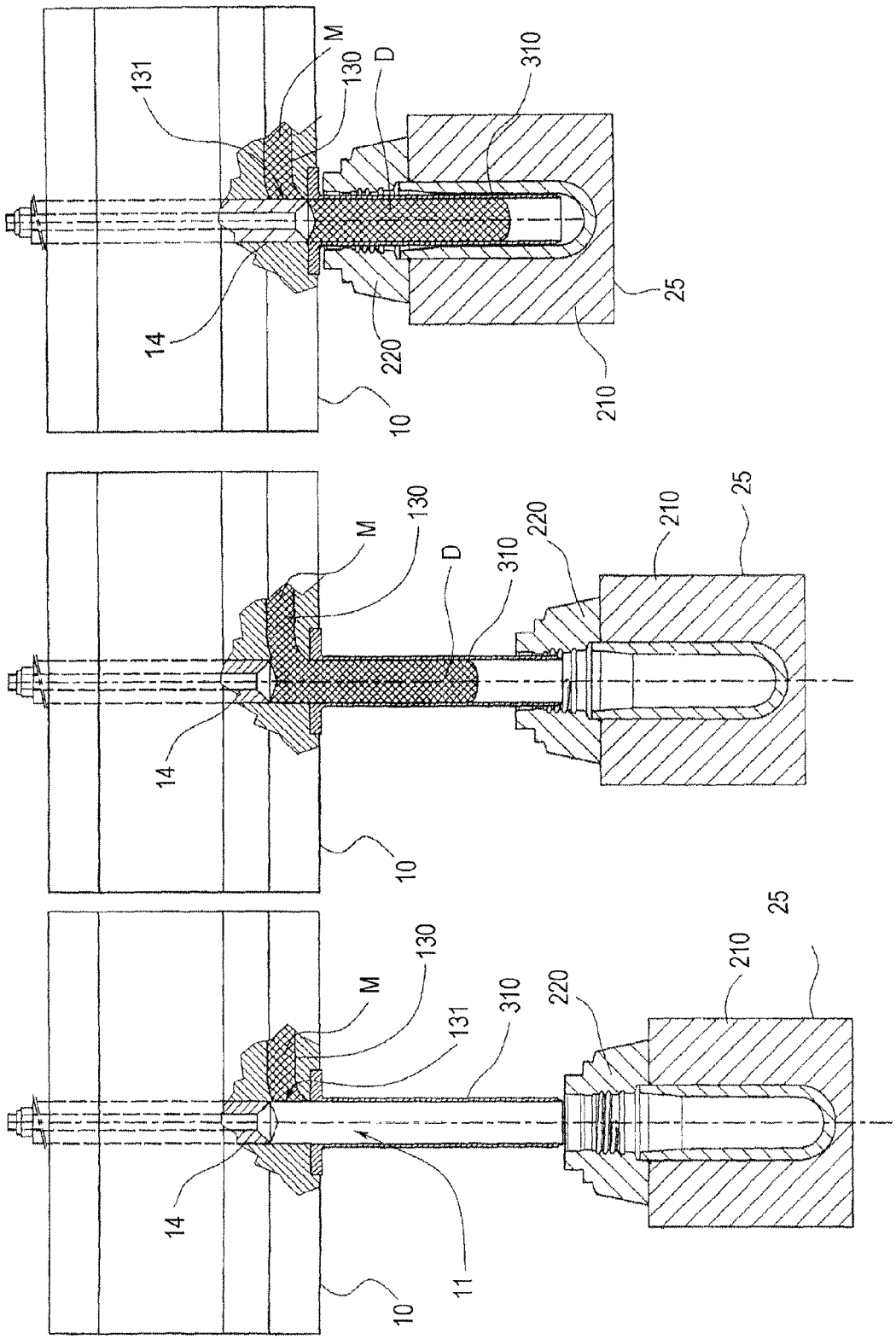

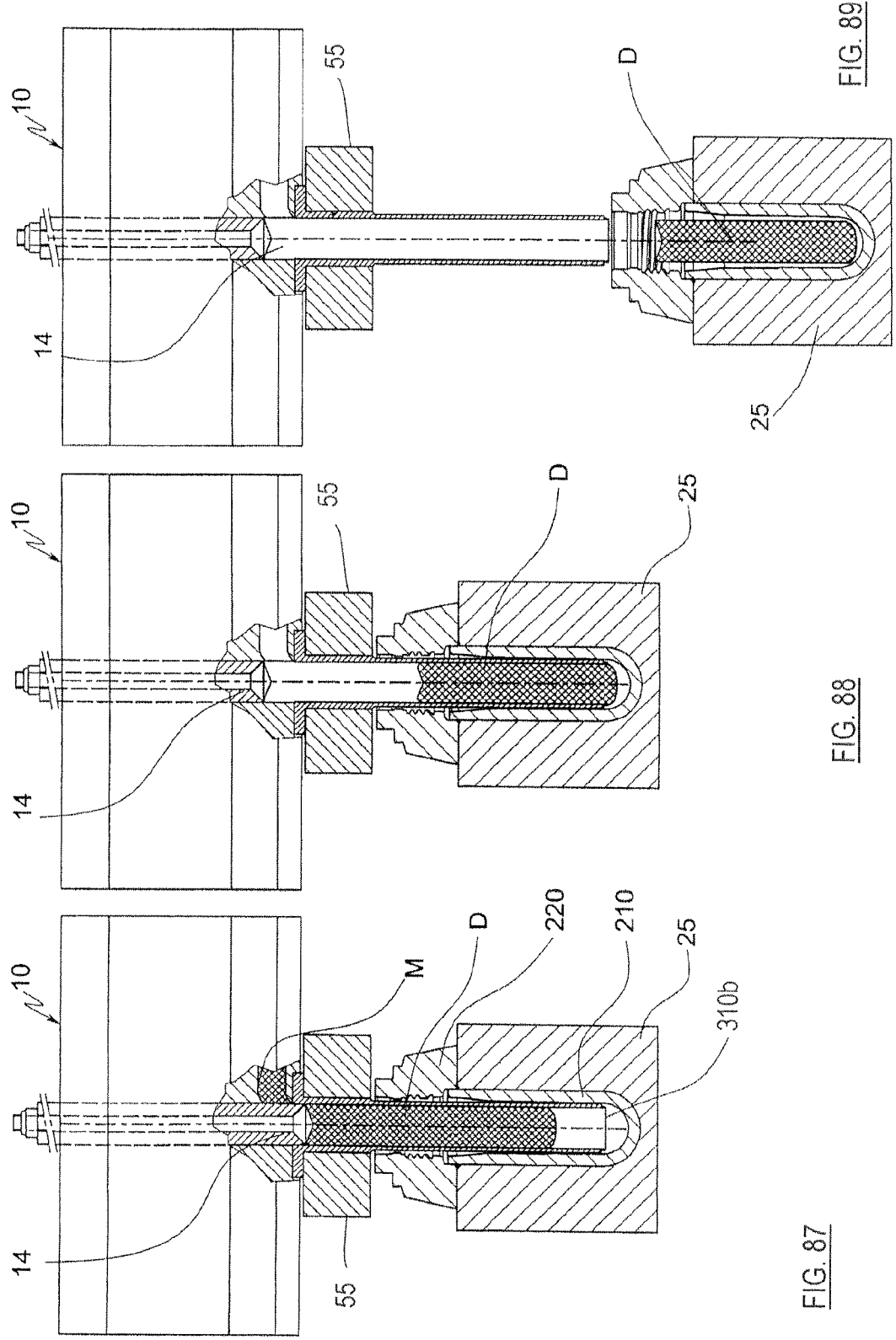

COMPRESSION MOULDING APPARATUS

This application is the US national phase of international application PCT/IB2005/001085, filed 22 Apr. 2005, which designated the U.S. and claims priority of IT RE2004A000039, filed 23 Apr. 2004; IT RE2004A000040, filed 23 Apr. 2004; IT RE2004A000041, filed 23 Apr. 2004; IT RE2004A000042, filed 23 Apr. 2004; PCT/IB2005/001001, filed 13 Apr. 2005; PCT/IB/2005/000968, filed 13 Apr. 2005; PCT/IB2005/000989, filed 14 Apr. 2005; and PCT/IB2005/001005, filed 15 Apr. 2005, the entire content of which is hereby incorporated by reference.

BACKGROUND OF TECHNOLOGY

The invention relates to a method and apparatuses for processing dosed quantities or doses of flowable material. In particular, the invention relates to a method and apparatuses to be used in the compression-moulding of dosed quantities of plastics, to obtain items such as preforms for containers, for example for bottles.

An aspect of the invention relates to a method and an apparatus for transferring or inserting dosed bodies in polymeric material in a more or less viscous liquid state dispensed by at least one dispensing port of polymeric material into the cavities of the mould of a moulding machine having a carousel that rotates with continuous motion, in compression-forming of items in polymeric material. Another aspect of the invention relates to a method and the corresponding means for handling bodies of polymeric material in a more or less viscous liquid state to be transferred to the mould cavities of a moulding machine, in compression-forming of plastics items.

Forming items by compression-moulding is achieved by moving a punch (the male element of a mould) relative to and inside of a hollow die (the female part of a mould). The punch is inserted through pressure inside the hollow die in which a dosed body of a more or less viscous liquid polymeric material has been deposited, in particular a thermoplastic resin. A particular application of the invention is for forming preforms intended for the subsequent manufacture (typically by stretch-blow moulding) of plastics bottles. Nevertheless, the applications may be different and varied.

The preforms for making bottles and the like usually comprise an upper neck provided with projections and a hollow body located below the neck, the hollow body being substantially smooth and axially elongated.

Typically, traditional moulding machines for manufacturing items in polymeric material by compression-forming comprise a carousel that carries a plurality of dies and a corresponding plurality of punches above. The carousel may rotate both continuously and intermittently.

The carousel rotates around a vertical axis and each die, during a revolution, receives a plastics body of a dosed quantity (dose) heated to the required temperature to make the plastics sufficiently fluid. The dose subsequently undergoes a pressing phase following the mutual approach (until closing of the mould) of the punch and the die. This phase is followed, after a given time, by the opening of the mould and the removal of the preform from the machine.

With the moulding machine an extruding device is associated that emits polymeric material in a more or less viscous liquid state. This material is divided into bodies of dosed quantity (doses) that are then transferred to the cavities of the dies of the machine.

If the dosed body (dose) of polymeric material has a relatively small mass, it is known to transfer it to the dies of the rotating machine by a transferring device having suitable removing members (so-called "hands") that move in succession along a circular path. Along this path, the removing members pick up the dose from a fixed dispensing outlet belonging to the extruder of the polymeric material and release it at the point in which the path is tangential to and superimposed on the path of the dies.

This release must occur in a very fast manner at the instant at which the removing member is superimposed on the die cavity and coaxial with it. This is practically possible only in the case of doses of relatively small mass, for example doses suitable for forming capsule-shaped caps to close usual plastic bottles for mineral water or other sparkling drinks.

If on the other hand items in polymeric material have to be formed that have a relatively high mass such as preforms in PET (polyethyleneterephthalate) that are currently used on the market to produce (through the known stretch-blow moulding operation) the usual plastic bottles, loading the dosed body of polymeric material inside the dies is a very complicated operation.

In fact, in this case it is not practically possible to transfer the doses from the removing members through the die cavities with an action that occurs in an almost instantaneous manner because the doses have a relatively great length and sufficient time is thus required to perform this transfer. This time is not available in the disclosed traditional transfer devices.

To overcome this drawback, a moulding machine has been proposed (patent application WO 03/047834) in which the doses are emitted by a dispensing device having a plurality of dispensing outlets that are movable in succession along a circular and horizontal path. The dies do not move along a simple circular path but have a good possibility of moving in a radial direction in relation to the carousel and can therefore follow for a certain arc the further circular path of the dose dispensing outlets, deviating from the traditional circular path. Thus, for a certain portion of the path (and therefore for a certain time) the dispensing outlet is located coaxially and above the cavities of the die and its motion coincides with the motion of the latter.

Nevertheless, a drawback of the solution disclosed in WO 03/047834 is the complexity ad the constructional cost of the corresponding moulding machine. The machines according to WO 03/047834 are in fact very complex, both for the usually very high number of dies and for the numerous operations that are performed and the relatively high speed at which it is desirable that they operate. Lastly, the dies require very precise positioning and making them movable in relation to the carousel therefore complicates their positioning.

Furthermore, in the proposed solution, based on the radial movement of the dies, it is not even possible to achieve, in the shared portion, correct equality of the movements from the dies and of the dispensing outlets, which would nevertheless be necessary. In fact, the peripheral speed of the die varies as its radial position varies whereas this does not occur for the dispensing outlets, the radial position of which is constant. As a result, in the said shared portion the dispensing outlets cannot keep themselves coaxial with the die cavities below and thus the transfer of the dose cannot be correct; in fact, if the diameter of the dose is near the minimum diameter of the cavity it is not even possible to carry out the transfer.

The drawbacks disclosed above are exacerbated by the fact that the means with which the operations of transfer of the doses is performed, differing in form and nature, inevitably has surfaces that come into contact with such polymeric bodies in a liquid viscous state.

A further drawback of the prior art arises because the polymeric material of the doses tends to adhere to the surfaces of the means with which it comes into contact due to its physical state (more or less viscous liquid state at a temperature that is usually above 200° C., when it is PET).

The adhesive effect disclosed above inevitably hinders the movement of the polymeric body, creating serious drawbacks, especially if it is provided that the body simply moves through gravity. For example, if the polymeric body has to flow due to gravity along a surface that accompanies it, its tendency to adhere to the surface may hamper movement to the extent that the provided operation is made impossible.

Or, if the doses are dropped into the die cavities, the doses can adhere to the walls of the cavities, especially if the cavities have a relatively narrow and deep shape. If this occurs, the doses are unable to be positioned in a correct manner inside the die cavities. If, for example, the dosed polymeric body is of a relatively high volume in relation to the volume of the cavity there is a serious danger that the polymeric body will protrude above the cavity to such an extent that it is not possible to close the die during the phase of compression by the punch.

In particular during forming of preforms for bottles with a capacity of not less than a litre, the die cavity has a relatively narrow and elongated shape. There is therefore a relatively high risk that the descending dose will come into contact with the side wall of the cavity before reaching the bottom.

The drawbacks disclosed above of the adhesion of the dose to the surfaces with which it comes into contact are greatly exacerbated by the fact that the descent of the dose occurs whilst the die moves continuously along a circular path, and furthermore moves at a relatively high speed. In fact, owing to the centrifugal effect to which it is subjected, the polymeric body is pushed to the side wall of the cavity.

It should be noted that when doses of relatively small mass are transferred to the die cavity, the doses may undergo rolling or rotations, as they are provided with a substantially spherical form. When on the other hand the doses have a relatively high mass and a relatively complex shape, as occurs in the forming of PET preforms, it is normally necessary that the doses are normally placed in the mould cavity with their longitudinal axis arranged according to a preset orientation.

Furthermore, between the dose and the surfaces with which it comes into contact, an effective heat transmission occurs that is localised in the contact zone that consequently alters the regular and substantially uniform distribution of the thermal values of the polymeric body. In particular, excessive, albeit localised, temperature drops can easily be created that are such as to produce microcrystallisation or microsolidification of the polymeric material. Nucleuses of irregularity in the polymeric material are thus generated that may subsequently produce unevenness and defects in the final product.

Another drawback of the prior art is linked to the manner with which the removing members of the transferring device pick up the dose from the emission zone of the dispensing outlet.

Each removing member, is in fact generally provided with a concave contact surface, open on one side, suitable for impacting the dose immediately after it has been released by the dispensing outlet, pushing it with a horizontal component and guiding it in its descent to transfer it to the die cavity. Owing to the impact between the dose and the removing member, a rebound phenomenon of the dose on the contact surface nevertheless occurs. The dose may consequently be projected far from the removing member, or may, on the concave surface of the removing member, take up a position that is unsuitable for the subsequent descent.

In addition, cutting means suitable for cutting the outflow of polymeric material exiting from the dispensing outlet is normally associated with the transfer means, in such a way as to separate the dose in the instant immediately before the contact with the removing member. The cutting means may for example comprise a plurality of blades, each of which is fixed to a respective handling member.

During the cutting action, the blades subject the dose to a thrust with a horizontal component that, similarly to the aforementioned impact with the contact surface, can project the dose far away from the removing member, or cause poor positioning of the dose.

Also this defect is particularly significant if the dose has a significant mass and in particular has a form that is relatively very elongated.

A further defect of the prior art is that the known cutting means have rather a complicated structure. In fact, a number of blades has to be provided that is the same as the number of removing members, and each blade has to be correctly fitted to the removing member and sharpened or replaced when it is excessively worn.

SUMMARY OF TECHNOLOGY

An object of the invention is to improve the apparatuses and the methods to process dosed quantities of flowable material, particularly in compression-moulding of plastics.

Another object is to provide an apparatus that enables items to be transferred, for example dosed quantities of plastics, to operating means suitable for processing said items, for example forming means, correctly positioning the items in the operating means, even when such items have a relatively high volume and a relatively complicated form.

A further object is to provide an apparatus that ensures sufficient time to transfer items, for example dosed quantities of plastics having great mass and a relatively complicated form, inside operating means suitable for processing said items, for example forming means.

Another object is to provide an apparatus that is able to handle dosed quantities of flowable material, particularly plastics, without the dosed quantities adhering excessively to the interaction surfaces of the apparatus with which they come into contact.

Another object is to provide an apparatus that is able to handle dosed quantities of flowable material, particularly plastics, in which the dosed quantities do not cool excessively and in an uneven manner because of the contact with interaction surfaces of the apparatus.

A still further object is to supply an apparatus provided with cutting means for separating dosed quantities of flowable material from a dispensing device, in which said cutting means is provided with a relatively simple structure.

A further object is to supply an apparatus comprising a dispensing device for dispensing dosed quantities of flowable material and cutting means for separating the dosed quantities from the dispensing device, in which the cutting means can cleanly and efficiently cut the dosed quantities and the latter are correctly received by transfer means.

In a first aspect of the invention, there is provided an apparatus comprising:
  forming means movable along a first path for compression moulding doses of plastics;
  a plurality of transfer means for transferring said doses to said forming means;
  a plurality of arm means, each arm means being associated with a corresponding transfer means for moving said transfer means along a second path having a portion substantially coinciding with a further portion of said first path.

In a second aspect of the invention, there is provided an apparatus comprising:

operating means movable along a first path for interacting with objects;

transfer means for transferring said objects to said operating means;

arm means for moving said transfer means along a second path having a portion substantially coinciding with a further portion of said first path, characterised in that said arm means comprises first arm means pivotally connected to second arm means associated with said transfer means.

In a third aspect of the invention, there is provided an apparatus comprising:

operating means movable along a first path for interacting with objects;

a plurality of transfer means for transferring said objects to said driving means;

a plurality of arm means supported by support means, each arm means being associated with a corresponding transfer means for moving said transfer means along a second path having a portion substantially coinciding with a further portion of said first path;

characterised in that the arm means of said plurality of arm means is movable with only one degree of freedom in relation to said support means.

More in detail, the invention comprises a rotating transferring machine having a plurality of transfer chambers continuously rotating, each chamber being suitable for containing a polymeric body and subsequently transferring it to a die cavity. The chambers can have a side surface which is closed and such as to contain all the polymeric body, or can have a partially open side surface and the body can be contained only partially inside the chamber. The containing action shifts the polymeric body with a movement having a horizontal component.

The transferring machine comprises suitable moving means suitable for successively moving the transfer chambers along a same path in such a way that this path has a portion matching the path of the dies, during which each transfer chamber is positioned coaxial with and above the cavity of a die and its movement matches the movement of the latter, said transferring to the die cavity being carried out on this portion. The apparatus furthermore comprises means suitable for transferring the single polymeric bodies from the dispensing outlet to the transfer chambers.

Owing to the first, second and third aspect of the invention, a relatively long path is made available and therefore a correspondingly long time to transfer the items or the doses from the transfer means to the forming means or to the operating means.

In particular, in compression-moulding of doses of plastics, it is possible to make an effective and correct transfer of the doses inside the cavities of the forming means, starting from a dispensing device of the polymeric material, even if the doses have a relatively high mass, as occurs in doses for forming PET preforms used to produce the usual plastics bottles for mineral water or other sparkling drinks.

It is furthermore possible to achieve more precise positioning of doses of plastics, which enable compression-moulding technology to be improved for all applications. Furthermore, when the forming means comprises a plurality of punches interacting with respective dies, the distance between the punches and the dies in the zone in which the doses are inserted into the dies is relatively small, being substantially the same as the length of a dose, which enables the speed of the forming cycle to be increased.

In an embodiment the transferring machine comprises a support rotating in a synchronized manner with a moulding machine on which the forming means is mounted, and each transfer chamber is carried by a mechanism rotated by the rotating support. The mechanism can have two degrees of freedom in relation to the support. Suitable fixing means cause movement of the mechanism in relation to the angular position from the rotating support in such a way as to univocally define the movement and the path of the transfer chamber during each revolution of the support. This is achieved in such a way that there is the aforementioned matching portion of paths.

In a fourth aspect of the invention, there is provided an apparatus comprising:

forming means for compression moulding doses of plastics;

transfer means movable along a looped path for transferring said doses to said forming means;

characterised in that it comprises further transfer means movable along a further looped path for transferring said doses to said transfer means.

In a fifth aspect of the invention, there is provided an apparatus comprising:

transfer means for transferring a dosed quantity of flowable material from a removal position to a delivery position;

receiving means for receiving said dosed quantity in said delivery position, said receiving means being such as to define a shape for said dosed quantity;

characterised in that said transfer means comprises shape conditioning means such as to obtain from said dosed quantity a precursor of said shape.

In a sixth aspect of the invention, there is provided a method comprising:

transferring a dosed quantity of flowable material from a removal position to a delivery position;

defining a shape for said dosed quantity after receiving said dosed quantity in said delivery position;

characterised in that during said transferring there is provided shaping said dosed quantity for obtaining a precursor of said shape from said dosed quantity.

In an embodiment, the shape and thus also the dimensions of the dosed quantity of flowable material, which may in particular be plastics, are geometrically conditioned inside the internal cavity of the transfer chambers, in such a way that the dosed quantity can be subsequently inserted correctly into the die cavity.

In particular, the transfer chamber is provided with an internal cavity laterally delimited by a cylindrical side surface, the transverse dimension of which is not greater than the minimum transverse dimension of the inlet zone into the die cavity.

The dosed quantity is inserted into the transfer chamber with a shape that may be different from the shape of the internal cavity of the chamber and is physically conditioned by the transfer chamber. In other words, the dosed quantity assumes a shape that tends to the shape of the side surface delimiting the internal cavity of the transfer chamber. The dosed quantity tends to conform to the shape of the internal cavity of the transfer chamber in a manner depending on the viscosity of the material (which in turn is a function of the intrinsic features of the polymer, particularly of the type of polymer and of its molecular weight), on the temperature and on the time spent in the transfer chamber.

Furthermore, in one version it is provided to "model" the dosed quantity in such a way as to give the latter a preset shape, by using a fluid delivered inside the transfer chamber.

When the dosed quantity is subsequently released inside the die cavity, the dosed quantity is shaped in such a way that it can penetrate the cavity without coming into contact, during its descent, with the side walls of the die cavity. Even if contact between the dosed quantity and the side walls of the die cavity occurs, this contact is not such as to hamper the descent of the dosed quantity and the correct positioning of the latter inside the die.

This is useful especially in the case in which the die cavity is relatively deep or narrow in relation to the mass of dosed quantity, and/or the operating speeds of the apparatus are relatively high.

Furthermore, owing to the shape conditioning means, the passage of the dosed quantity from the transfer chamber to the die cavity can be achieved so fast that the matching portion of the paths according to the first three aspects of the invention may not be necessary. In this matching portion, each transfer chamber was positioned coaxial with and above a die cavity.

Means can furthermore be provided that is suitable for completely or partially reducing adhesion between the dosed quantity and the internal contact surface of the transfer chamber.

In general, owing to the fifth and sixth aspect of the invention, transfer of the dosed quantity from the transfer means to the forming means is made very fast and regular. Furthermore, contact between the means that handles the dosed quantity and the dosed quantity itself is avoided or at leas limited. This reduces the risk that the dosed quantity sticks to the interaction surfaces with which it comes into contact and that the dosed quantity arranges itself in undesirable positions.

The shape conditioning means furthermore enables the shape of the dosed quantity to be made suitable for optimal moulding, which enables an item having the best physical and chemical features to be obtained.

It was for example found that a shape of the dosed quantity such as to make the latter conform as much as possible to the cavity of the mould in which it is inserted produces the best results in terms of the quality of the obtained item. If, on the other hand, a dosed quantity has a shape that is very different from that of the cavity in which it is inserted, during compression-moulding the dosed quantity suffers harmful localised deformation and an item of lesser physical and chemical quality is obtained.

In a seventh aspect of the invention, there is provided an apparatus comprising transfer means for transferring a dosed quantity of flowable material from a removal position to a delivery position, characterised in that anti-adhesion means is associated with said transfer means for preventing said dosed quantity from adhering significantly to said transfer means.

Owing to the seventh aspect of the invention, contact between the transfer means and the dosed quantity is avoided or at least minimised, with the consequence that the disclosed drawbacks are overcome and the use of means and methods that are otherwise not practicable is made possible.

In particular, more precise positioning of the dosed quantity is achieved, which in particular enables compression-moulding technology for all applications to be improved.

In an embodiment, the anti-adhesion means comprises supply means to form a layer of fluid interposed between interaction surfaces of the transfer means with which the dosed quantity comes into contact. The layer of fluid has features that are such as to completely or partially reduce the adhesion between the dosed quantity and the interaction surface.

In particular, the fluid is a gas, particularly air. Nevertheless, it is also possible to use a different gas, for example nitrogen, carbon dioxide or other.

The layer of fluid is produced by sending the fluid through the portion of the transfer means in which the interaction surface is placed in such a way that the fluid comes out from the surface and is distributed over this surface. For this purpose, the portion of the transfer means in which the interaction surface is placed has distributed passages through which the fluid is supplied and made to come out. These passages are relatively small and numerous and are distributed on the interaction surface.

In an embodiment, the interaction surface is placed on a wall made of a material that is so porous as to permit the passage of fluid through it. Feeding means is applied to the porous wall, the feeding means being suitable for sending fluid in such a way that the fluid traverses the porous wall when exiting at the interaction surface.

Alternatively to the porous wall, walls can be provided in non-porous material on which numerous small holes are made such as to enable the passage of fluid through them, said holes being distributed on the zone where the contact with the dosed quantity occurs. For example, these holes may have helicoidal distribution to achieve maximum possible cover of the interaction surface.

According to an alternative, the porous wall is replaced by a wall made of a plurality of elements brought together so that they give rise to a plurality of relatively thin separation lines formed and distributed in a suitable manner on the interaction surface. Through these openings the passage of the fluid takes place.

It has been found that by interposing a layer of fluid with sufficient pressure and flow rate values (that vary from one application to another, and are any way testable with relative facility) between the contact surface and the polymeric body, it is possible to completely or at least partially reduce the effect of adhesion of the dosed quantity to the extent that, in practice, the latter does not stick and does not adhere to the interaction surface.

In fact, by forming a layer of fluid with suitable flow rate and pressure values, which are generally relatively low (one or a few bars suffice) contact between the dosed quantity and the interaction surface is in fact avoided. If the contact nevertheless occurs, it is localised and of limited duration. In this connection, it has been experimentally found that limiting the time of contact between the dosed quantity and the interaction surface to relatively low values has a correspondingly limited macroscopic adhesion effect; if the adhesion time is just a few microseconds, the macroscopic adhesion effect is practically zero.

This can be explained by the fact that in order to obtain an adhesion effect, a contact time is required that is not less than a value (reaction time) so that the chemical-physical adhesion forces can take effect. This reaction time is a function of the material, the temperature and of local pressure. The fluid continuously interrupts this process, so that the same adhesion does not take place; or even completely avoids all contact.

The effect disclosed above produced by the layer of fluid is further accentuated by thermally conditioning the fluid sent between the dosed quantity and the interaction surface, in such a way as to lower the temperature of the surface of the dosed quantity and/or of the interaction surface.

The cooled fluid, by passing through the wall, or simply touching both the interaction surface and the surface of the dosed quantity, diminishes at least superficially the temperature thereof, thus increasing the viscosity of the dosed quantity, which diminishes the adhesion of the flowable material. In fact, it has been discovered that if contact time increases (from microseconds to milliseconds) so the wall temperature has to be diminished to avoid adhesion.

In the case disclosed above in which the interaction surface is placed on a wall made of porous material or if the fluid traverses relatively narrow openings, the fluid in itself has a "cooling effect" due to its expansion on exiting, in the passage through the wall. The cooling effect of the fluid is completely different from that which is achieved through relatively prolonged physical contact with the interaction surface of the transfer means of the dosed quantities. In fact, in the first case there is a sort of microcooling that affects only the most superficial layer of the dosed quantity and is distributed over the entire surface thereof in a regular and homogenous manner. On the other hand, in case of contact between the dosed quantity and the transfer means in the absence of the fluid, there is a strong and relatively deep cooling that is limited to a relatively small portion of the dosed quantity, with deleterious consequences for the formed item.

Furthermore, the fluid avoids penetration of the polymeric material inside the pores or inside the other openings provided on the interaction surface.

In another embodiment, to reduce adhesion, the interaction surface is made to vibrate by means of suitable means (for example a sonotrode).

It has been experimentally found that, by making the interaction surface vibrate at suitable frequency and intensity values (that may vary from one application to the other and are anyway easily verifiable), it is possible to completely or at least partially reduce the effect of adhesion of the dosed quantity to the interaction surface, so that in practice the dosed quantity does not stick and does not adhere to the interaction surface. An explanation of this phenomenon is that at each vibration cycle an attaching effect and a subsequent localised detachment of the dosed quantity are produced and as the intervals of time in which the dosed quantity adheres to the interaction surface are extremely short, macroscopic adhesion of the dosed quantity to the interaction surface is avoided.

Furthermore, it can be hypothesised that the vibration generates a pressure-wave system that acts as compressed air interposed between the interaction surface and the dosed quantity, similarly to a layer of compressed air.

In another embodiment, the anti-adhesion means comprises a coating of the interaction surface by means of a material having anti-adhesion properties in relation to the dosed quantity.

In an eighth aspect of the invention, there is provided an apparatus comprising transfer means provided with a concave part for transferring a dosed quantity of flowable material from a removal position to a delivery position, characterised in that it further comprises bounding means interacting with said transfer means for bounding said dosed quantity in said concave part.

In an embodiment, the transfer means comprises a plurality of handling members, each one provided with a contact surface, suitable for pushing the dosed quantity with a horizontal component and guide the latter during descent. The handling members are moved along a closed path that intersects an emission zone of a dispensing outlet of the flowable material, so as to impact and remove the dosed quantity.

Each handling member is associated with retaining means or bounding means suitable for defining, together with the contact surface, an at least partially closed zone that is able to retain horizontally inside the dosed quantity. Means is also provided that is suitable to drive the retaining means in synchronized manner with the action of the dispensing outlet and with the movement of the respective handling member, in such a way that the zone for retaining the dosed quantity is substantially closed around the instant in which the polymeric body is released by the dispensing outlet.

The contact surface of each handling member may be a concave surface open on a side. Each retaining means is suitable for closing at least partially the concavity of the respective handling member.

Owing to the eighth aspect of the invention, when a transfer means is in the removal position to remove the dosed quantity, the quantity is enclosed inside the concave part of the transfer means by the bounding means. As a result, despite the rebound effect due to the impact of the dosed quantity with the transfer means and/or despite the thrust exerted by any cutting means, the dosed quantity cannot come out from the concave part of the transfer means. On the contrary, the dosed quantity is fixed to the inside of the transfer means in a correct position for the subsequent transfer to the delivery position.

In a ninth aspect of the invention, there is provided an apparatus comprising forming means for compression moulding a dosed quantity of plastics and inserting means extending along a longitudinal axis for transferring a dosed quantity of said plastics to cavity means of said forming means, said inserting means having a shape and a dimension along said longitudinal axis such that said inserting means can be inserted into said cavity means for releasing said dosed quantity.

The inserting means may comprise a passage conduit for the dosed quantities that is tubular-shaped and provided with an inlet that is associated with an outlet of a dispensing device. The passage conduit is inserted, at least with a lower end portion thereof, inside the cavity of a mould for a significant portion of axial length of the passage conduit. The dosed quantity is made to descend through the passage conduit and is then released in the mould cavity through the outlet of the conduit.

Owing to the inserting means, the dosed quantity avoids coming into contact with the side walls of the forming means. The dosed quantity is released by the inserting means in a bottom region of the forming means in such a way that, even if the dosed quantity comes into contact with the side walls of the forming means, the dosed quantity assumes a sufficiently correct position inside the forming means.

In a tenth aspect of the invention, there is provided an apparatus comprising forming means for compression moulding a dosed quantity of plastics, an extruding device for extruding said plastics, cutting means for separating said dosed quantity from said extruding device, characterised in that said cutting means comprises a single cutting element.

Owing to the tenth aspect of the invention, it is possible to obtain an apparatus having a very simple structure and which enables the dosed quantity to be separated from the extruding device. As a single cutting element is present, mounting and maintenance operations of the cutting means on the apparatus are simplified.

In an eleventh aspect of the invention, there is provided an apparatus comprising transfer means for transferring a dosed quantity of flowable material from a removal position to a delivery position, cutting means for separating said dosed quantity from a dispensing device, characterised in that abutment means is provided, said abutment means being arranged opposite said cutting means so as to interact with said dosed quantity.

Owing to this aspect of the invention, it is possible to separate the dosed quantity from the delivery device in a clean and effective manner. The abutment means in fact prevents cutting means from dragging the dosed quantity far from the transfer means.

Furthermore, the abutment means keeps the dosed quantity near the transfer means even when the dosed quantity is impacted by the transfer means. This ensures that the dosed quantity is correctly positioned in the transfer means.

In a twelfth aspect of the invention, there is provided an apparatus comprising transfer means for transferring a dosed quantity of flowable material from a removal position to a delivery position, said transfer means comprising first transfer means movable mainly at a first level, characterised in that said transfer means comprises second transfer means for delivering said dosed quantity to said first transfer means, said second transfer means being movable mainly at a second level.

In an embodiment, forming means is provided arranged in the delivery position for compression-moulding of the dosed quantity.

Owing to this aspect of the invention, it is possible to improve the transfer of dosed quantities, for example to the forming means. The first transfer means gives the apparatus greater versatility inasmuch as their path can match both the path of the forming means and the path of the second transfer means.

BRIEF DESCRIPTION OF THE DRAWINGS

The invention can be better understood and implemented with reference to the enclosed drawings that illustrate some exemplifying and non-limitative embodiments thereof, in which:

FIGS. 11-16 show schematic and section views according to a vertical plane of a sequence of phases implemented by the apparatus in FIG. 2 in the transfer of doses of plastics from the dispensing means to the forming means;

FIGS. 17-22 show schematic and section views according to a vertical plane of a sequence of phases implemented by a version of the apparatus in FIG. 2 in the transfer of doses of plastics from the dispensing means to forming means;

FIG. 25 schematically shows an axial section of first transfer means of the apparatus in FIG. 1;

FIG. 26 schematically shows an axial section of a version of the first transfer means in FIG. 2;

FIG. 27 schematically shows an axial section of another version of the first transfer means in FIG. 2;

FIG. 29 schematically shows an axial section of a further version of the first transfer means in FIG. 2;

FIGS. 49-51 show on an enlarged scale the transfer means and the cutting means in FIG. 43, in a succession of operating phases comprised between the phases illustrated in FIGS. 47 and 48;

FIGS. 52-55 are section views according to respective lines LII-LII, LIII-LIII, LIV-LIV, LV-LV indicated in FIGS. 45 to 48;

FIGS. 66-70 shows schematically a succession of phases in the insertion of a dose into a forming means;

FIGS. 72-76 shows schematically a succession of phases in the insertion of a dose into a forming means by a version of the dispensing means in FIG. 65;

FIGS. 85-89 shows schematically a succession of phases in the insertion of a dose into a forming means by means of the version of the inserting means in FIG. 84;

DETAILED DESCRIPTION OF TECHNOLOGY

Figure 1:
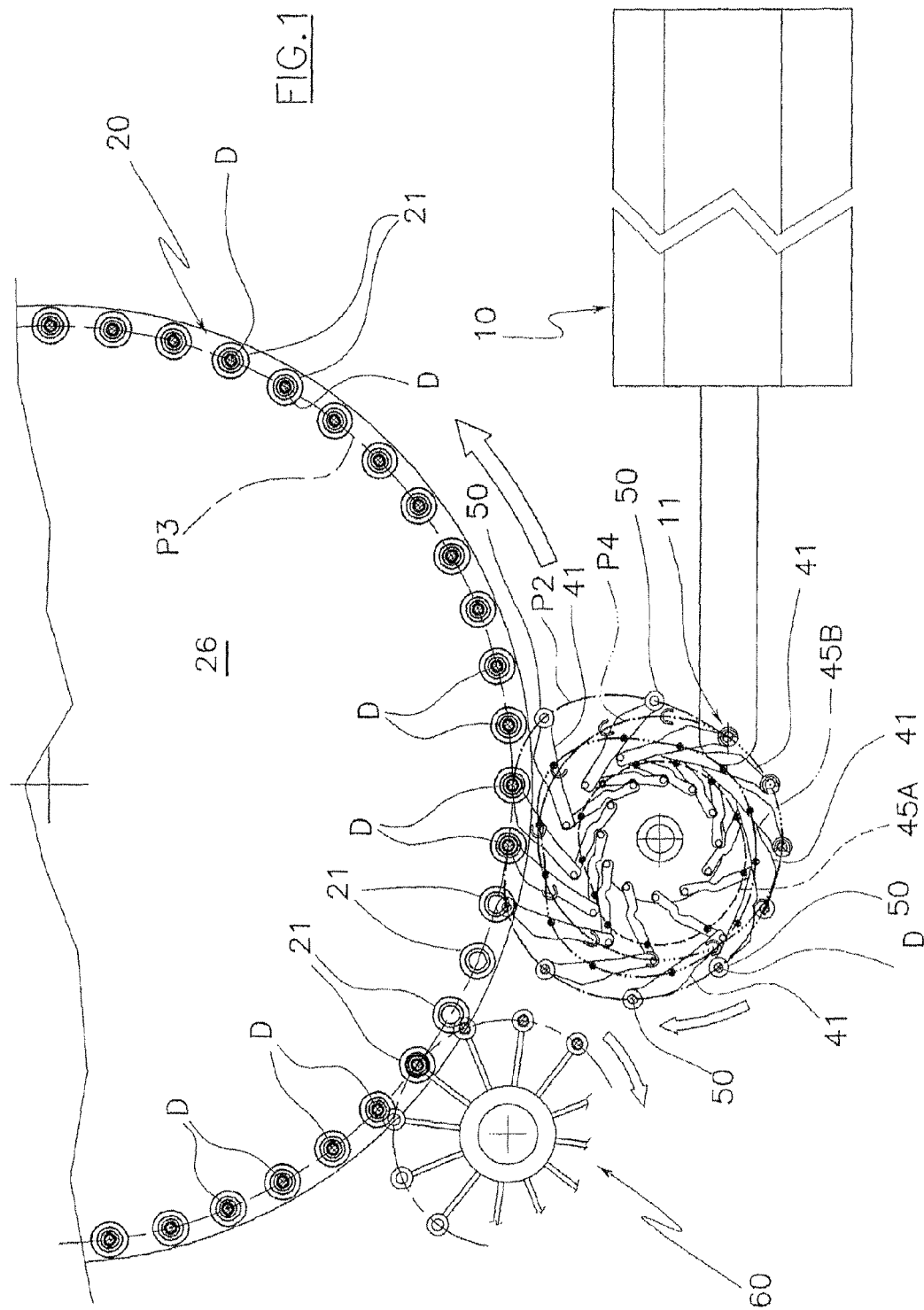
FIG. 1 is a schematic plan view of an apparatus for transferring plastics doses dispensed by a dispensing means to forming means of said doses.

According to the embodiment illustrated in FIGS. 1 to 4, an apparatus is provided to transfer plastics doses or dosed quantities or dosed bodies D, particularly polymeric plastics, dispensed by a dispensing means, consisting of a polymeric material dispensing fixed outlet or port 11, belonging to the dispensing means 10, for example an extruder means, to forming means comprising a plurality of dies 21 carried by a moulding machine or moulding device 20, having a carousel that rotates, for example, with continuous motion.

The extruder means 10 is of the known type and is only schematically shown in the Figures. As known, the extruder means 10 heats the plastics to a suitable temperature (for example around 270°-300° C. in the case of PET) so as to take the plastics to a more or less viscous liquid state, in such a way that the plastics can take on sufficient mobility to be emitted by a fixed dispensing outlet 11.

The dispensing outlet 11 dispenses a continuous extruded body M (typically having a circular cross-section) of fluid plastics that is divided in a regular manner, giving rise to a succession of plastics doses D; for example, a knife 13 (or several knives) is provided that operates near the outlet 11 cutting the extruded body M, dividing the latter into a succession of doses D.

The dies 21 are rotated along a first circular path that runs along a horizontal plane, from a carousel 26, having a vertical axis, of a traditional moulding device 20, operating with a continuous movement, which comprises a corresponding plurality of upper punches 27, which are also carried by the carousel 26, suitable for penetrating into the cavities of the of the corresponding dies 21 to form, through compression, the desired plastics items (for example preforms), as illustrated in FIGS. 15 and 16.

The die 21 shown in said FIGS. 15 and 16 is designed for the forming of preforms suitable for successively making (typically by blow-moulding) bottles in thermoplastic resin (in particular in PET). These preforms comprise a neck, having the final shape provided in the bottle, and a hollow body intended, in the bottle manufacturing phase, to form the container body thereof. In this case, the die is formed of a concave lower part 21a and of an upper part 21b with a through cavity. The lower part 21a has a cavity the surface of which is concave and smooth, substantially cylindrical, which gives the shape to the external surface of the hollow body of the preform, whilst the upper part 21b has a through cavity the surface of which is concave and which gives the shape to the external surface of the neck. As the latter is provided with radial projections, said upper part 21b is divided into at least two half-parts (in the shown case there are two) that are suitable for being transversely moved away from each other to free the preform. Said concave surfaces of the two parts 21a and 21b form the cavity of the die 21.

Obviously, the invention can also be applied to dies in which the cavity is differently shaped, for example because said upper part 21b is missing. Furthermore, the die 21 can be suitable for other products.

The die 21 is rotated by the carousel 26 together with the other dies 21.

At the final end of the rotation of the moulding device 20 a machine or device 60 is placed for the removal of the preforms from the device 20.

To transfer polymeric doses D from the fixed dispensing outlet 11 to the cavities of the dies 21, a first transferring machine or transferring device 40 is provided that rotates around a vertical axis, having first transfer means comprising a plurality of transfer chambers 50 continuously rotated, each chamber 50 being suitable for containing a polymeric dose D and transferring it subsequently to the cavity of a die 21.

The transferring device 40 comprises moving means suitable for moving in succession the transfer means and comprising, according to the embodiment shown in FIGS. 1-4, a circular support 46, arranged on a horizontal plane, rotating in synchronized manner with the moulding device, around a vertical shaft 47 having a fixed axis. Said moving means furthermore comprises a plurality of mechanisms or arm means 41, each of which carries, at a free end thereof, a respective transfer means or transfer chamber 50. Each arm means 41 is provided with two degrees of freedom in relation to the support 46 and comprises fixing means suitable for determining the movement of the arm means 41 in relation to the angular position of the rotating support 46.

Figure 2:
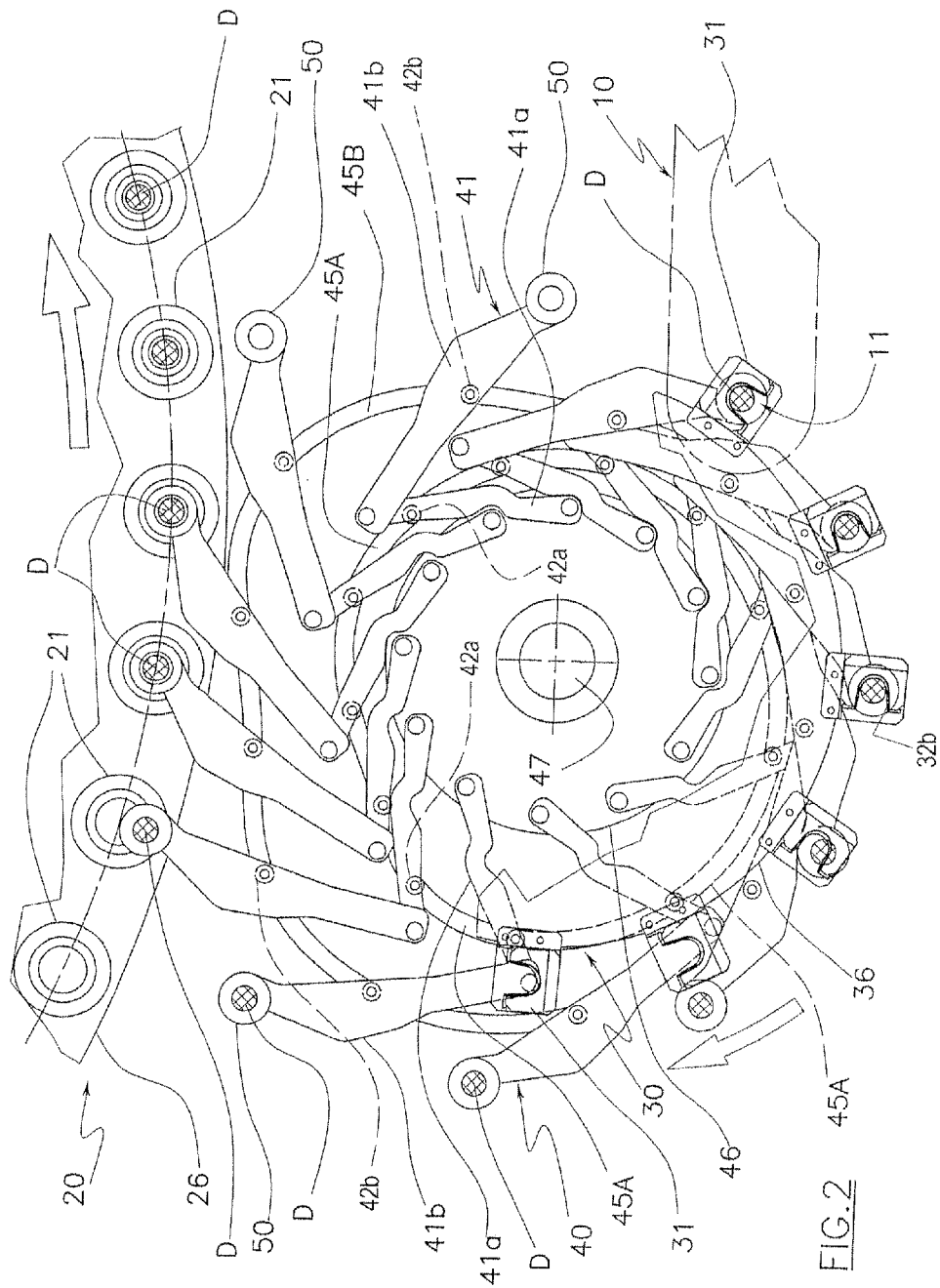
FIG. 2 is an enlarged detail of FIG. 1.
Figure 3:
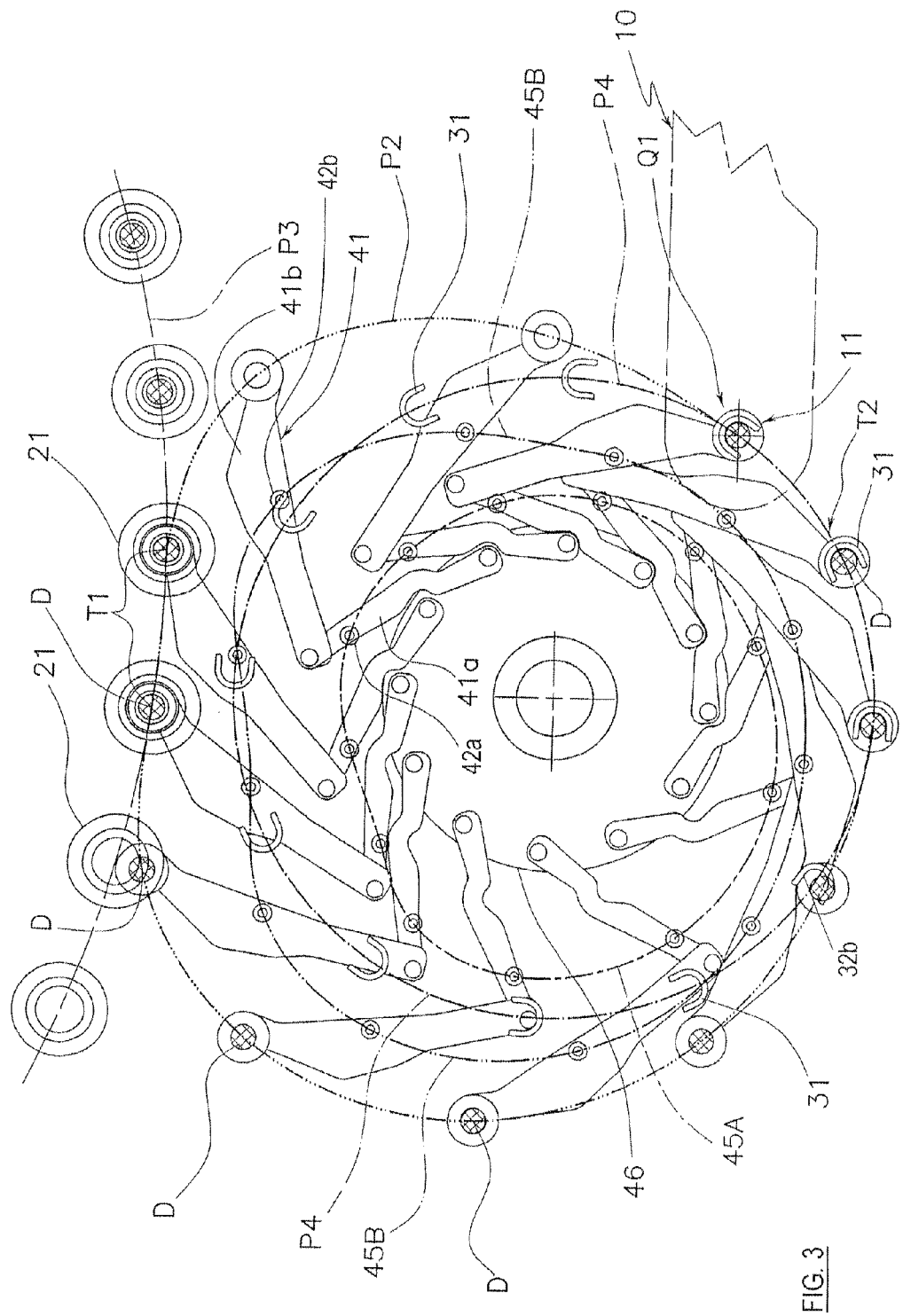
FIG. 3 shows schematically the kinematic aspects of FIG. 2.
Figure 4:
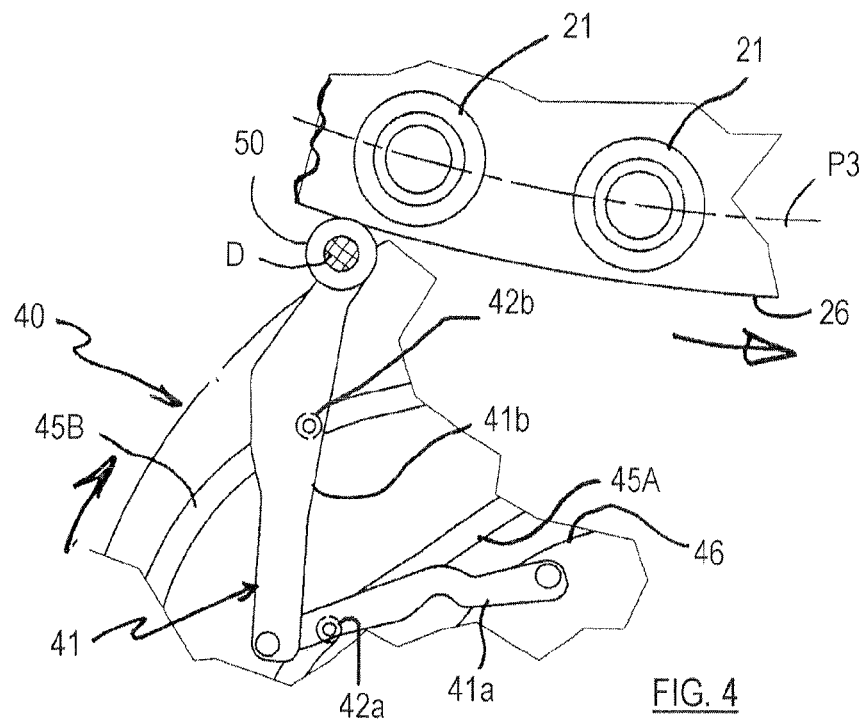
FIG. 4 shows arm means of the apparatus in FIG. 2 on an enlarged scale.

In particular, according to the embodiment shown in FIGS. 2 to 4, each arm means 41 consists of an articulated arm having two members or arms pivoted on one another, a first member or arm 41a of which has an internal end pivoted on the rotating support 46 and the other end pivoted on a second member or arm 41b. The latter has a free external end that carries the transfer chamber 50.

For the series of members 41a of the arm means 41 the fixing means comprises a corresponding first fixed track 45A acting on first driven means, for example idle wheels 42a, carried by the members 41a and respectively a second fixed track 45B, for the series of members 41b, acting on second driven means, for example idle wheels 42a, carried by the members 41b. This is in such a way as to univocally define the movement of the transfer chamber 50 during each revolution of the support 46.

These tracks 45A and 45B constrain suitable points of the two members 41a and 41b of the arm means 41 to follow respective paths; at each angular position of each arm means 41 in relation to the part fixed of the apparatus, the position of the members 41a and 41b remains univocally determined in relation to the support 46, and therefore the movement of the arm means 41 and consequently the path P2 of the transfer chambers 50 and the movement thereof along the path P2 remains univocally determined in combination with the movement of the support 46.

Figure 6:
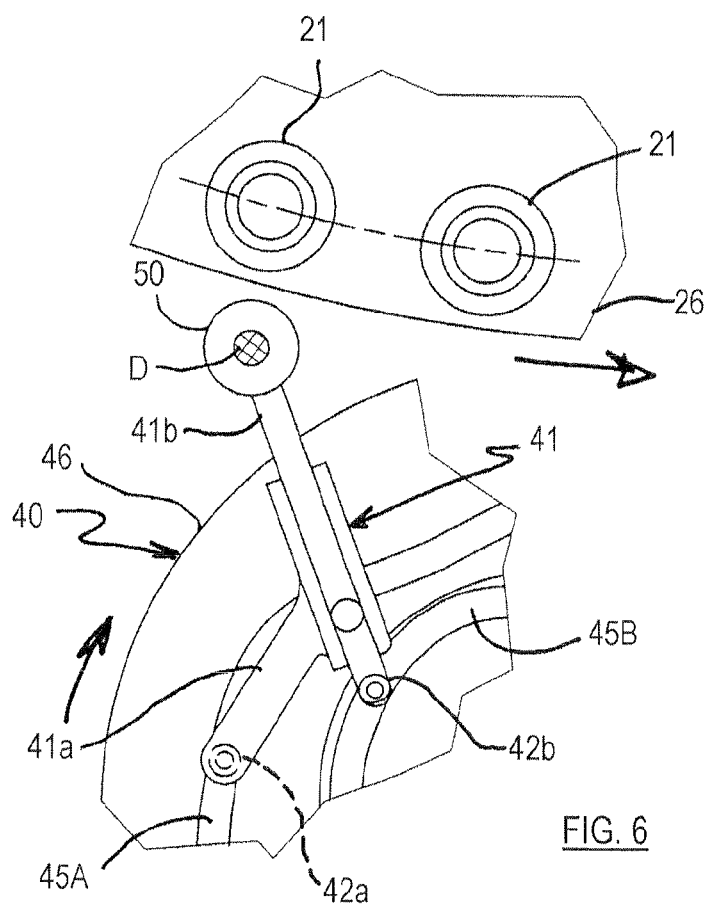
FIG. 6 shows the arm means in FIG. 5 on an enlarged scale.
Figure 5:
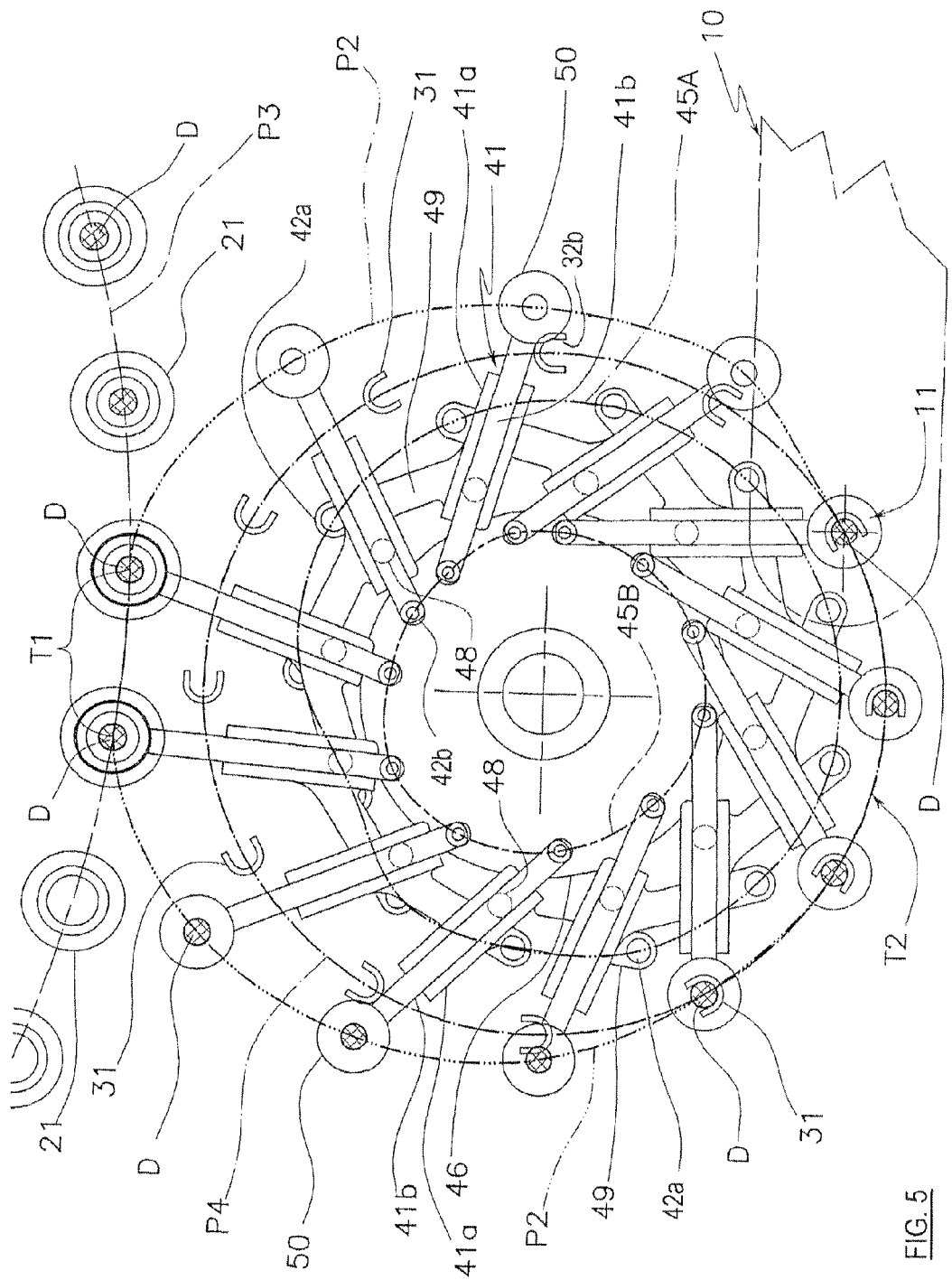
FIG. 5 shows a second embodiment of the arm means of the apparatus in FIG. 2.

The second embodiment of the arm means 41 of the first transferring device 40 shown in FIGS. 5 and 6, differs from the previous one through the fact that each arm means 41 comprises a first member 41a, an internal end of which is pivoted on the rotating support 46 by means of a pivot 48, and a second member 41b, a free end of which carries a transfer chamber 50. This member 41b, instead of being pivoted on the first member 41a, is coupled in a prismatic manner to the latter, that is the member 41b has the possibility of sliding axially (without any other movement) in relation to the first member 41a, which has the shape of a short pipe or guide. Also here, as in the preceding embodiment (FIG. 2), a first fixed track 45A is provided acting on first driven means, for example idle wheels 42a carried by levers 49 fixed to the members 41a and a second fixed track 45B, acting on second driven means, for example idle wheels 42b carried at the internal end of the members 41b. This in such a way as to univocally define the movement of the transfer chamber 50 during each revolution of the support 46.

Figure 7:
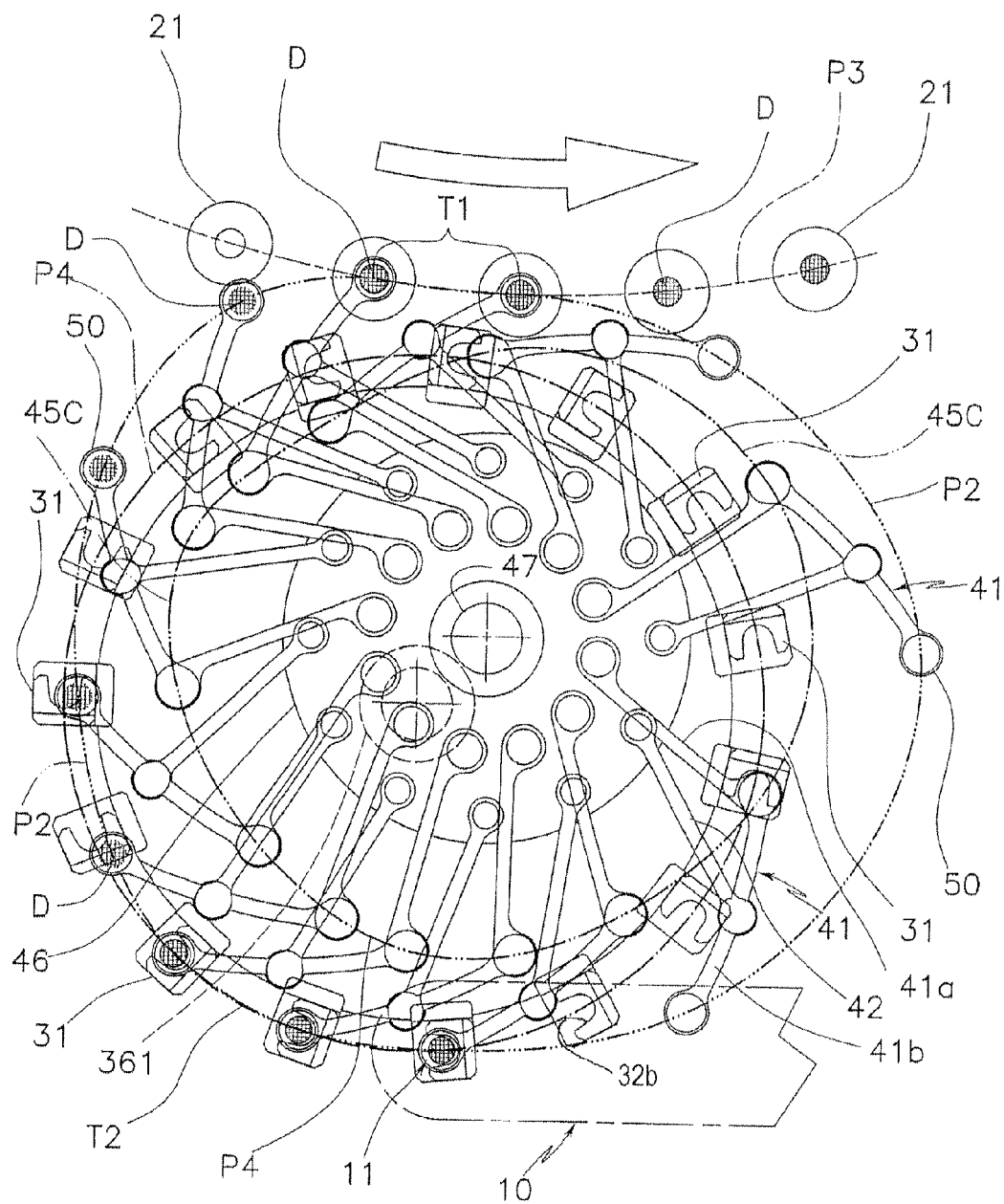
FIG. 7 shows a third embodiment of the arm means of the apparatus in FIG. 2.
Figure 8:
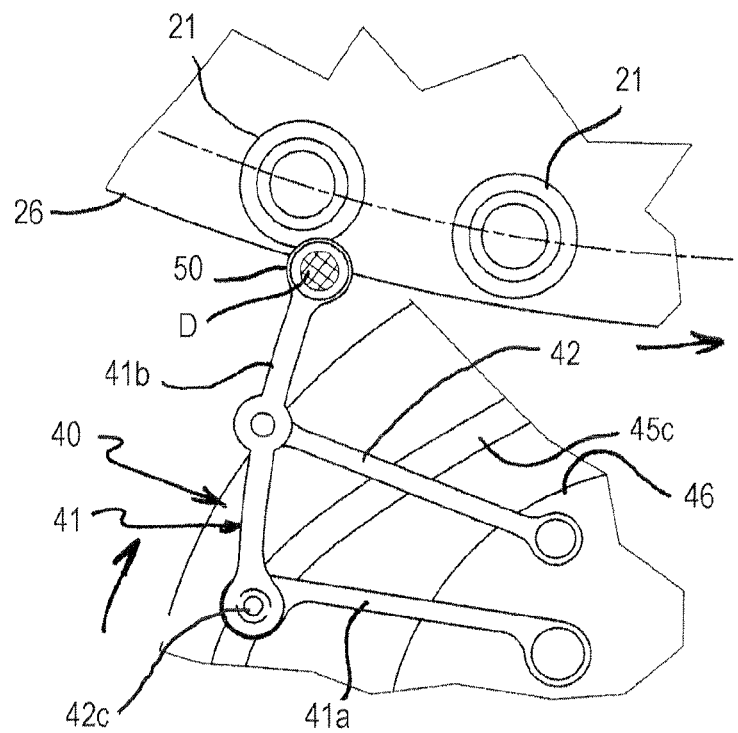
FIG. 8 shows the arm means of FIG. 7 on an enlarged scale.

In the third embodiment of the arm means 41, shown in FIGS. 7 and 8, each arm means 41 comprises an articulated arm having two members or arms 41a, 41b pivoted together, the first member or arm 41a of which is pivoted at an end on the rotating support 46 and the second member or arm 41b carries a transfer chamber 50. Nevertheless, for each articulated arm means 41, the transferring device 40 comprises a third member or arm 42, pivoted on the rotating support 46 and fixed on the articulated arm 41. In particular, the third member 42 is whole and is pivoted on the rotating support 46 through an internal end and on the second member 41b through the other end to form with the arm 41 an articulated quadrilateral. The movement of the articulated quadrilateral mechanism defined by the three members 41a, 41b and 42 in relation to the support 46 is constrainable by means of a single fixed track 45C. For example, each arm means 41 has a driven means 42c, for example an idle wheel, pivoted on the articulation axis between the two arms 41a and 41b, bilaterally fixed to follow the track 45C. This constrains a suitable point of said articulated quadrilateral to follow a given path and univocally determines, in combination with the movement of the support 46, the path P2 of the transfer chamber 50 and the movement thereof along the path P2.

Figure 10:
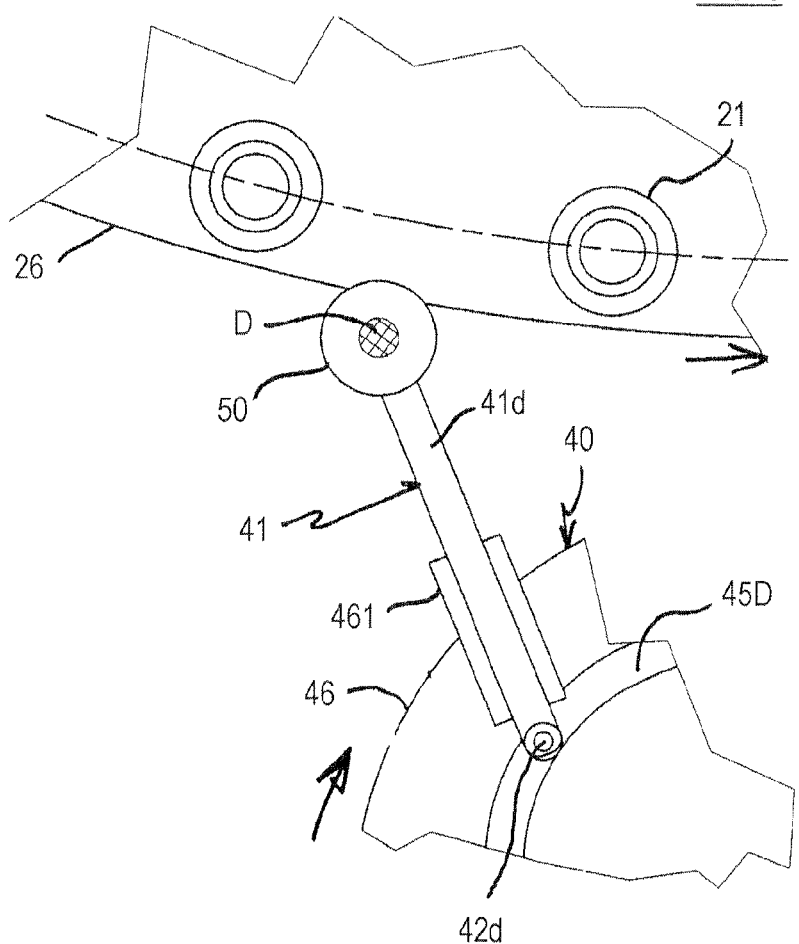
FIG. 10 shows the arm means in FIG. 9 on an enlarged scale.
Figure 9:
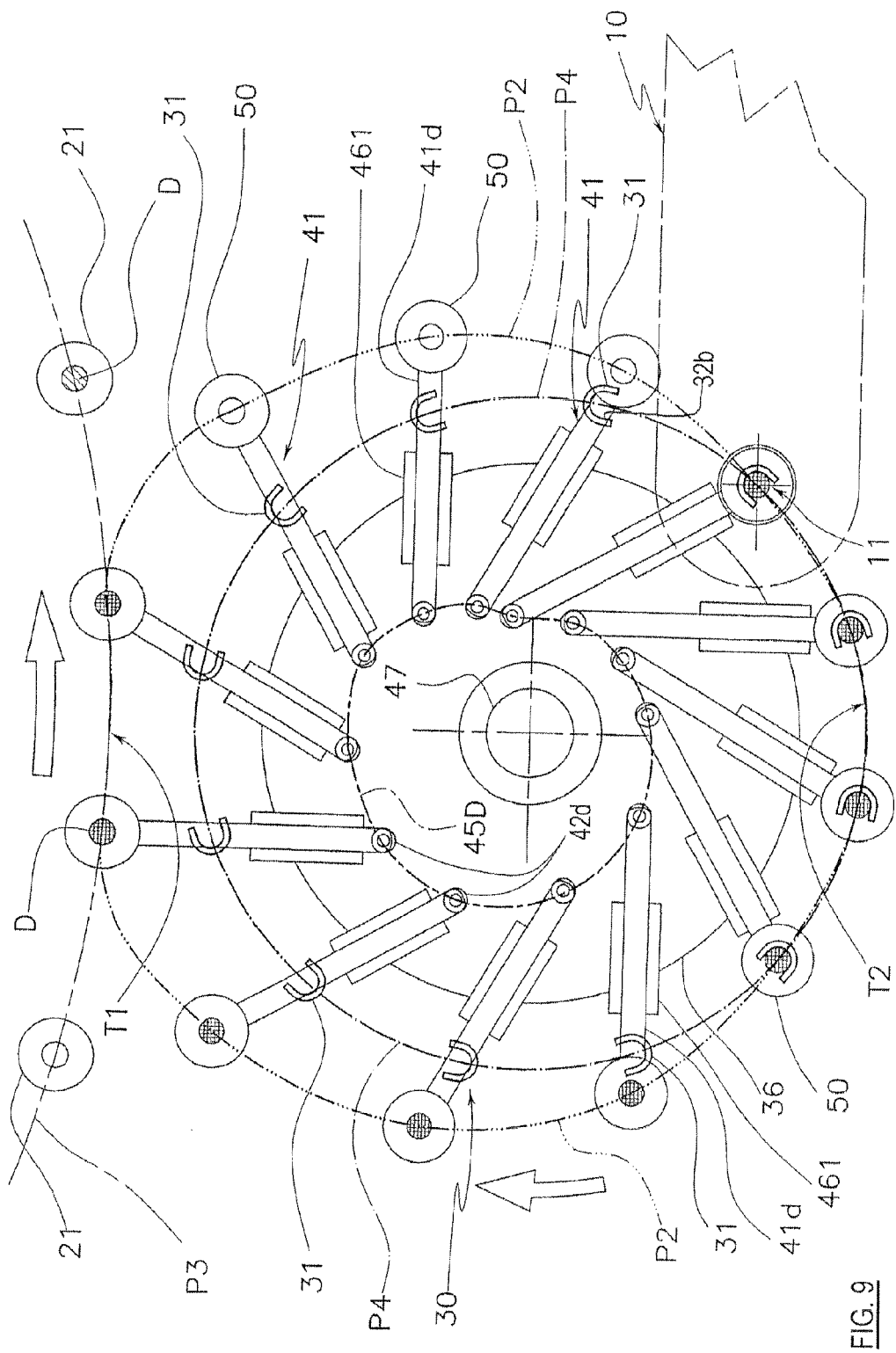
FIG. 9 shows a fourth embodiment of the arm means of the apparatus in FIG. 1.

In the fourth embodiment of the arm means 41, shown in FIGS. 9 and 10, each arm means 41 comprises a member or arm 41d carried by the rotating support 46 and constrained to the latter by a constraint having a single degree of freedom. In particular, each member 41d has, at its external end, a respective transfer chamber 50 and is coupled in a prismatic manner with a short pipe or sleeve 461 fixed to the rotating support 46, in relation to which it can slide axially. Alternatively, the member 41d may be pivoted onto the rotating support 46, still with a constraint having a single degree of freedom. A single fixed track 45D is provided acting on driven means 42d, for example idle wheels, placed on the member 41d in such a way as to define univocally the path P2 of the transfer chambers 50 during each revolution of the support 46 and the movement thereof along the path.

It is possible to suitably design the path of the tracks 45A, 45B, 45C, 45D in such a way as to make a consequent path P2, along which the transfer chambers 50 are successively carried (FIGS. 3, 5, 7 and 9), having a portion T1 that matches the circular path P3 of the dies. Along the aforementioned portion T1, each transfer chamber 50 is positioned substantially coaxial with and above the cavity of a die 21 and the movement of each transfer chamber 50 matches the movement of the latter. Along this portion T1 the transfer of the polymeric doses D from the chambers 50 to the cavities of the dies 21 is then carried out.

By providing with a suitable length the portion T1, in which the path P2 matches the path P3, owing to the coincidence of the movements in this portion T1, a relatively high time is made available (depending on the speed of rotation of the moulding device 20 and on the length of the matching portion T1) during which it is possible to transfer each dose D to the cavity of a die whereas the transfer chamber 50 is kept above, exactly coaxial with the latter.

For the use provided by the invention other arm means or mechanisms 41 can also be used that are different from those disclosed above and are nevertheless equivalent to the latter in terms of operating manner and the kinematic effects obtainable in the spirit of the invention.

In the embodiments shown in FIGS. 1-10, the path P3 of the dies 21 is circular and the matching portion T1 is therefore also circular. Nevertheless, the path P3 can be made with a different shape. For example, it may have a straight portion, along which the portion T1 is also defined. In this case, the centrifugal thrust on the polymeric dose is absent or almost absent.

The apparatus according to the invention provides second transfer means suitable for transferring the polymeric doses D from the dispensing outlet 11 to the transfer chambers 50. This transfer means can be suitable for moving the polymeric doses by shifting them from the fixed point from which they exit (the dispensing outlet 11) and transferring them, through a movement having a horizontal component, to the transfer chamber 50, as occurs in the embodiments illustrated in the preceding Figures and in the embodiments disclosed below. Alternatively, it is possible to carry out the transfer only by means of vertical descent of the polymeric dose D from the fixed dispensing outlet directly to the transfer chamber 50. In this case, members are provided associated with the outlet, for example a piston that pushes and cuts the extruded material, one or more knives that cut the extruded material, etc, which cause the polymeric dose to be removed from the dispensing outlet port and to fall by gravity or by other factors, for example by being pushed by compressed air, into the transfer chamber, this being placed below the outlet.

According to the embodiment shown in FIGS. 1 to 16, to transfer polymeric doses D from the dispensing outlet 11 to the transfer chamber 50, a rotating second transferring machine or second transferring device 30 is provided, having a plurality of handling means or second transfer means 31, that is continuously rotated. Each second transfer means 31 has a concave internal surface 32b, having a "U"-shaped cross-section that is open on a side, intended to come into contact with polymeric doses D. The surface 32b extends axially along a substantially vertical axis and is shaped in such a way as to define a channel that is open on a side and is able to accompany the polymeric doses D by making the latter flow in contact with the surface 32b.

The second transferring device 30 has moving means suitable for successively operating the handling means 31 in such a way that the latter transfer, by relative shifting in a transverse direction, plastics doses D exiting from the dispensing outlet 11 and arrange the plastics doses D one at a time in the transfer chambers 50.

Said moving means comprises a circular support 36, arranged on a horizontal plane, rotating in synchronized manner with the moulding machine around a vertical shaft coaxial with the shaft 47 of the support 46 (or around a shaft 361 distant from the shaft 47, as in the case shown in FIG. 7) having a fixed axis, at the periphery of which the handling means 31 is fixed, as shown in FIGS. 17-20. The handling means 31 is arranged with the open side of the surface 32$b$ turned tangentially forward in relation to the rotation direction.

The path P4, made by the concave internal contact surfaces 32$b$, runs on a horizontal plane and is placed underneath and at a short distance from the dispensing outlet 11 (nevertheless sufficient to avoid the impact against the lower end of the extruded body M that descends from the outlet), in such a way that the upper end of the concave internal contact surface 32$b$ passes under the outlet 11, there being interposed a knife 13. Furthermore, said path P4 is located above and at a short distance from the path P2 below of the chambers 50 so that the lower end of the concave internal contact surface 32$b$ moves brushing against the upper end of the chambers 50.

The path P4 followed by the means 31 is circular and has a portion, indicated by T2 in FIGS. 3, 5, 7 and 9, which matches the path P2 of the transfer chambers 50. During this portion T2, each handling means 31 is in a position that is almost coaxial and above a transfer chamber 50 and the motion of the handling means 31 matches the motion of the transfer chamber 50. As the path P4 followed by the means 31 is rigidly circular, being the means 31 rigidly fixed to the support 36, path P2 of the transfer chambers 50 is the one that, by suitably shaping the path of the fixed tracks 45, is deviated in relation to a circular path and is made to coincide with said portion T2 of the path P4 of the handling means 31.

The dispensing outlet 11 is located near the upstream end of said portion T2.

During use, the means 31 is passed underneath the dispensing outlet 11, where the dose D, which has just been cut by the knife 13, enters the concavity formed by the internal contact surface 32$b$ and is pushed by contact in horizontal motion by the latter. In the meantime, the dose D moves through the force of gravity also downwards, sliding in a guided manner along the contact surface 32$b$ until leaving the latter and falling into a transfer chamber 50 below. This transfer is carried along the portion T2, along which, as mentioned above, the contact surface 32$b$ is placed above and almost coaxial with a transfer chamber 50 and moves together with the latter with the same motion.

Owing to the portion T2, in which the path P4 matches the path P2, which portion T2 will have a suitable length, and to the coincidence of the movements in this portion T2, a relatively long time is made available (depending on the rotation speed of the moulding device 20 and on the length of the portion T2) during which it is possible to achieve the correct transfer of each dose D from the dispensing outlet 11 to the transfer chamber 50.

The lower part 33 of the surface 32$b$ is shut and convergent in order to perfect the descent of the item D into the release seat.

FIGS. 11 to 14 show the salient phases of the transfer of the polymeric dose D from the dispensing outlet 11 to the transfer chambers 50 through the handling means 31, all of which phases occur in said matching portion T2.

Figure 11:
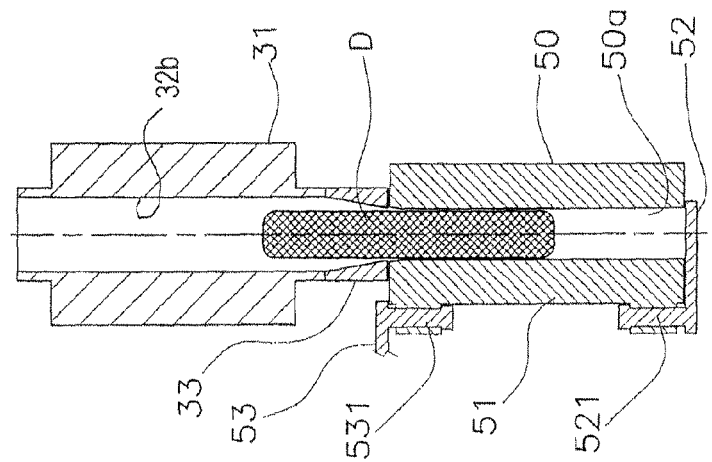

FIG. 11 shows the dose D that has just entered the concavity of the surface 32$b$ and has just been removed from the extruded body M by the action of the knife 13. This phase corresponds to position Q1 in FIG. 3.

Figure 12:
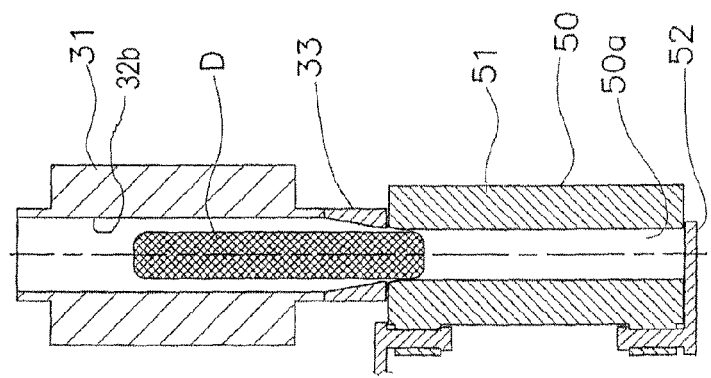
Figure 13:
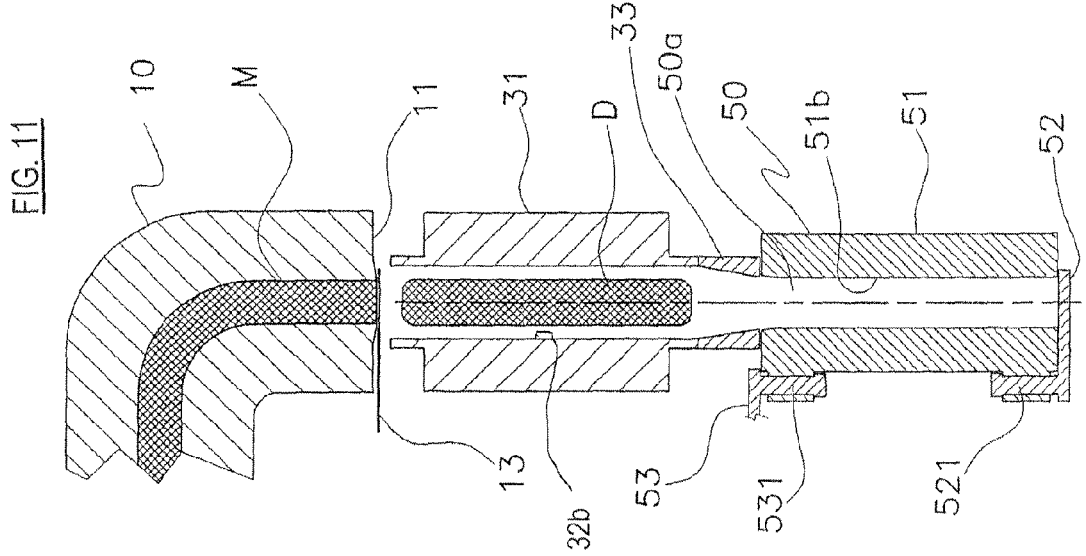

In FIGS. 12 to 14 the polymer body D descends accompanied by the surface 32$b$ until it completely enters the transfer chamber 50 below (FIG. 14).

FIGS. 15 and 16 show the salient phases of the transfer of the polymeric dose D from the transfer chamber 50 to the cavity of a die 21 below, all of which phases occur in said matching portion T1.

Figure 22:
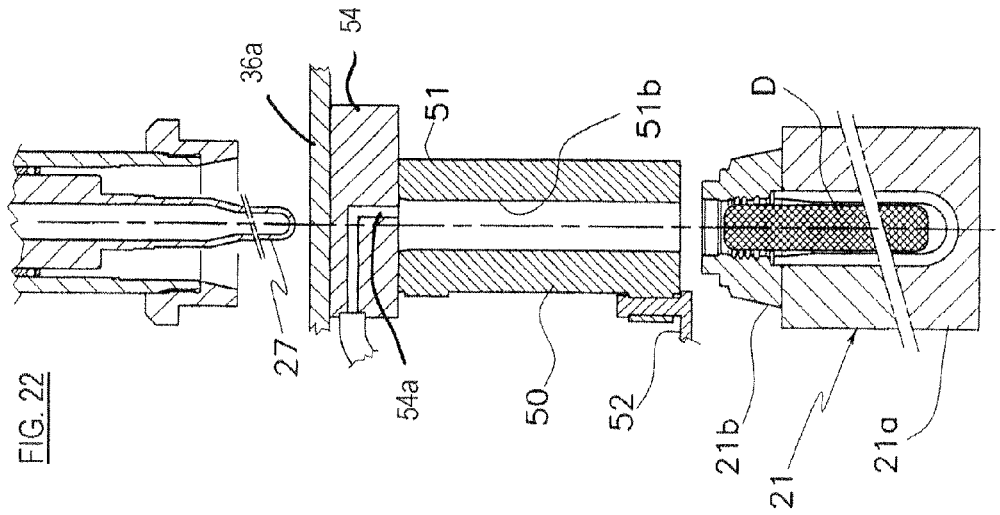
Figure 21:
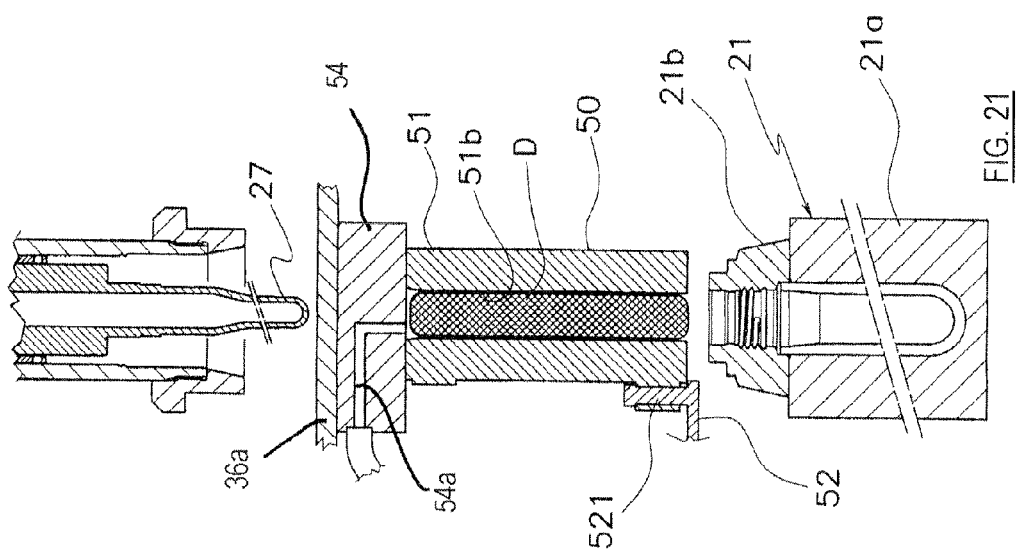
Figure 20:
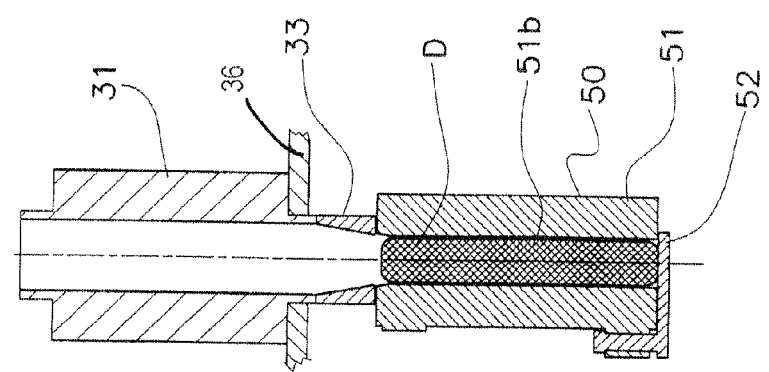

FIGS. 21, 22 show a version of the apparatus in which pressurised fluid is inserted, for example air or other gas, in the transfer chamber 50 above the dose D to generate a downwardly directed thrust and in this way make the exit of the dose D through the lower port of said chamber more rapid.

For this purpose, first closing means are provided that is suitable for closing the upper port of the transfer chambers 50, in which one or more openings are obtained, through which, by suitable pressurised fluid dispensing means, forced fluid is dispensed into the chamber 50 in order to eject through pressure the polymeric dose D through the lower port. In the shown embodiment, the first closing means comprises closing bodies 54 that are positioned so as to close the upper port of the transfer chamber 50 each time that the latter is in a position suitably superimposed above the die cavity. When this superimposition occurs, pressurised fluid is sent through the openings 54$a$, which are obtained in the body 54 and downwardly directed, to the inside of the transfer chamber 50, in such a way as to forcibly push downwards the dose D below.

The closing bodies 54 are fixed under the external edge of a rotating supporting disc 36$a$ of the second transferring device 30. Said supporting disc 36$a$ is connected with and is concentric to the support 36 that carries the handling means 31 and extends with a diameter such that its external edge is superimposed on the path of the dies 21. The kinematic features of the machine 30 and of the moulding device 20 are in such a relationship that for each transfer chamber 50 that is superimposed on a cavity of die 21, a closing body 54 is positioned so as to close the upper port of the transfer chamber 50. In this phase pressurised fluid is inserted through the body 54 in such a way that the polymeric dose D is pushed downwards into the die cavity below in a delivery position. The closing bodies 54 thus act as ejecting means for ejecting the polymeric dose D from the transfer chambers 50.

Figure 23:
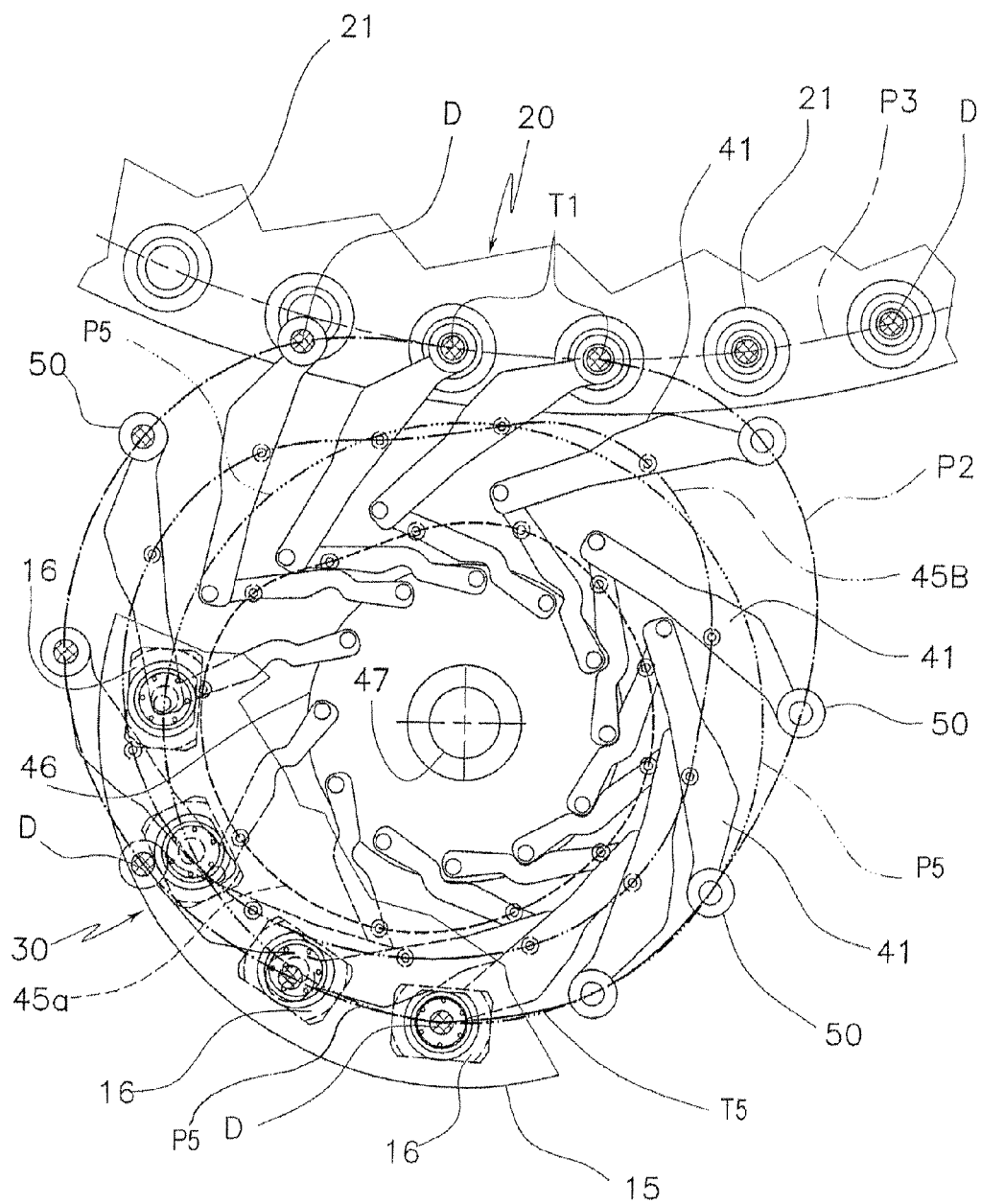
FIG. 23 shows a version of the apparatus in FIG. 2 in which second transfer means comprises a plurality of dispensing outlets.
Figure 24:
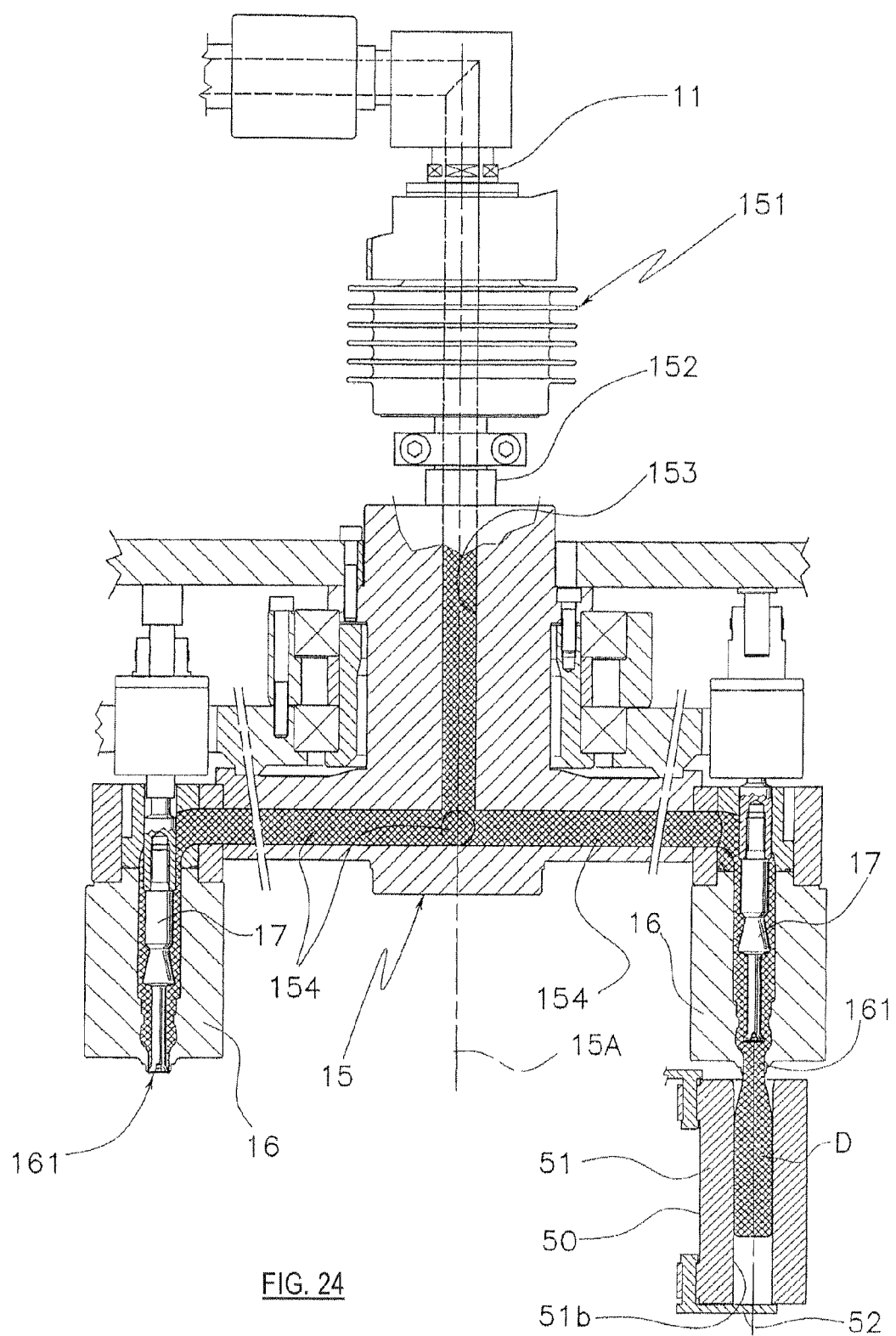
FIG. 24 is a section according to a general axial and vertical plane of the apparatus in FIG. 23.

According to the embodiment shown in FIGS. 23 and 24, the second transferring device 30 for transferring the doses D from the dispensing outlet 11 to the transfer chambers 50 comprises a rotating carousel 15, associated with the fixed dispensing outlet 11, peripherally carrying a plurality of secondary dispensing outlets 16 suitable for dispensing plastics, which are moved along a circular path P5 lying on a horizontal plane. More in detail, the carousel 15 rotates around a vertical central axis 15A and has an upper port 152, located on the axis 15A that is connected, by a rotating connecting joint 151, to the fixed outlet 11. The joint 151 ensures continuity of the fluid connection between the fixed outlet 11 and the rotating port 152.

Inside the carousel 15 a central channel 153 is obtained that leads away from the port 152 and extends along the axis 15A, and a plurality of transverse channels 154 are obtained that lead away radially from the lower end of the central channel 153 and supply as many secondary outlets 16 facing downwards with a vertical axis, distributed on the periphery of the carousel 15 and arranged at the same distance from the axis 15A and angularly placed at the same distance from one another.

Each port 16 is suitable for dispensing an extruded body of plastics and with each of them a means is associated for dividing the extruded body into a plurality of doses D. For example, said dividing means is a shutting means 17 that is axially movable inside the port and is suitable for shutting the exit holes 161 of the outlets 16 thereby dividing the polymeric extruded body. Alternatively, the dividing means may be a knife (not shown).

The disclosed carousel 15 with corresponding associated members is already known; for example it is of the type disclosed in patent application PCT/EP2003/07325 filed by the same applicant.

The moving means of the transfer chambers 50 is suitable for successively moving the chambers 50 in such a way that the path P2 thereof has a portion matching the path P5 of the secondary dispensing outlets 16 (this portion is marked as T5 in FIG. 23), during which each transfer chamber 50 is in a position that is almost coaxial with and underneath a secondary port 16 and the movement of the transfer chamber 50 matches the movement of the secondary port 16, the transfer of the polymeric dose D to the transfer chamber 50 occurring in this portion.

In the use, the extruded plastics body descends continuously from the dispensing outlet 11 and, through the channels 153 and 154, reaches the secondary ports 16. The latter operate in synchronized manner with the movement of the carousel 15 dispensing one at a time in succession (or also several outlets simultaneously), a polymeric dose D, whilst they travel along said portion T5 in which they are precisely superimposed above the chambers 50 and, during this portion, the dose D falls though gravity inside the transfer chamber 50 below.

Owing to the portion T5, in which the path P2 matches the path P5, which portion T5 will have a suitable length, and to the coincidence of the movements along the portion T5, a relatively long time is made available, depending on the rotation speed of the moulding device 20 and on the length of the portion T5, during which it is possible to achieve the transfer of the doses D from each secondary dispensing outlet 16 to the transfer chamber 50 below.

In the embodiments of the arm means 41 shown in FIGS. 7 and 9, in the matching portions T1, T2 and T5, the movement (trajectory and speed) of the transfer chambers 50, unlike the two previous embodiments, does not exactly match the movement of the dies 21 or respectively the movement of the handling means 31 or of the secondary dispensing outlets 16, but nevertheless approaches in a sufficiently precise manner, such movements.

The first transfer means 50 may comprise shape conditioning means suitable for geometrically modifying the shape and, with the latter, the respective dimensions of the plastics dose D in such a way as to make the plastics dose D suitable for descending into the cavity of the die 21, without coming into contact with the walls of the latter during the descent, and thus being correctly inserted in the cavity of the die cavity. The shape conditioning means finds application especially in the case in which the die cavity is relatively deep and narrow in relation to the mass of polymeric dose D and/or the operating speeds are relatively high. A typical case is in the forming of the PET preforms used to produce the usual plastics bottles for mineral water or other sparkling drinks, as in this case the die cavity is relatively deep and narrow in relation to the mass of the dose.

According to an embodiment, the shape of the internal cavity 50a of the transfer chamber 50 geometrically conditions the shape of the polymeric dose D. The dose D is in other words inserted in the transfer chamber 50 with a shape that may be different from that of the internal cavity 50a of the chamber and is conditioned by the latter physically in the sense that the dose D takes on the same shape thereof, especially the shape of the side surface, owing to its intrinsic fluidity and plasticity.

As already observed above, owing to the conditioning means, the passage of the polymeric dose from the transfer chamber to the die cavity can be achieved so fast that said portion T1, in which the path P2 matches the path P3, may not be necessary, during which each transfer chamber 50 is in a position almost coaxial with and above the cavity of a die 21.

According to the embodiment in FIGS. 11-16, 25, 27, 28 the internal cavity 50a of the transfer chamber 50 is laterally delimited by the internal surface 51b of a side wall 51, the surface of which is cylindrical, with vertical generatrices, possible with a circular section, and its transverse dimension is not greater than the minimum transverse dimension of the inlet zone of the die cavity.

In the shown case, for example in FIGS. 15 and 16, the cavity of the upper part 21b of the die has a diameter that is less than the cylindrical side surface of the lower part 21a. In this case the diameter of the internal cavity 50a is a little less than the diameter of the cavity of the upper part 21b.

The contrary applies if the cylindrical side surface of the cavity of the lower part 21a of the die has a diameter that is less than the cavity of the upper part 21b.

When the dose D is released by the chamber 50 inside the cavity of the die 21 below, the dose D has a shape that is such as to enable the latter to penetrate the cavity without coming into contact with the side walls of the cavity during descent, and anyway such as to ensure that even if a contact occurs, this will not hinder the descent and correct positioning of the dose D inside the die 21.

The transverse dimension (diameter) of the internal cavity 50a may not be less than the transverse dimension assumed by the dose D emitted from the dispensing outlet 11, in order to better allow the insertion of the dose D into the chamber 50.

The internal cavity 50a of the transfer chamber 50, in addition to being laterally delimited by the cylindrical and closed side wall 51, can be closed at the bottom by second closing means comprising a lower base wall 52 suitable for assuming, through means that is not shown, an alternatively closing and opening position.

Also the upper base of the internal cavity 50a can be closed by first closing means 53 consisting of an upper base wall, which is openable and closable through means that is not shown.

In the phase in which the transfer chamber 50 receives the polymeric dose D from the dispensing outlet 11, the upper wall 53 is in an open position whereas the lower wall 52 is in a closed position. During the phase in which the transfer chamber 50 dispenses the polymeric dose D to the die cavity, the upper wall 53 is in a closed position whereas the lower wall 52 is in an open position.

In the shown embodiment, the lower base wall 52 is flat and, in the closed position, lies on an horizontal plane. To reach the open position, the lower base wall 52 moves along the same said horizontal plane, which is close to the lower edge of the side wall 51. In particular, said lower base wall 52 rotates in relation to the side wall 51 around the pivot 521, having a vertical axis, connected to the wall 51.

Similarly, the upper base wall 53 is flat and, to go to the open position, it moves remaining on the horizontal plane in which it is in a closed position. In particular, the upper base wall 53 rotates in relation to the side wall 51 around the pivot 531, having a vertical axis, connected to the wall 51.

As the polymeric dose D comes into contact with the internal surface of the cavity 50a of the transfer chamber 50, especially with the internal side surface 51b and with the internal surface 52b of the lower wall 52, the chamber 50 comprises anti-adhesion means for completely or partially reducing the adhesion caused by this contact.

According to an embodiment of the transfer chamber 50, shown in FIG. 25, said anti-adhesion means comprises dispensing means suitable for supplying a fluid, in particular a gas, for example air, to the cavity of the chamber 50. The emitted fluid forms a gap between the internal surface of the transfer chamber 50 and the polymer dose D so as to reduce the adhesion effect between the polymeric dose D and the internal contact surface.

The side wall 51 and the lower wall base 52 of the transfer chamber 50 are preferably porous in such a way as to enable the passage of the fluid through the thickness thereof. In this case a second side wall 51' is provided, which is outside and coaxial with the side wall 51 and which surrounds the side wall 51 and is connected to the latter at upper and lower edges. Between the two walls 51 and 51' a side chamber 51a is defined that surrounds the porous side wall 51 360 degrees and extends along the entire height or almost the entire height thereof. The side chamber 51a is connected with means, that is not shown in the Figures, which is suitable for sending pressurised gas through a channel 59 and inlets 56 into said camera 51a and from there through the porous wall 51 inside the transfer chamber 50.

A second external base wall 52' is furthermore provided that is located below the lower wall 52 and is united to the latter along the external edge. Between the two walls 52 and 52' a thin lower chamber 52a is defined that extends for the entire extent of the base wall 52, which is also connected with the means suitable for sending pressurised gas into the chamber 52a and from there through the porous wall 52 inside the transfer chamber 50.

The pressurised gas is sent to the chambers 52a and 51a, and from here passes through the porous walls 52 and 51 to form a gap or layer of gas that becomes interposed between the internal surfaces 52b and 51b of the walls 52 and 51 and the external surface of the polymeric dose D. This gap filled with gas has the effect of avoiding contact between the polymeric dose D and the walls 52 and 51 or at least of reducing the time and extent of the contact zones, thus reducing the macroscopic adhesion effect between the polymeric dose D and the walls 52, 51, promoting effective downward flow of the dose.

It has been found that by interposing a gap filled with fluid with sufficient pressure and flow rate values (that vary from one application to another and are anyway verifiable with relative ease) between the contact surface and the polymeric dose D, it is possible to reduce completely or at least partially the effect of adhesion of the polymeric dose D to the extent that the latter does not in practice stick and does not remain adhering to the surface.

In fact, by forming a gap filled with fluid with suitable flow rate and pressure values, that are generally relatively low (one or a few bars are sufficient), contact between the polymeric dose D and the contact surface is avoided. If contact nevertheless occurs, it is anyway localised and limited in time. With regard to this, it has been shown experimentally that by limiting the contact time between the polymeric dose D and the surface to relatively low values, a correspondingly low macroscopic adhesion effect is obtained. If the adhesion time is of a few microseconds, the effect of macroscopic adhesion is practically null.

The phenomenon can be explained by the fact that, in order to obtain an adhesion effect, a contact time is required that is not less than a value (reaction time) so that the chemical-physical adhesion forces can take effect. This reaction time is a function of the material, of the temperature and of the local pressure. The gap filled with fluid causes this process to be interrupted continuously, so that maximum adhesion does not take place or even all contact is avoided.

Excellent results were obtained by making said porous walls from a material the pores of which had a diameter comprised between $5 \times 10^{-3}$ mm and $20 \times 10^{-3}$ mm and sending into the chambers 51a and 52a gas at a pressure of 0.5-1 bar.

Figure 31:
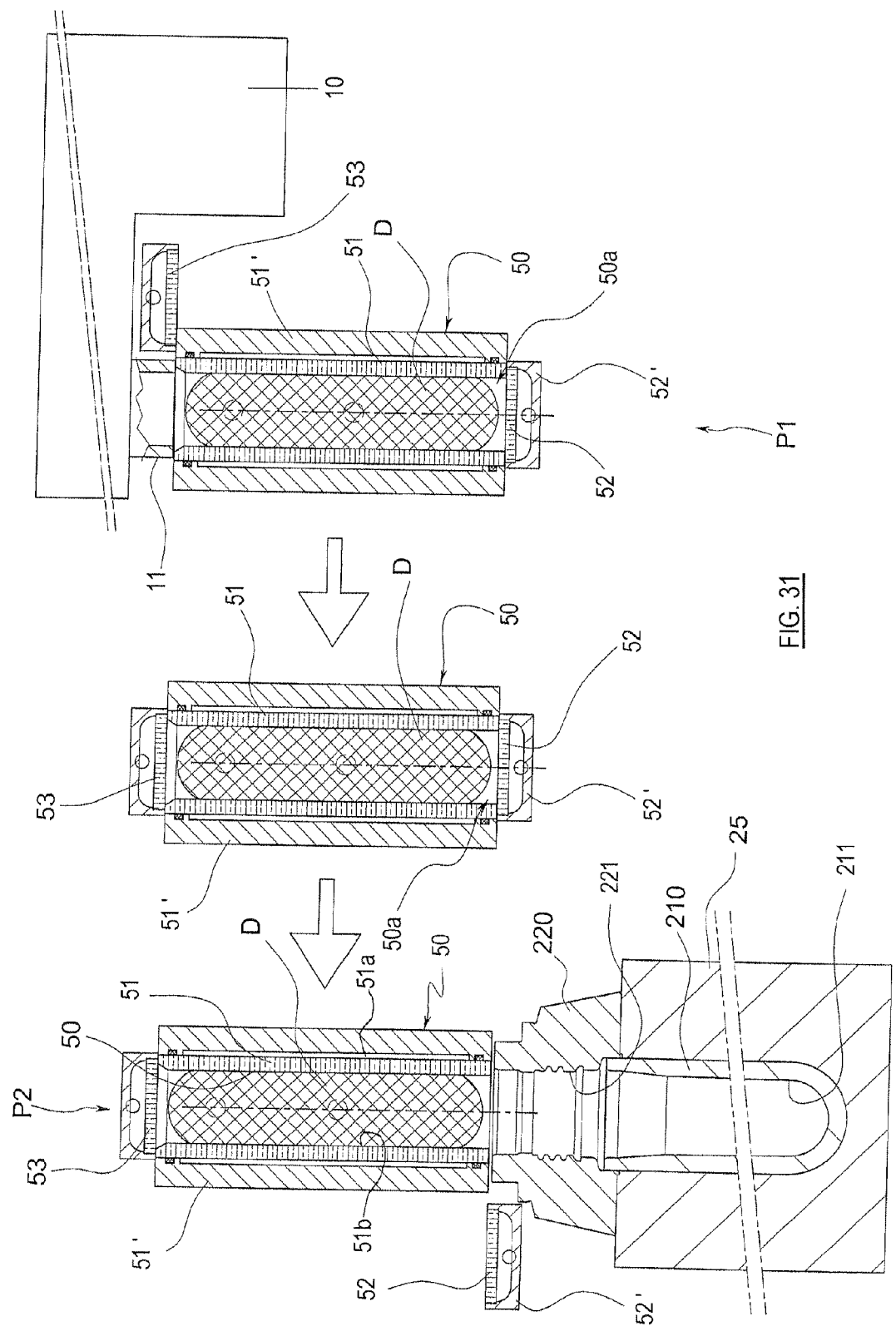
FIG. 31 shows schematic and section views according to a vertical axial plane of a sequence of phases implemented by the first transfer means in FIG. 25 in the transfer of doses of plastics from a dispensing means to forming means.

FIG. 31 shows the operation of the transfer chamber 50 in FIG. 25. The chamber 50 is initially placed in a first position in which it receives a dose D, for example below and almost coaxially with the dispensing outlet 11 (position P1). Subsequently, the chamber 50 is moved to a second position P2, placed in a position above a die cavity, in particular above and almost coaxial with the die cavity in which the chamber 50 releases the polymeric dose D.

The movement of the chamber 50 is relative, that is to say that the movement may occur following a shift of the chamber whilst the plastics supplying means is stationary and whilst the die moves, or according to other and different combinations of movements.

During the phase in which the transfer chamber 50 receives the dose D from the dispensing outlet 11, the upper wall 53 is in open position, whereas the lower wall 52 is in closed position. In the phase in which the transfer chamber 50 releases the polymeric dose to the die cavity, the upper wall 53 is in closed position, whereas the lower wall 52 is in open position. In said phase in which the transfer chamber 50 is in the position P2 to effect the descent of the polymeric dose D into a die cavity, when the lower base wall 52 is open, whilst the upper base wall 53 is kept shut, the pressurised gas emitted into the chamber 50 through the walls 51 and 52 produces a "shot" effect that quickly and effectively pushes the dose D inside the die below.

As shown in FIG. 26, alternatively to the porous wall, walls in non-porous materials can be provided, in which nevertheless numerous small holes 57 can be provided, such as to permit the passage of fluid through the latter, said small holes 57 being distributed on the zone where contact with the polymeric dose D occurs. For example, these holes 57 may have a helicoidal distribution to achieve the maximum cover possible on the contact zone. According to a further alternative, the porous wall is replaced by a wall made by means of a plurality of elements brought together in such a way that the latter give rise to a plurality of relatively thin mutual separation lines, which are shaped and distributed in a suitable manner on the contact zone and through which the fluid is made to flow.

This disclosed favourable effect produced by the gap filled with fluid is further accentuated by thermally conditioning the fluid sent between the contact surface and the polymeric dose D, in such a way as to lower the temperature of the surface of the polymeric dose D and/or of the contact surface.

For this purpose, means can be provided (not shown in the Figures) suitable for thermally conditioning the fluid or gas in such a way as to lower the temperature thereof. In such a case, the gap filled with gas formed between the internal surface of the transfer chamber 50 and the external surface of the polymeric dose D also produces an effective heat-exchange with the mass of the walls 52 and 51 and with the external surface of the polymeric dose D, which heat-exchange can be used to promote the flowing of the polymeric dose D. The cooled fluid, by passing through the wall, or simply brushing against both the contact surfaces 51b and 52b and the surface of the polymer dose D, at least superficially lowers the temperature thereof, thus increasing the viscosity of the polymeric dose D, thus diminishing the adhesion of the plastics. In fact, it has been discovered that if contact time increases (passing from microseconds to milliseconds) then the wall temperature has to be decreased to prevent adhesion. In the case disclosed above in which the contact surface is placed on a wall made of porous material, or anyway if the fluid crosses relatively narrow openings, the fluid has in itself a favourable "cooling effect" due to the expansion of the latter when exiting, in the passage through the wall. Obviously, the temperature of the fluid is adjusted in such a way as to avoid excessive, even if localised, cooling of the polymeric dose D such as to produce microcrystalisation of the material or anyway germs of irregularity in the material. In any case, the cooling effect on the polymeric dose produced by the fluid is completely different from that achieved through direct, relatively prolonged, physical contact of the dose with the contact surface of the handling means of the doses. In fact, in the former case there is a sort of microcooling that affects only the most superficial layer of the plastics dose D and it is distributed over the entire surface thereof in a regular and homogenous manner. On the other hand, in the case of contact between the polymeric dose D and the handling means, there is a strong and relatively deep cooling limited to a relatively small portion of the dose, with deleterious consequences for the formed item, as mentioned previously.

Alternatively, the gas may be sent inside the transfer chamber 50 with a flow that is directed tangentially to the contact surface 52b, 51b in such a way that a gap is created that brushes against the surface. The presence of pressurised gas in the chamber 50 also has an important advantageous effect in the phase in which the transfer chamber 50 is in the portion T1 to carry out the descent of the polymeric dose D into the cavity of a die 21. When the lower base wall 52 is open, whilst the upper base wall 53 is kept shut, the pressurised gas emitted into the chamber 50 through the walls 51 and 53 produces a "shot" effect that rapidly and effectively pushes the dose D inside the die cavity below. This favourable effect is obtained by sending gas inside the chamber 50 in different ways, for example, as disclosed above, by providing the porous wall 51. This effect may be increased by sending gas through one or more openings 57, shown in FIG. 26, also provided in the upper base wall 53. Said gas is used to push the polymeric dose D downwards, inside the die cavity.

Alternatively, said effect is obtained by also making the upper base wall 53 of porous material and sending the gas through the latter to the chamber 50. In detail, as shown in FIG. 25, a second base wall 53' is provided that is external and placed above the wall 53 and is united to the latter along the external edge. Between the two walls 53 and 53' a thin upper chamber 53a is defined that extends over the entire extent of the base wall 53, which in turn is connected to the means suitable for sending pressurised gas into the chamber 53a and from there through the porous wall 53, into the transfer chamber 50, in the phase in which the lower base wall 52 is open.

Alternatively, as shown in FIG. 26, one or more openings 57 can be provided in the upper base wall 53, also of a significant diameter, to send the fluid to the chamber 50 in order to push the polymeric dose D downwards.

FIG. 27 shows a version of the transfer chamber 50 that is substantially the same as that of FIG. 25 from which it differs by the fact that the upper base wall 53, instead of being porous, presents one or more openings 57, also of significant diameter, for sending the fluid into the chamber 50 and pushing the polymeric dose D downwards.

Figure 32:
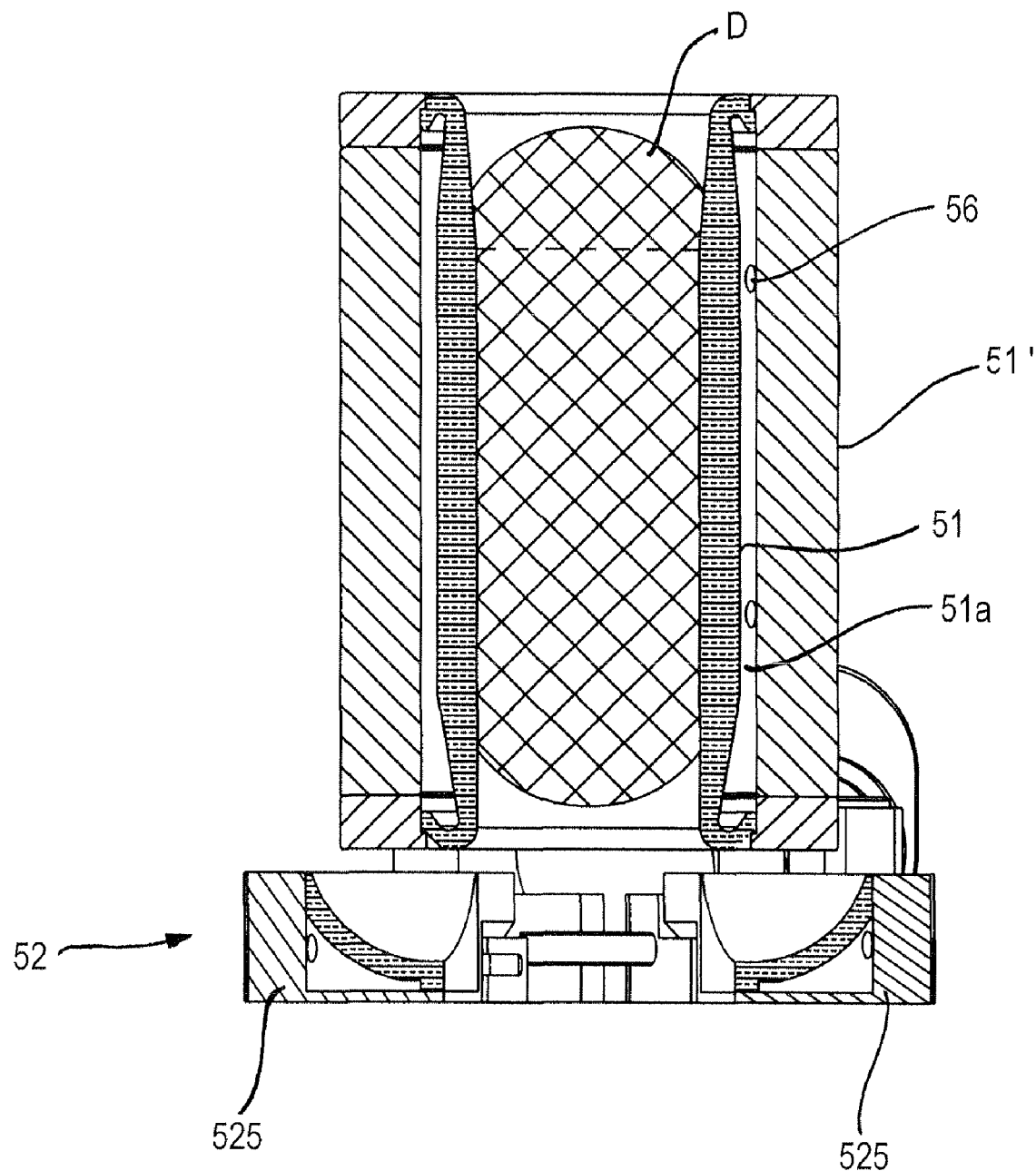
FIG. 32 schematically shows an axial section of another version of the first transfer means in FIG. 2.

The version shown in FIG. 29 is substantially similar to the transfer chamber 50 in FIG. 26, from which it differs by the fact that the lower base wall 52 is not porous, but, like the side wall 51, is provided with numerous small holes or with a plurality of thin separation lines for the passage of the fluid. The upper base wall 53 has one or more openings 57. Alternatively, as shown in FIG. 32, the upper base wall 53 may not be provided. In such a case, as the polymeric dose D has dimensions, especially diameter dimensions, that are less than or the same as those of the cavity of the die 21, the polymeric dose D can drop by gravity inside this cavity.

In the version in FIG. 32 the lower base wall 52 is not a monobloc but consists of two elements 525 that are rotatable in relation to the side wall 51 around respective pivots, having vertical axis, connected to the wall 51. The two elements 525, when rotated until they are brought together to a closed position, occlude the outlet of the chamber 50 and form the porous wall 52. On the other hand, the two elements 525, when rotated towards the exterior to an open position, enable the dose D to exit.

Figure 37:
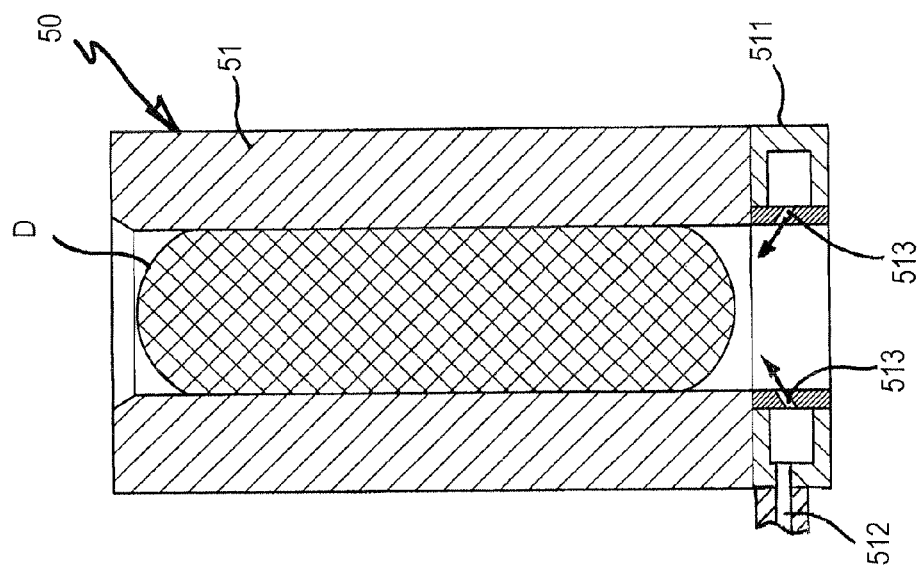
FIG. 37 is a further version of the first transfer means in FIG. 34.

Also the lower wall 52 may not be provided. In this case, as shown in FIG. 37, the lack of the lower wall 52 can be compensated with particular methods of gas dispensing such that the gas keeps the polymeric dose D suspended, preventing the descent of the latter from the transfer chamber. This action is obviously stopped when the polymeric dose D has to be made to descend into the die cavity. In particular, in FIG. 37 there is shown a chamber 50 in which the side wall 51 is continuous and non porous. The chamber 50 is devoid of a lower base wall and to prevent the descent of the polymeric dose D pneumatic support means is provided, comprising a looped conduit 511, located under the lower edge of the side wall 51, around the lower outlet of the chamber 50, without hindering the exiting of the polymeric dose D. The conduit 511 is supplied by one or more inlets 512 with a pressurised fluid in such a way as to generate, through suitably orientated openings 513, jets of fluid directed upwards to inside the lower outlet of the chamber 50. By suitably calibrating the pressure of the emitted fluid it is possible to keep the polymeric dose D suspended inside the chamber 50, preventing the dose D from descending through the lower outlet. Naturally, the supply of fluid to the conduit 511 is dispensed when it is desired to stop the descent of the dose D and, vice versa, the supply is interrupted when it is desired to achieve the descent of the dose D.

The fluid can be suitably directed in such a way as to also create a gap filled with fluid to prevent the adhesion of the dose D to the contact surfaces.

Figure 30:
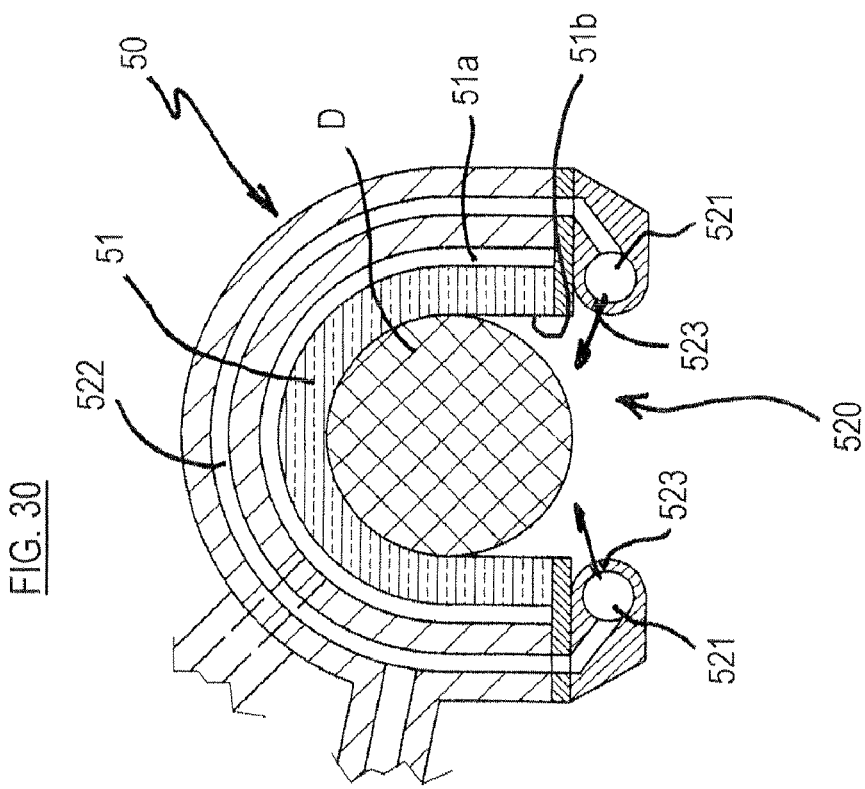
FIG. 30 schematically shows an axial section of another version of the first transfer means in FIG. 2.
Figure 28:
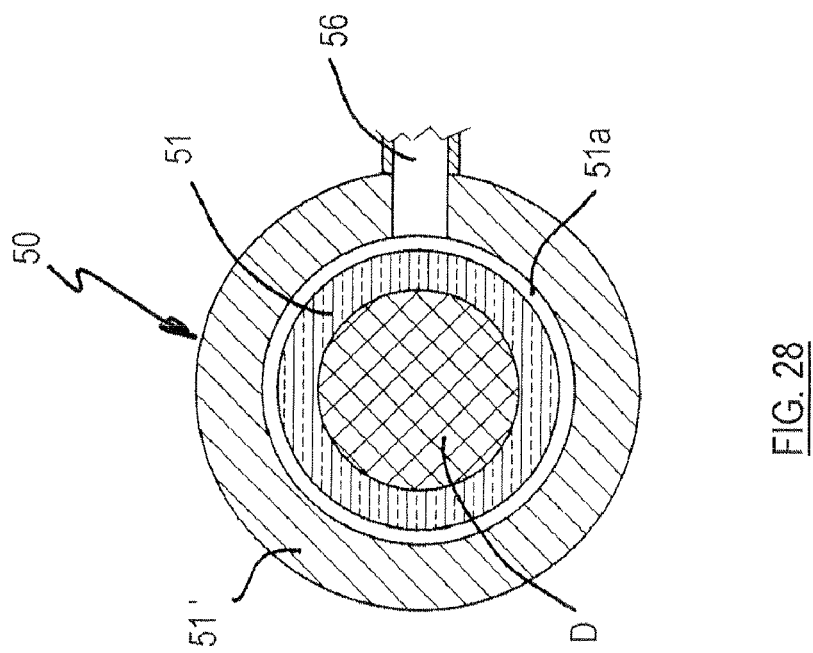
FIG. 28 is a section according to plane XXVIII-XXVIII of FIG. 27.

According to an embodiment of the transfer means suitable for conditioning the shape of the polymeric dose D and shown in FIG. 30, the concave side wall 51 that delimits the transfer chamber 50 has a side opening 520, for example for inserting the dose D sideways. The chamber 50 comprises pneumatic forming means suitable for emitting a pressurised fluid directed to the internal surface 51b of the side wall 51, against the dose D through the side opening 520 to condition the shape of the dose. In particular, the side wall 51 of the chamber 50 has a "U"-shaped cross-section and, at the two free ends, it has two vertical conduits 521 connected by channels 22 to a pressurised fluid source, that is not shown. The vertical conduits 521 are provided with several openings 523 suitable for emitting jets of fluid towards the opening 520. In this way, the polymeric dose D is conditioned both by the contact, with interposition of the layer of fluid, with the side wall 51 and by the dynamic action of the fluid emitted by the openings 523.

According to a different embodiment for conditioning the shape of the polymeric dose D, shown in FIG. 26, pneumatic forming means is provided that is suitable for emitting pressurised fluid into the transfer chamber 50, acting on the side surface of the polymeric dose D, to condition the geometrical shape thereof. The transfer chamber 50 is substantially the same as that of FIG. 25, nevertheless, instead of being porous the wall 51 has a plurality of holes 57 with a greater diameter than the pores, through which the pressurised fluid, for example air, is inserted into the internal cavity 50a, which fluid is directed against the side surface of the polymeric dose D in such a way as to condition the shape of the latter. In particular, the diameter of the cross-section of the dose D is reduced in such a way as to make the latter suitable to descend into the cavity of the die 21 without coming into contact with the walls thereof.

Owing to this solution, it is possible to condition the shape of the dose D in an adjustable manner, varying only the features of the fluid inserted into the chamber 50, without changing the geometrical features of the latter. The same holes 57 can also be provided on the upper base 53, but above all for the purpose of pushing downwards the polymeric dose D, in the transfer thereof to the die cavity.

Figure 33:
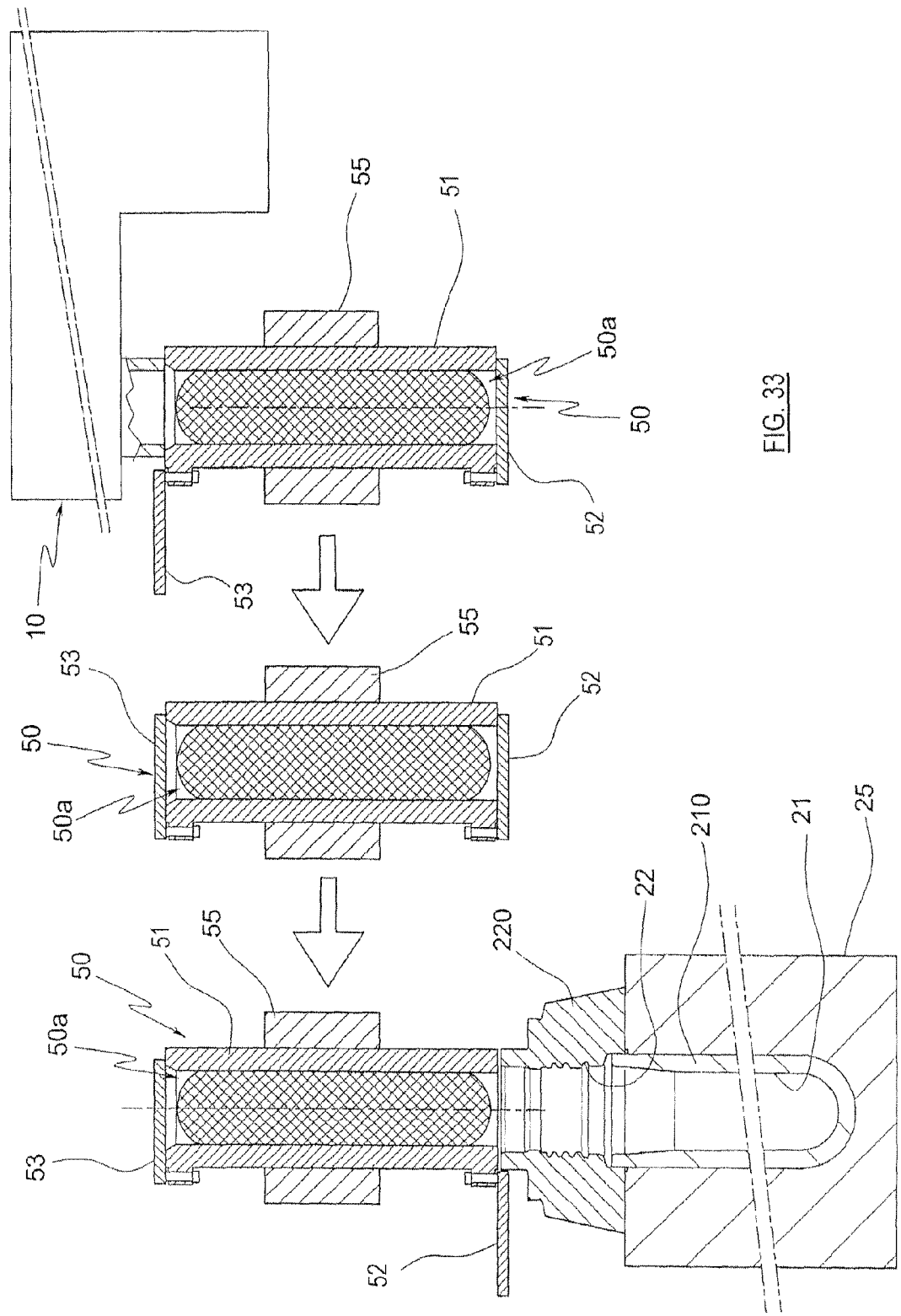
FIG. 33 shows schematic and section views according to a vertical axial plane of a sequence of phases implemented by another embodiment of the transferring means to transfer doses of plastics from a dispensing means to the forming means.
Figure 34:
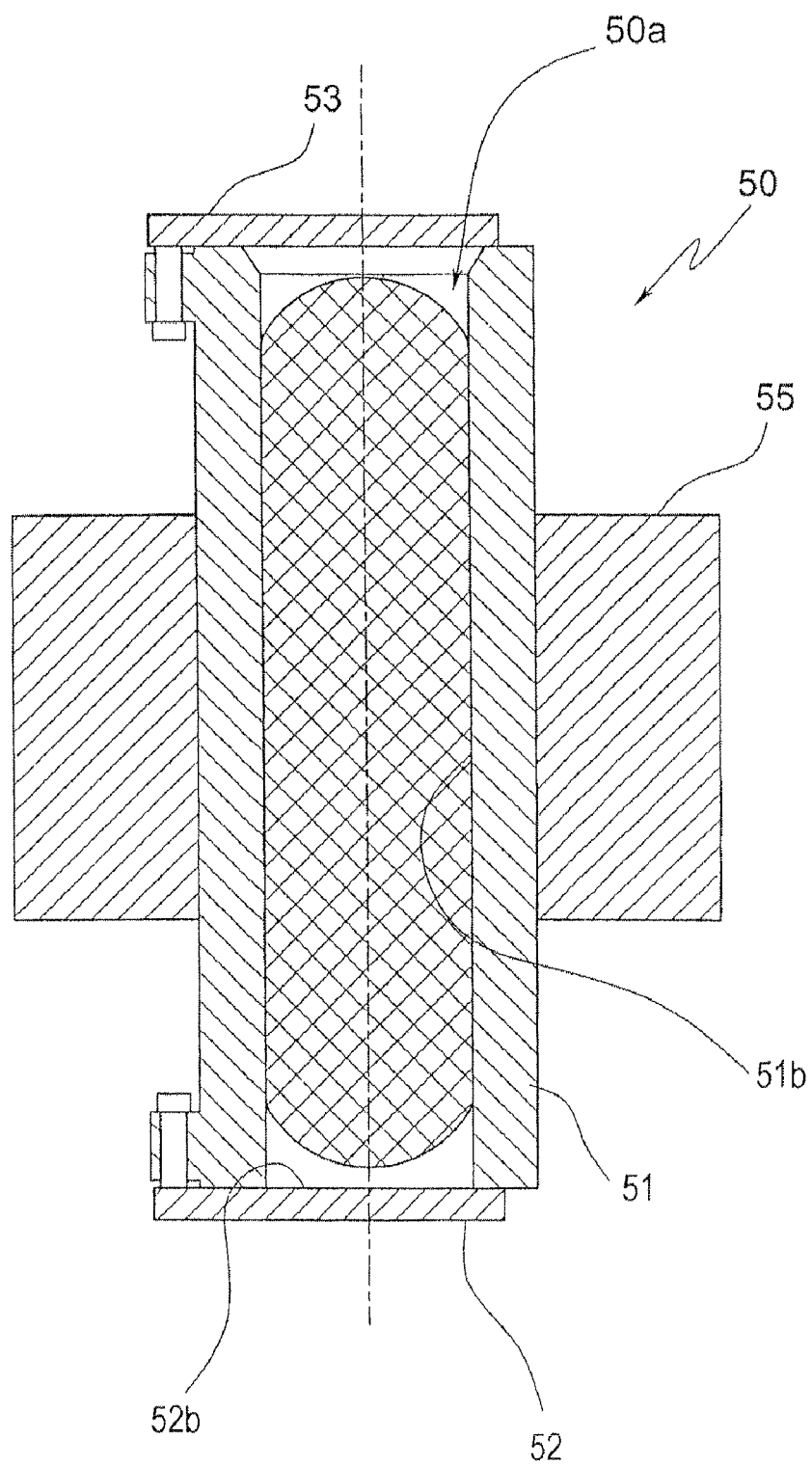
FIG. 34 is a view on an enlarged scale of the first transfer means in FIG. 32.

In the transfer chamber 50, shown in FIGS. 33 and 34, anti-adhesion means is provided to totally or partially reduce adhesion between the polymeric dose D and the internal surface of the transfer chamber 50.

In this case, the chamber 50, and in particular the internal surfaces 51b, 52b thereof, are vibrated at frequency values such as to prevent or at least partially reduce the macroscopic adhesion effect between the polymeric dose D and the internal surfaces. It has in fact been found that, with suitable vibration values, even if the plastics are sticky, even if the plastics produce adhesion points at the microscopic level, nevertheless these adhesion points have a very small extent and above all remain for an extremely short time, so that the macroscopic force of adhesion between the material and the contact surface is relatively very small and the adhesion phenomenon between such a contact surface 51b and the polymeric dose D is drastically reduced. In detail, in the embodiment shown in FIGS. 33 and 34, to the external surface of the transfer chamber 50 vibration generating means 55 is applied suitable for vibrating the transfer chamber 50 at frequency values such as to avoid or at least reduce the effect of adhesion between the polymeric dose D and the internal surface 51b, 52b.

Excellent results have been obtained by vibration excitation acting on the plane perpendicular to the vertical axis of the transfer chamber 50, with frequency of 300 pulses per second in the case of PET plastics.

A further embodiment of the transfer chamber 50, not shown in the Figures, provides, in order to completely or partially reduce the adhesion between the polymeric dose D and the internal surface of the transfer chamber 50, a thin layer of anti-adhering coating placed to cover the internal surface of the cavity 50a of the chamber 50, said thin layer being of material having anti-adhesion properties with regard to the polymeric dose D, for example a PTFE (Teflon®), the external surface of which defines said contact surface with the polymeric dose D.

Figure 35:
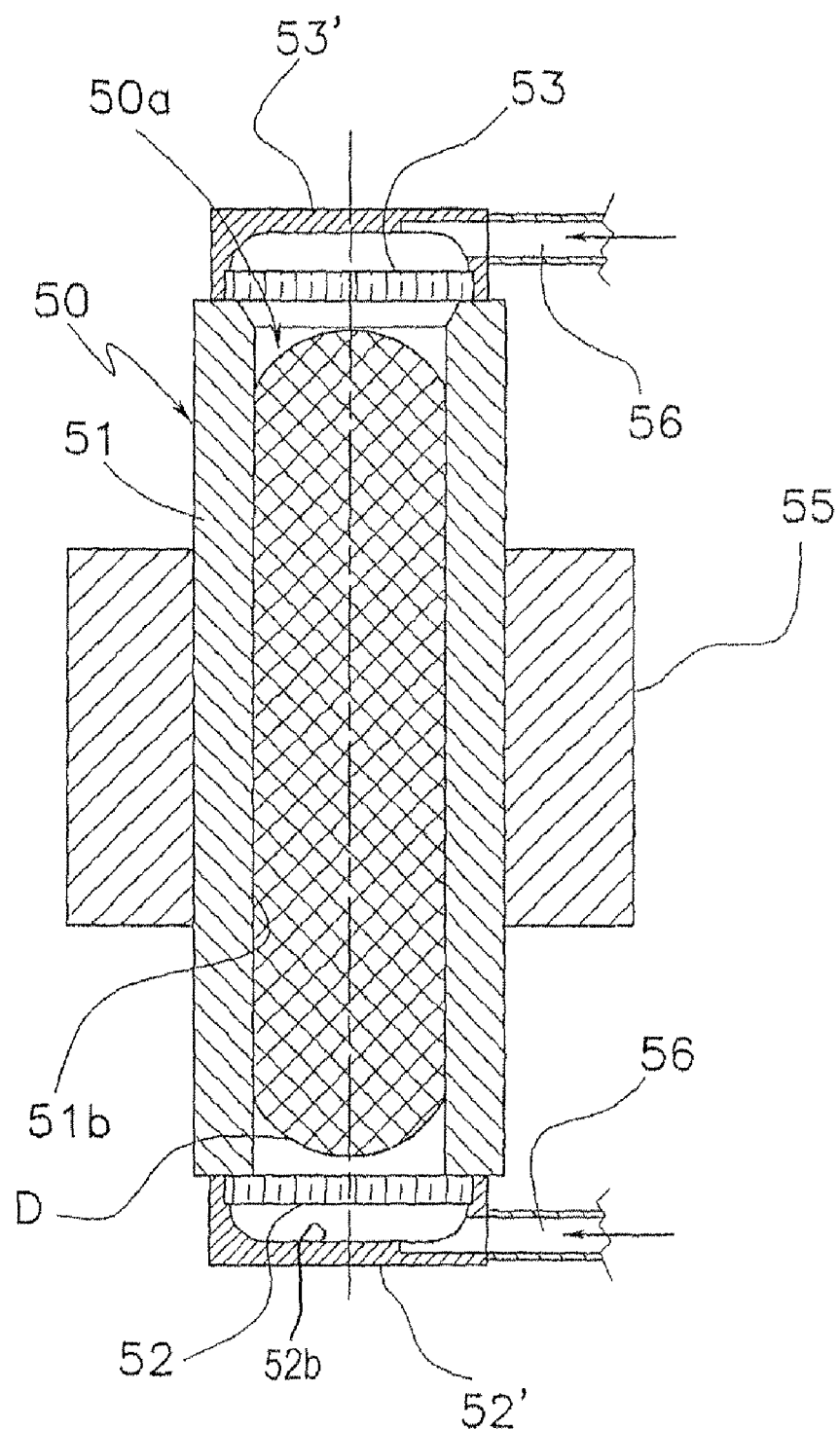
FIG. 35 is a version of the first transfer means in FIG. 34.

The version of the transfer chamber 50 shown in FIG. 35 differs from that in FIG. 34 through the fact that the base walls 52, 53 are porous to enable the passage of the fluid or gas through the thickness thereof.

Figure 36:
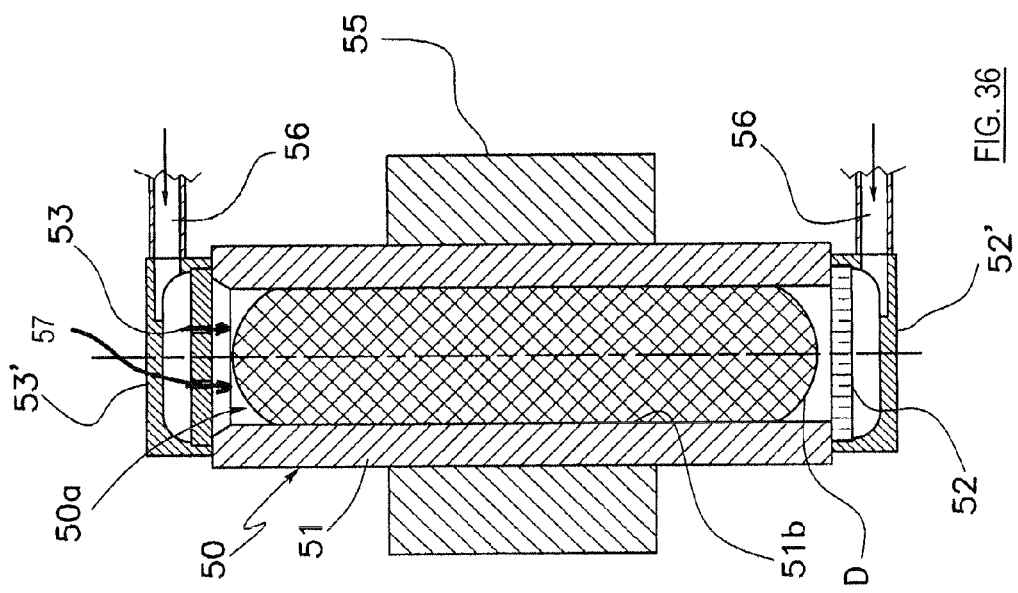
FIG. 36 is another version of the first transfer means in FIG. 34.

The version in FIG. 36 differs from FIG. 35 through the fact that the upper base wall 53 is not porous but has one or more openings 57 for the passage of the fluid.

Figure 38:
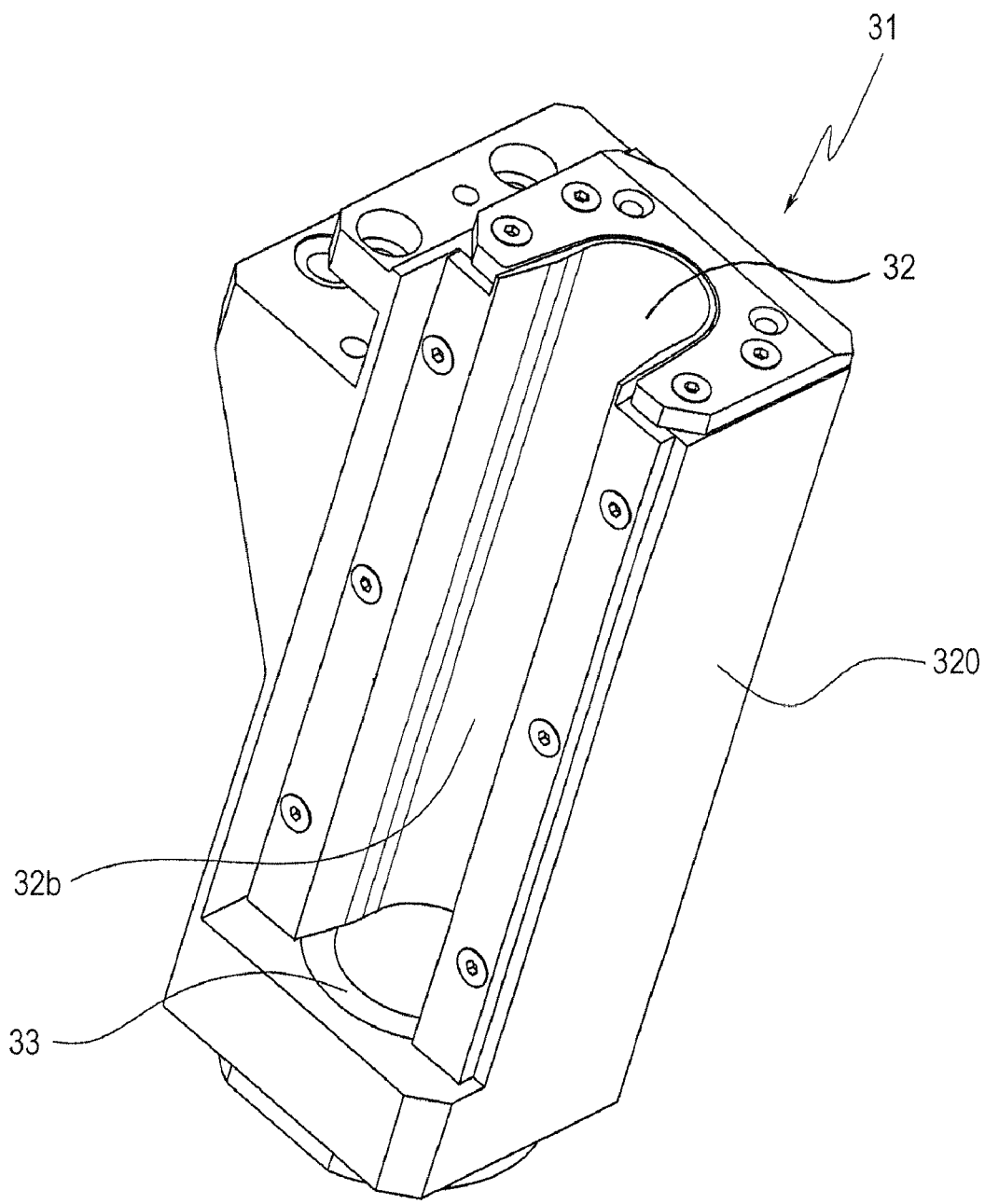
FIG. 38 is a perspective view of the second transfer means of the apparatus in FIG. 2.
Figure 40:
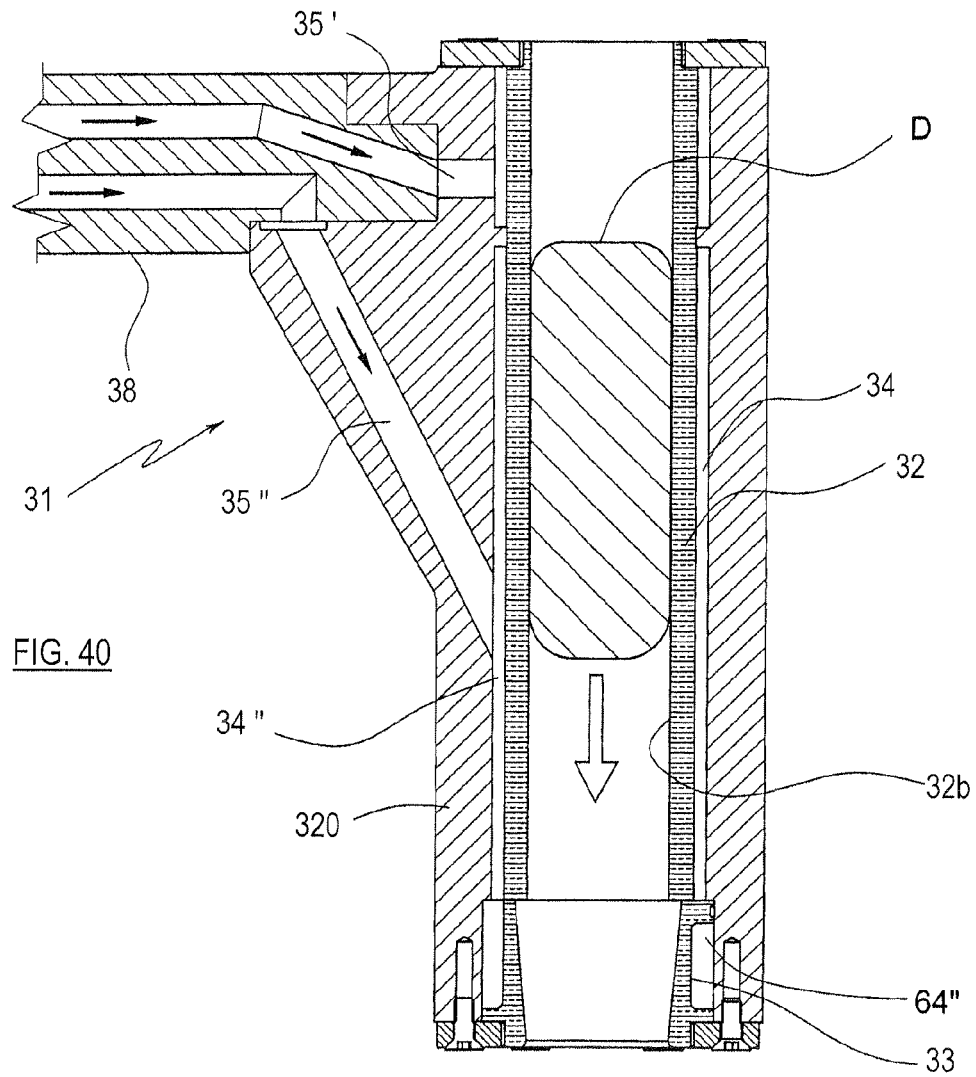
FIG. 40 is the section according to the plane XL-XL in FIG. 39.
Figure 39:
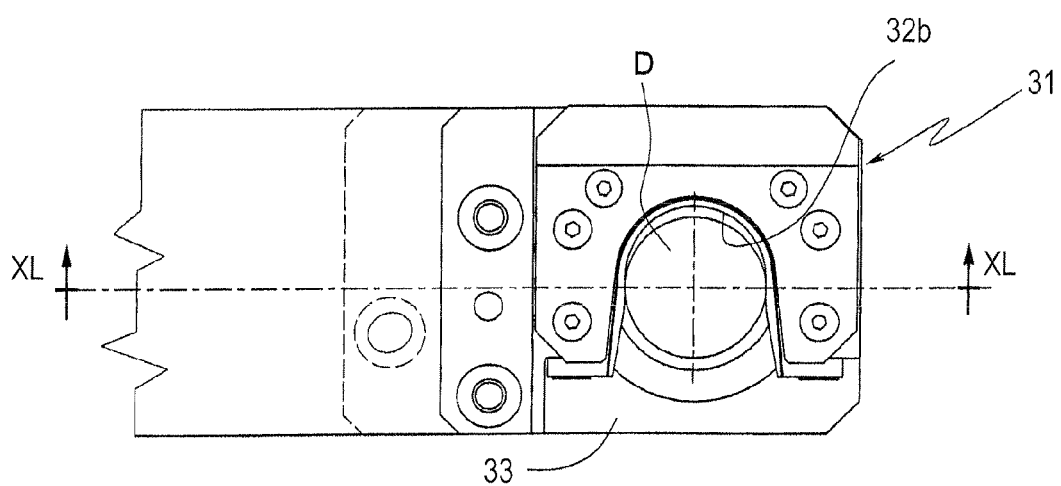
FIG. 39 is the plan view from above of FIG. 38.

According to the embodiment of the means 31 illustrated in FIGS. 38, 39 and 40, the handling means comprises anti-adhesion means for completely or partially reducing adhesion between the dose D and the internal surface 32b with which the dose D comes into contact.

The means 31 comprises a curved wall 32 open on a side, the internal surface of which defines the contact surface 32b. The lower end part 33 of the wall 32 is circular and closed and has an axial section that slightly converges downwards.

The means 31 comprises dispensing means suitable for forming a gap or layer of fluid, for example gas, along the internal surface 32b to reduce completely or partially the adhesion effect between the dose D and the internal surface.

In particular, the curved wall 32 (including the lower part 33 thereof) is porous in such a way as to enable the passage of gas through it and furthermore comprises a second tubular wall 320 that is outside and coaxial with the curved wall 32, the lower and upper ends of the second tubular wall 320 being joined to the curved wall 32. Between the two walls 32 and 320 a chamber 34 is defined that surrounds the curved porous wall 32 and extends along the entire length or almost the entire length thereof, said chamber 34 being connected with means 38 (shown only partially in FIG. 40) suitable for sending pressurised gas inside the chamber 34, which gas exits at the contact surface 32b.

The chamber 34 is divided into an upper part 34' and a lower part 34" respectively supplied by a conduit 35' and by a conduit 35", which conduits are separated in such a way as to enable the delivery into the two chamber parts 34 of fluids having different pressure features in order to be able to better control the descent of the dose D.

Excellent results were obtained with a wall 32 formed with a porous material having the features disclosed above with regard to the transfer chamber 50. Furthermore, similarly to what has been said above, means can be provided, (not shown in the Figures) suitable for thermally conditioning the gas in such a way as to lower the temperature thereof, with the features and results disclosed above.

Alternatively, the gas can be sent to the contact surface 32b by a flow directed tangentially to the surface so that a gap develops that comes into contact with the surface.

The gap filled with fluid between the contact surface 32b of the handling means 31 and the polymeric dose D produces the favourable effects disclosed above with regard to the transfer chamber 50.

Figure 41:
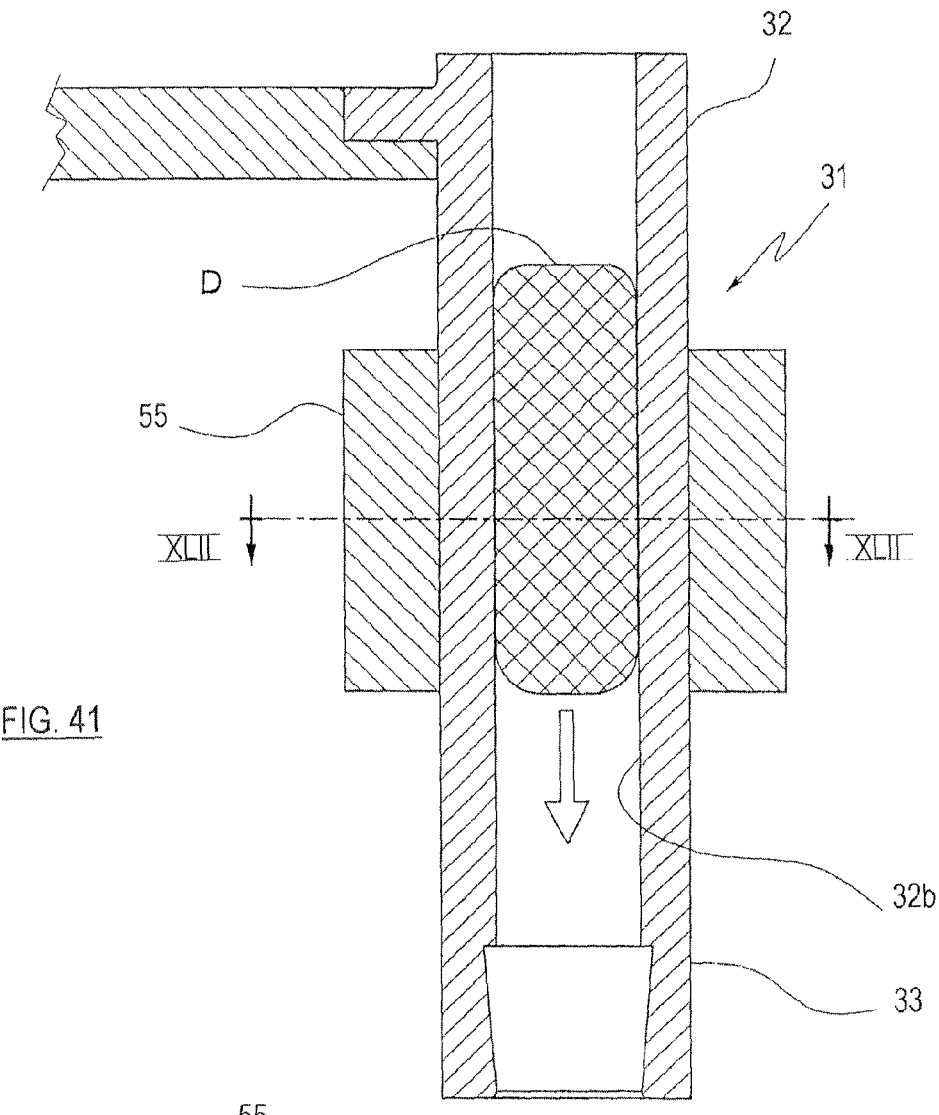
FIG. 41 is an axial section view of a version of the second transfer means in FIG. 38.
Figure 42:
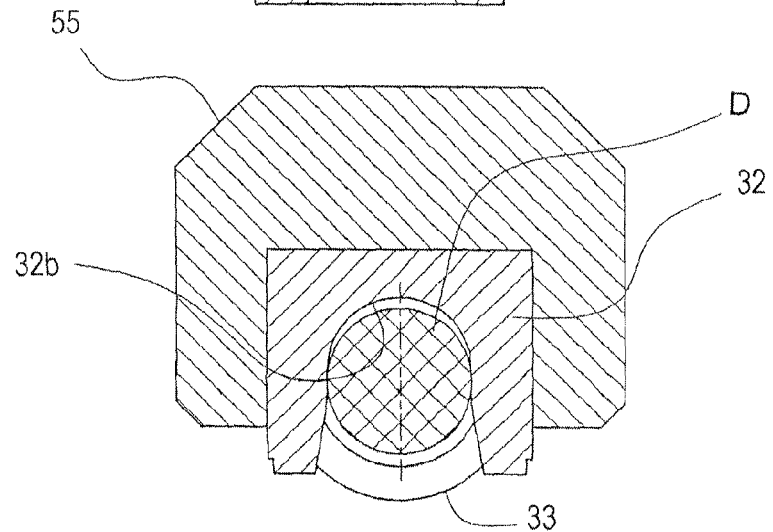
FIG. 42 is a section according to plane XLII-XLII of FIG. 40.

FIGS. 41 and 42 show an alternative embodiment of the anti-adhesion means to reduce completely or partially the adhesion between the dose D and the internal surface 32b of the handling means 31. The handling means 31, and in particular the internal surface 32b thereof, are vibrated at frequency values such as to avoid, or at least to partially reduce, the macroscopic adhesion effect between the dose D and the internal surface.

In detail, in the embodiment shown in FIGS. 41 and 42, to the external surface of the handling means 31 vibration generating means 55 is applied suitable for vibrating the curved wall 32 at frequency values such as to prevent or at least reduce the adhesion effect between the dose D and the internal surface 32b.

Alternatively, to reduce completely or partially adhesion between the dose D and the internal surface 32b of the handling means 31 a thin coat layer is provided that is placed on the internal surface of the curved wall 32, said thin layer being of material having anti-adhesion properties with regard to dose D, for example PTFE (Teflon®), the external surface of which defines said contact surface with the dose.

FIGS. 65-70 shown an apparatus comprising a doses dispensing means 10 suitable for delivering the plastics doses out of a dispensing outlet or port 11 located in a lower position, that is on a lower face 12 of the dispensing means 10.

The plastics are first heated to a suitable temperature such as to take the plastics to a more or less viscous liquid state so that they can assume sufficient mobility, for example to a temperature around 300° C. in the case of PET. The plastics are then made to advance by pressure along a channel 130 inside the dispensing means 10, which takes them to the dispensing outlet 11.

The dispensing means 10 furthermore comprises a shutter 14 suitable for separating a quantity of material that defines a dose D from the downstream end of the extruded body M of viscous liquid material dispensed along the channel 130.

In particular, according to the embodiment shown in FIGS. 65-70, the shutter 14 has the form of a vertically movable piston fitting inside a cylindrical and vertical cavity 150 that terminates on the lower face 12, the lower end of which defines the dispensing outlet or port 11. The channel 130 terminates in the cavity 150 at a point 131 located just upstream of the outlet 11. The shutter 14 is normally placed above the point 131 in such a way as to let the material exiting from the point 131 flow and descend through the lower portion of the cavity 150. By making the shutter 14 flow downwards beyond the point 131, the extruded body M is intercepted and a final end portion is separated therefrom that constitutes a dose to insert into the die cavity.

The die 21 shown in the Figures is operated by a moulding device and is intended to form preforms suitable for subsequently making, typically by blow-forming, bottles in thermoplastic resin (in particular in PET). These preforms comprise a neck, having the final shape provided in the bottle, and a hollow body intended, during the phase of manufacture of the bottle, to form the container body of the bottle. In such a case, the die is formed of a concave lower part 210 and of an upper part 220 with a through cavity. The lower part 210 has a substantially cylindrical concave and smooth surface 211 that gives the shape to the external surface of the hollow body of the preform, whereas the upper part 220 has complicated surfaces 221 that give the shape to the external surface of the neck. As the latter is provided of radial projections, said upper part 220 is divided into at least two half parts (in the shown case there are two) suitable for being transversely moved from one another to free the preform. The two concave surfaces 211 and 221 form the cavity of the die 21.

Obviously, the invention can also be used with dies in which the cavity has a different shape, for example if said upper part 220 is missing and the lower part 210 has a simpler shape. The die is carried by a body 25 that is typically driven by a moulding carousel (not shown in the Figures) comprising a plurality of continuously driven dies. The body 25 and the corresponding die can be connected to the carousel, or can be disconnected from the latter and be moved by the carousel during some phases of the working cycle and for other phases they can be separated from the carousel; in the latter case the dies are carried by shuttles.

An inserting means 300 is provided having a passage conduit 310 for the doses, which is tubular-shaped and provided with an inlet 310a at the upper end and with an outlet 310b at the lower end.

The passage conduit 310 is suitable for being associated at the inlet 310 thereof with the dispensing outlet 11 of the dispensing means 10. In particular, in the embodiment shown in FIG. 65, the upper end of the conduit 310 is fixed against the lower base of the dispensing means 10 and the dispensing outlet 11 matches the inlet 310a.

The lower portion 311 of the conduit 310 on which the outlet 310b is placed is suitable for being inserted into the die cavity for a significant portion of axial length of the latter. Said portion 311 may affect almost the entire axial length of the conduit 310.

The method in question essentially provides that the passage conduit 310, together with the dispensing means 10 the outlet 11 of which is associated with the inlet 310a, is inserted, at least with the lower end portion, inside the die cavity for a significant portion of axial length of the passage conduit, and through the latter said dose is made to descend and is finally released inside the die cavity through the outlet of the conduit passage.

Figure 65:
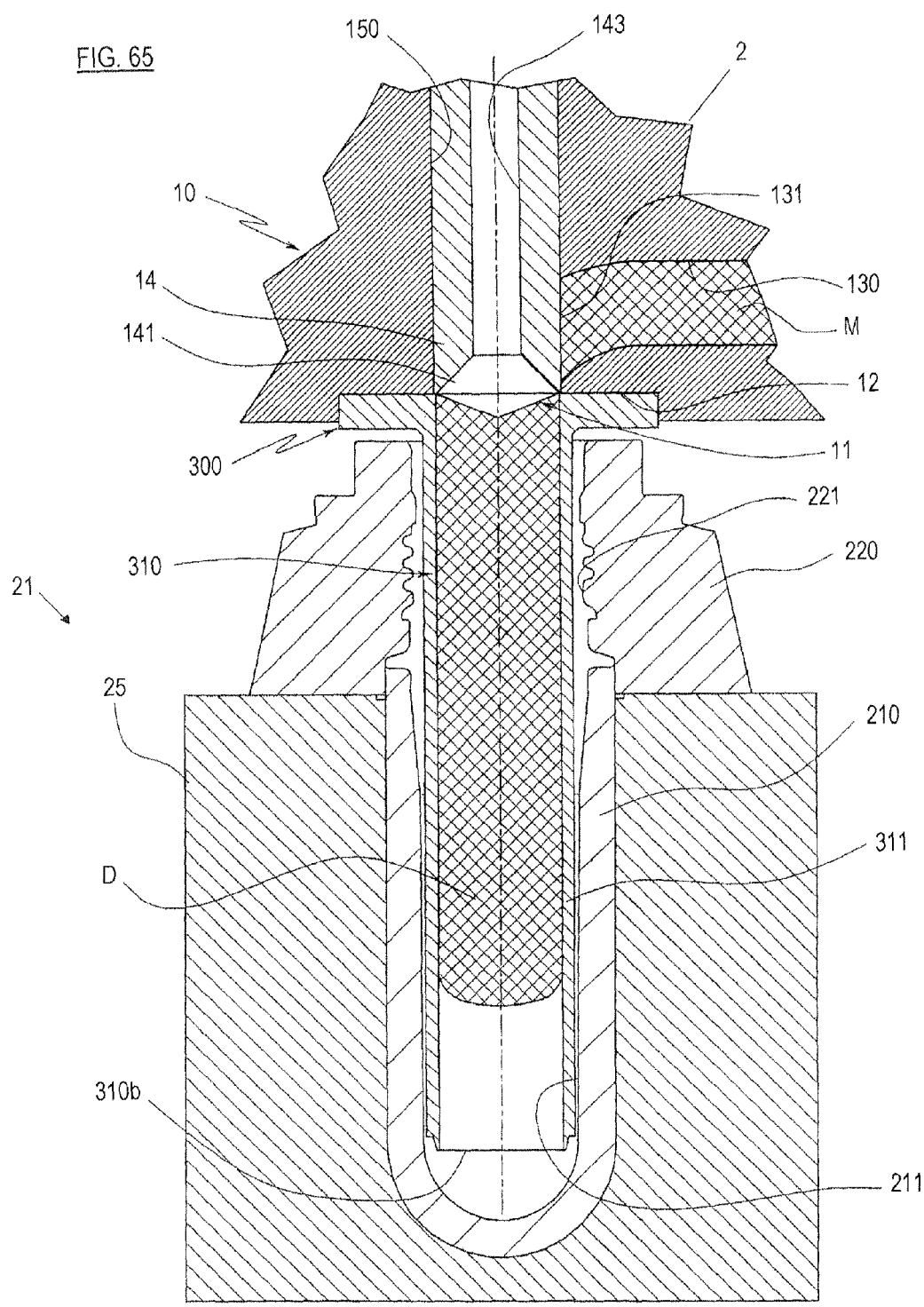
FIG. 65 shows an axial section of an inserting means of a dose of plastics supplied by a dispensing means to a forming means.

FIGS. 66 to 70 show a sequence of phases followed by the apparatus in FIG. 65 as the apparatus inserts a dose into a die cavity according to a first embodiment.

Figure 67:
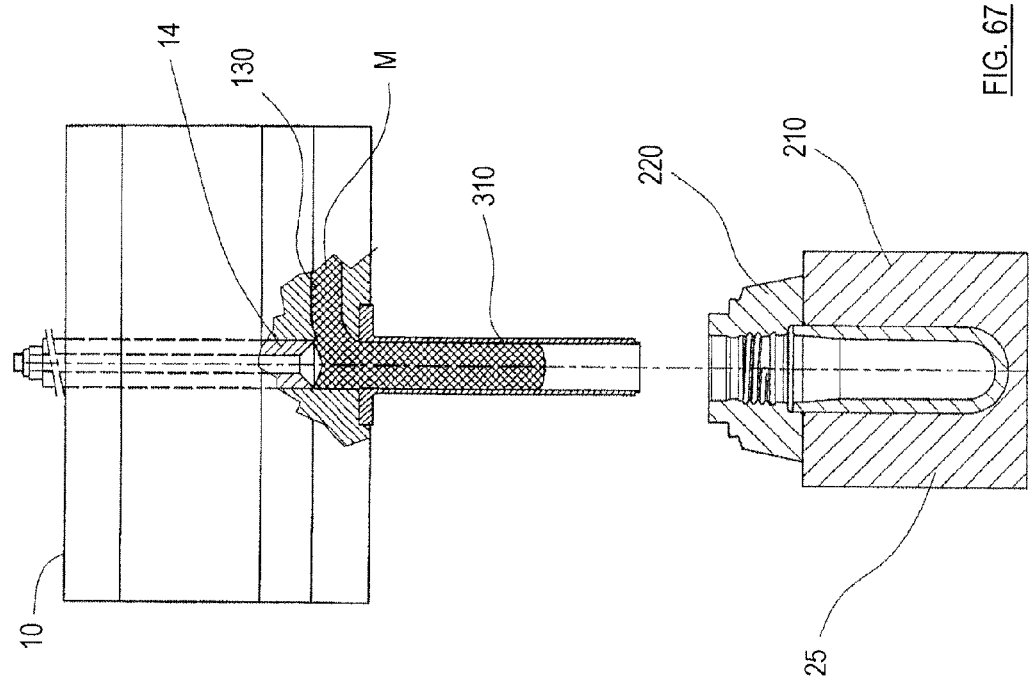
Figure 66:
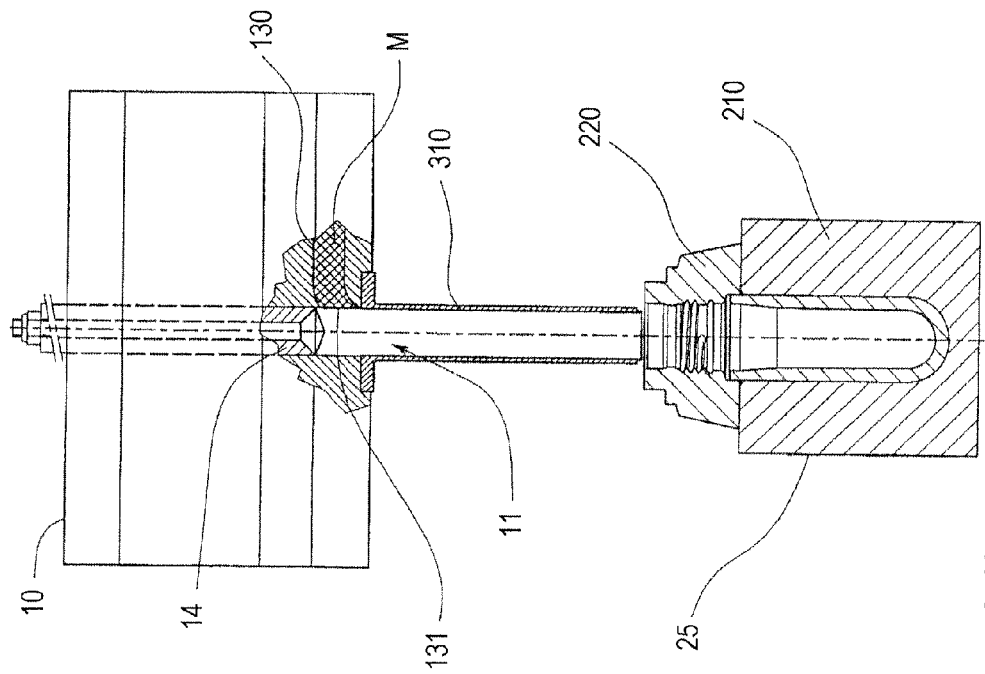

The passage conduit 310 is first brought to a die cavity so that the axes of the passage conduit 310 and of the die cavity substantially coincide (FIG. 66). Then, the die and the dispensing means 10 are vertically moved relative to each other in such a way that the lower portion 311 of the passage conduit 310 is positioned into the die cavity (FIGS. 67, 68 and 69). In the example shown the dispensing means 10 keeps at a constant level whilst only the die moves vertically. Alternatively, the dispensing means 10 can be moved vertically, or both can be moved.

The extruded body M is advanced along the channel 130 (FIG. 66), then also along the lower end portion of the vertical cavity 150 and finally along the passage conduit 310 (FIG. 67). When the portion of extruded body M placed below the point 131 has reached a preset length, the shutter 14 is made to descend, which intercepts the extruded body M separating the lower end portion thereof, which defines a plastics dose D (FIG. 68).

Subsequently, (FIG. 69) the material descends along the conduit 310 until the outlet 310b of the latter is reached. At this point, during the exiting of the dose D from the outlet 310b of the conduit 310, the conduit is removed from the die cavity with a movement that is substantially the same as and opposite the descent movement of the dose D in relation to the conduit (FIG. 70). Lastly, the conduit 310 is taken completely outside the die cavity, returning to the start position of the cycle position shown above (FIG. 66).

As already seen, the dose D thus flows accompanied by the passage conduit 310 to the bottom of the die cavity without coming into contact with the side surface of the latter, as is indeed desired.

The closer the outlet of the conduit 310 approaches the bottom of the die cavity the less are the risks that the dose D comes into contact with the side wall of the die and furthermore the position that the dose takes on inside the cavity is more correct.

However, if it is wished to reduce the relative vertical stroke between the group formed of the dispensing means 10 and of the inserting means 300 and the die, it is possible to reduce the length of the lower portion 311 that is inserted into the die cavity.

This length varies in such a case according to different factors, for example according to the geometry of the die cavity; the greater the ratio between the diameter and the axial length, the less the length of the portion 311 can be. Said length can vary according to the conditions of the movement of the die. If the die is stationary or is not subject to noticeable centrifugal thrusts the length of the lower portion 311 may be less.

In many cases, it is sufficient that the lower portion 311 penetrates for a portion that is the same as at least ⅓ of the axial length of the die.

If, as in the case shown in the Figures, the lower part 210 of the die has side walls having substantially vertical generatrices and the upper part 220 is provided with radial projections that are flush or almost flush to the lower part 210, then the lower portion 311 has an axial length such as to take the outlet 310b of the conduit at least beyond said upper part 220.

In general terms, it is preferable for the dose D to have a cross-section that is as close as possible to the cross-section of the die cavity. As a result, passage section of the conduit 310 can be as near as possible to the passage section of the die cavity, taking into account the mechanical resistance that the wall of the conduit 31 must have. Nevertheless, there must be a clearance because this wall has to run along the axial surface of the die cavity without coming into contact with the latter and furthermore to create a gap between the wall and the surface of the cavity along which it has to be possible to evacuate the air inserted into the die.

In the embodiment shown in FIGS. 66-70, the dose D, after being separated from the material exiting from the channel 130 by means of the shutter 14, descends the conduit 310 due to gravity.

Descent of the dose D can be forced by inserting a pressurised fluid, at a point upstream of the dose D placed inside the passage conduit 310, with a flow such as to favour the descent and the evacuation of the dose outside the outlet 310b of the conduit. Typically, the fluid is a gas, for example air, but can be a different gas, for example nitrogen, carbon dioxide or another gas.

In particular, it is the shutter 14 which, after separating a quantity of material that defines a dose D from the downstream end of the extruded body exiting from the channel 130, dispenses the pressurised fluid from the lower end surface thereof, for example when the apparatus is in the condition shown in FIG. 68.

Figure 71:
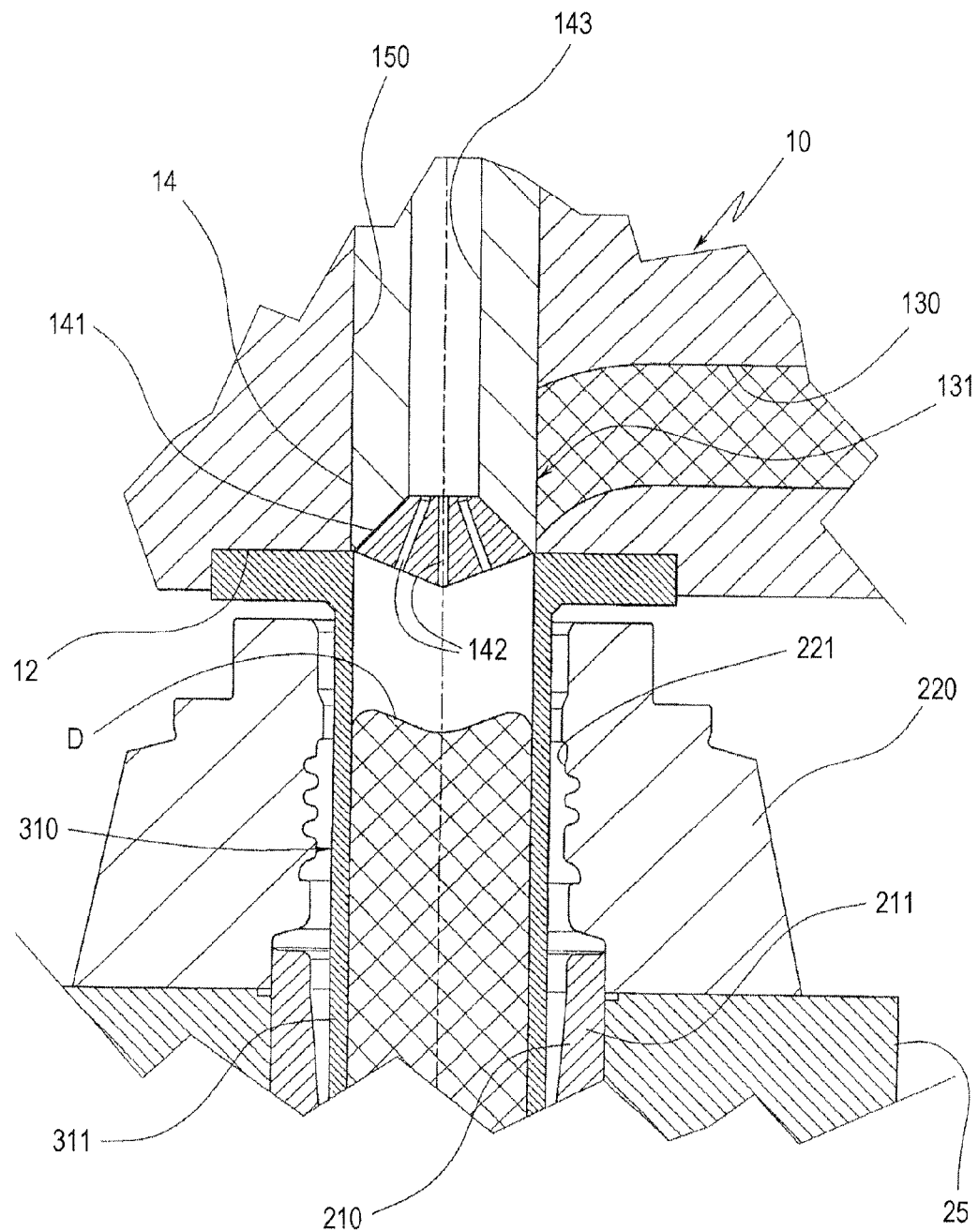
FIG. 71 shows an enlarged detail of a version of the dispensing means in FIG. 64.
Figure 75:
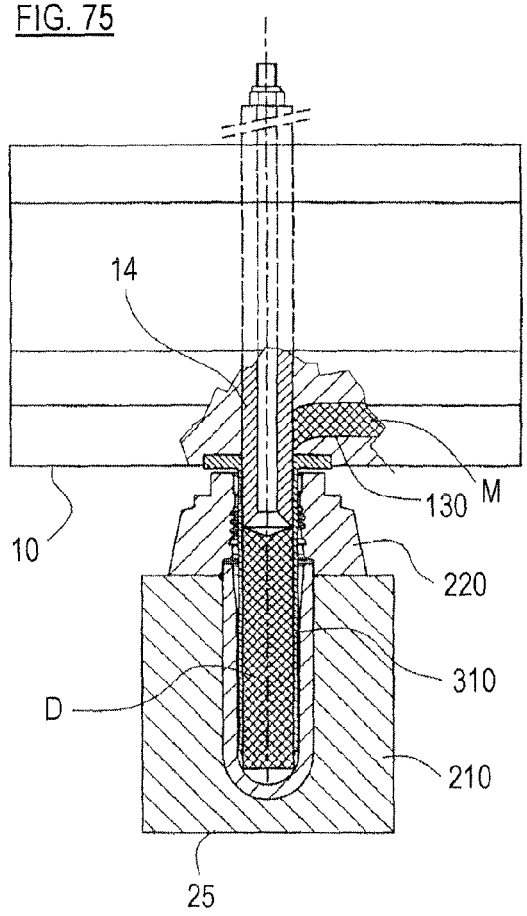

For this purpose, according to the solution shown in FIG. 71, the shutter 14 has a head 141 provided with relatively thin through holes 142 and an axial channel 143 connected with a source (not shown in the Figures) of pressurised fluid. The same effect and result can be alternatively obtained with variously shaped passage openings or through the use of porous materials supplied by said source.

Alternatively, in the embodiment in FIGS. 72-76, the descent of the dose D is forced by the shutter 14, that acts as a piston and pushes the dose along the conduit 310.

The first part of the dose inserting cycle (FIGS. 72, 73 and 74) is the same as the first part of the cycle disclosed above with reference to FIGS. 66, 67 and 68. The conduit 310 is taken to a die cavity in such a way that the axes of the conduit 310 and of the die cavity substantially coincide. Then, the die and the dispensing means 10 are vertically moved relative to each other in such a way that the lower portion 311 is positioned into the die cavity. At the same time, the material is advanced along the channel 130 (FIG. 72), then also along the passage conduit 310 (FIG. 73). The shutter 14 is then made to descend that intercepts the material, separating the lower end portion from the extruded body M, which defines a dose D of material (FIG. 74).

Figure 76:
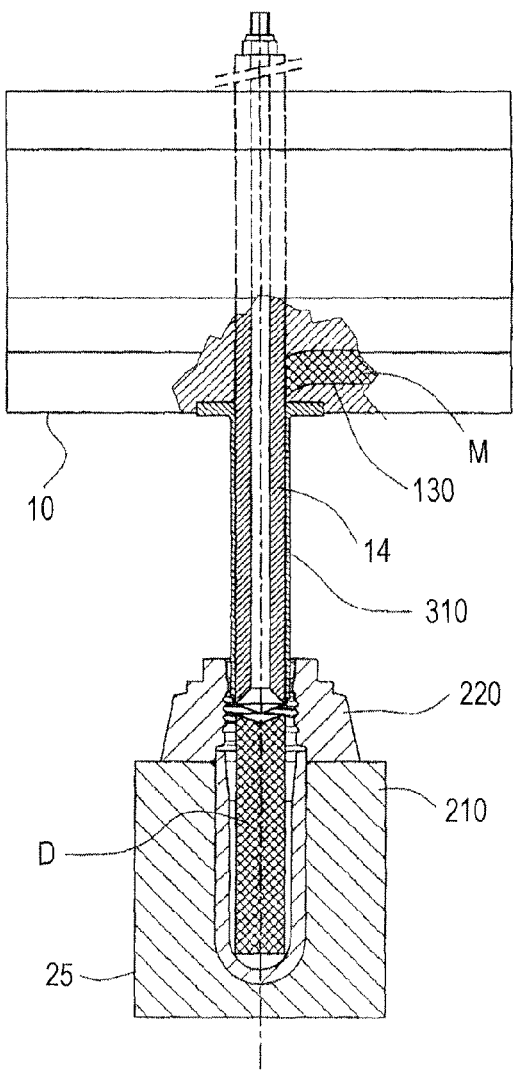

In the second part of the cycle, the shutter 14 descends along the conduit 310, pushing the dose D like a piston along the conduit 310 until the dose D is taken to the outlet 310b of the conduit 310. Subsequently, during exiting of the dose D from the outlet 310b of the conduit 310, the conduit 310 is removed from the die cavity with a movement that is substantially the same as and opposite the descent movement of the shutter 14 and of the dose D in relation to the conduit 310 (FIG. 76). Lastly, the passage conduit 310 is taken completely outside the die cavity and the shutter 14 returns to the start position of the cycle shown above (FIG. 72).

The shutter 14 can have finish, coatings and technical solutions that are suitable to prevent the shutter 14 from adhering to plastics.

Figure 77:
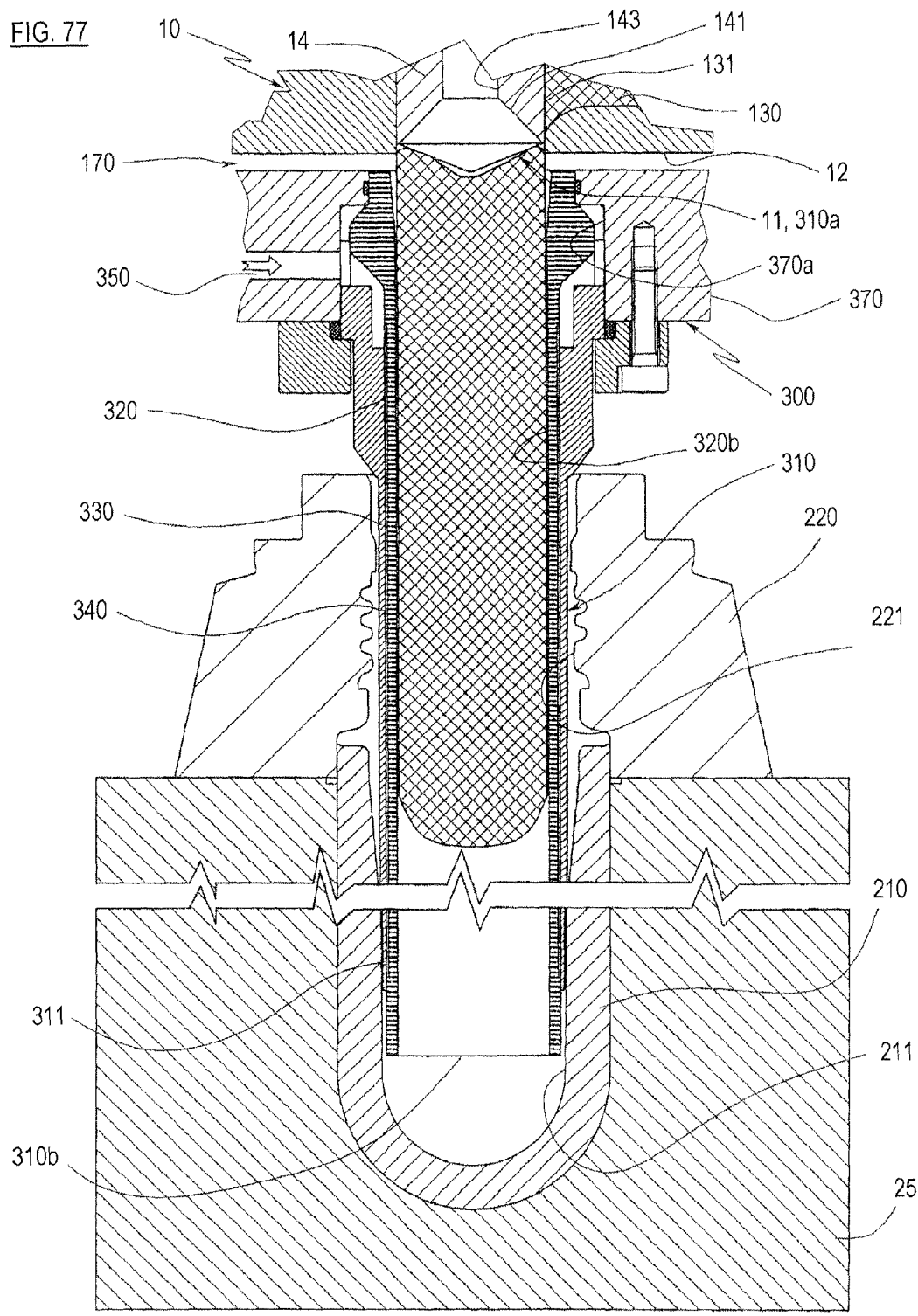
FIG. 77 shows another version of the inserting means in FIG. 65.
Figure 78:
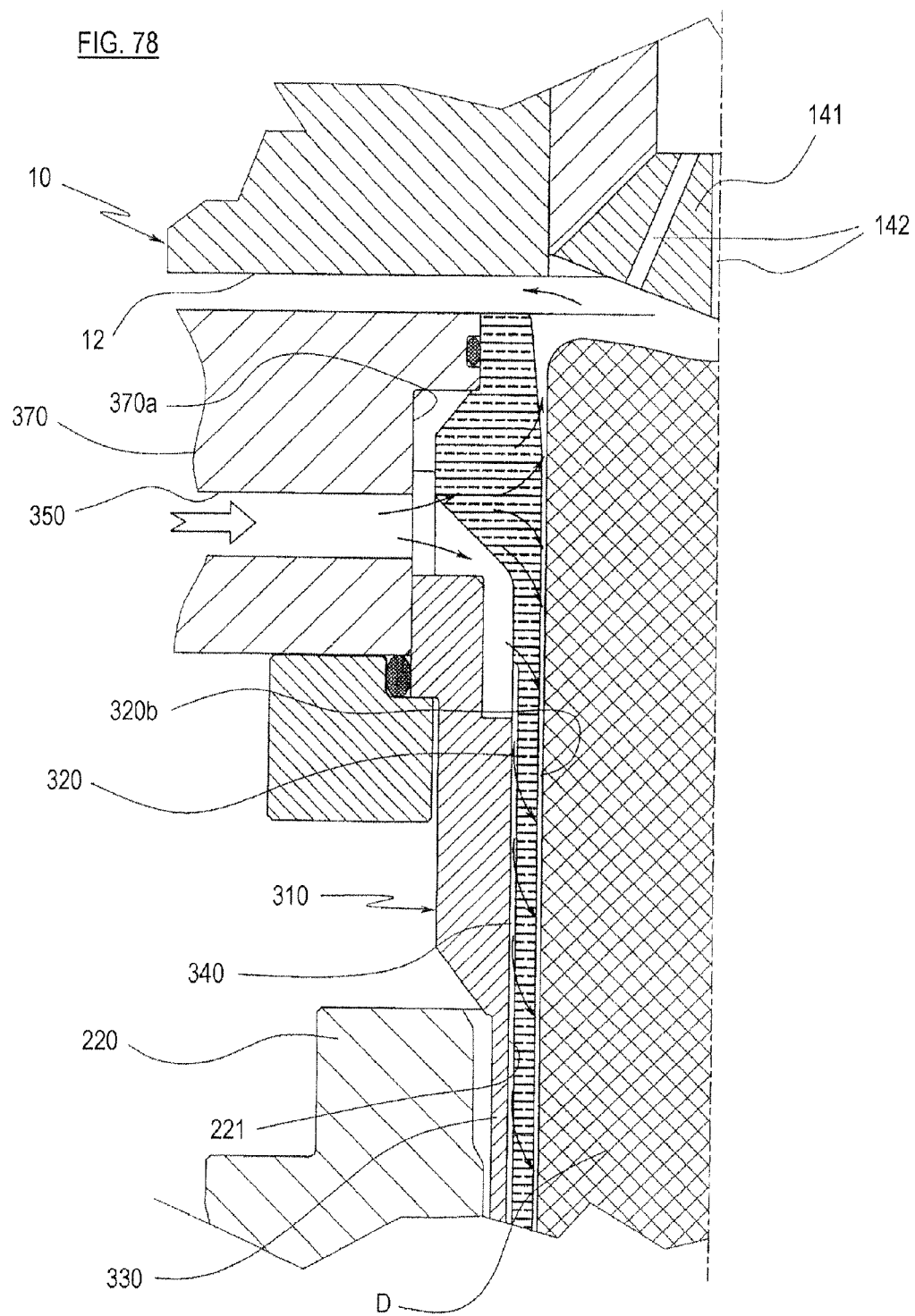
FIG. 78 is an enlarged detail of FIG. 77.

The embodiment shown in FIGS. 77 and 78, differs from the preceding form inasmuch as the dose D is made to flow along the internal surface 320b of a tubular wall 320 of the passage conduit 310 owing to the fact that by means of suitable dispensing means a gap filled with fluid is formed, for example air, carbon dioxide, nitrogen or other, along the internal surface 320b such as to completely or partially reduce the effect of adhesion between the dose D and the internal surface. According to the shown embodiment, the passage conduit 310 comprises the internal tubular wall 320, the axial cavity of which defines the passage cavity of the dose D, which wall 320 is porous in such a way as to enable the passage of the fluid through the wall 320. The conduit 310 comprises a second tubular wall 330 that is outside and coaxial with the porous wall 320, the lower end of the second tubular wall 330 being joined to the porous wall 320, and an upper support 370 having a looped cavity 370a that surrounds the upper end portion of the porous wall 320. Between the two walls 320 and 330 and the support 370, a gap is defined that defines a chamber 340 that surrounds the porous tubular wall 320 by 360° and extends along the entire length or almost the entire length thereof. The chamber 340 is connected with means (not shown in the Figures) suitable for sending pressurised fluid inside the chamber 340 through an inlet 350 made in the support 370.

The pressurised fluid is sent to the chamber 340, whilst the dose D descends along the internal surface 320b. The fluid passes through the porous wall 320 creating a layer of fluid that becomes interposed between the internal surface 320b of the wall 320 and the external surface of the dose D. This layer of fluid has the effect of preventing contact between the dose D and the wall 320 or of at least reducing the duration and extent of the contact zones, thus reducing the macroscopic adhesion effect between the dose D and the wall 320, promoting an effective and beneficial downward flow of the dose D.

Excellent results were obtained by making a wall 320 with a porous material, the pores of which have a diameter comprised between $5\times10^{-3}$ mm and $20\times10^{-3}$ mm and sending fluid at pressure of between 0.5-1 bar into the chamber 340.

Alternatively, the fluid can be sent inside the passage conduit 310 with a flow that is directed tangentially to the internal surface 320b in such a way that a layer develops that comes into contact with the surface 320b.

At the same time, this layer of fluid also produces an effective heat-exchange with the mass of the wall 320 and with the external surface of the dose D, which heat-exchange can be advantageously used to promote the flow of the dose. In particular, it is possible to provide means (not shown in the Figures) to thermally condition the temperature of the fluid so that the latter, by passing through the wall 320, consequently lowers both the temperature of the external surface of the dose D and the temperature of the internal surface 320b of the passage conduit 310. A lowering of the surface temperature of the dose increases the viscosity thereof and thus reduces the adhesion thereof to the wall 320. This beneficial effect is increased by lowering the wall temperature 320.

This temperature is adjusted in such a way as to prevent excessive, albeit localized, cooling of the dose D such as to produce microcrystalisation of the material or of the germs of irregularities in the material.

The fluid that is sent inside the conduit 310 is in part evacuated upwards along the conduit and is in part conveyed to the bottom of the die cavity and from there is evacuated upwards along the thin gap that is created between the external surface of the conduit 310 and the surface of the die cavity. FIGS. 79 to 83 show a sequence of phases carried out by the means of FIGS. 77 and 78 to insert a polymer dose D into a die cavity.

Figure 80:
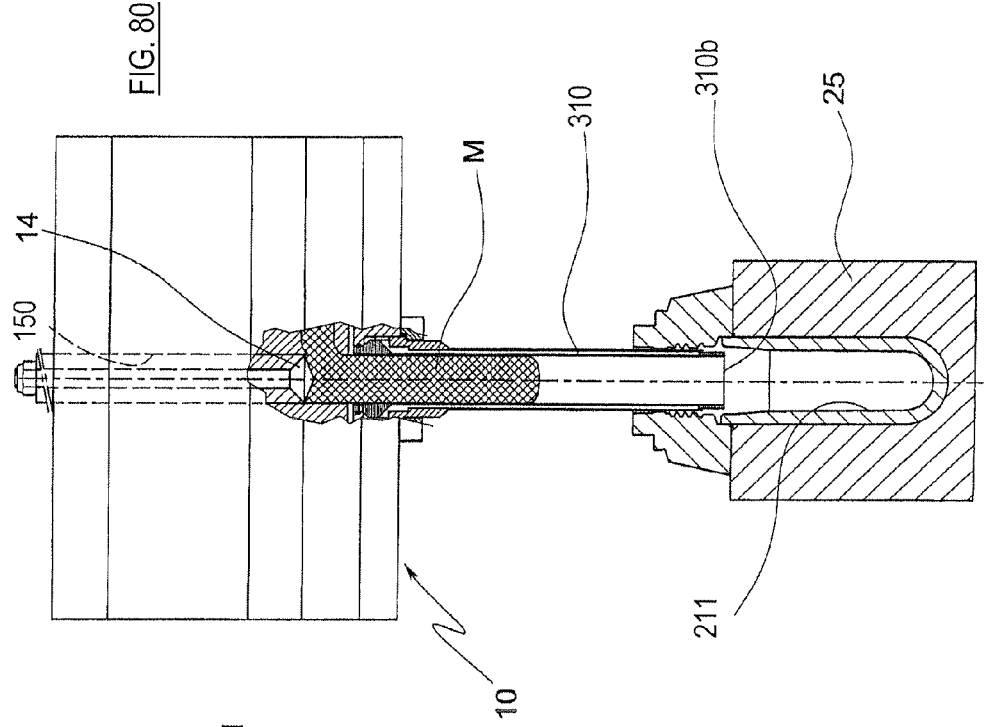
FIGS. 79-83 shows schematically a succession of phases in the insertion of a dose into a forming means by means of the version of the inserting means in FIG. 77.
Figure 79:
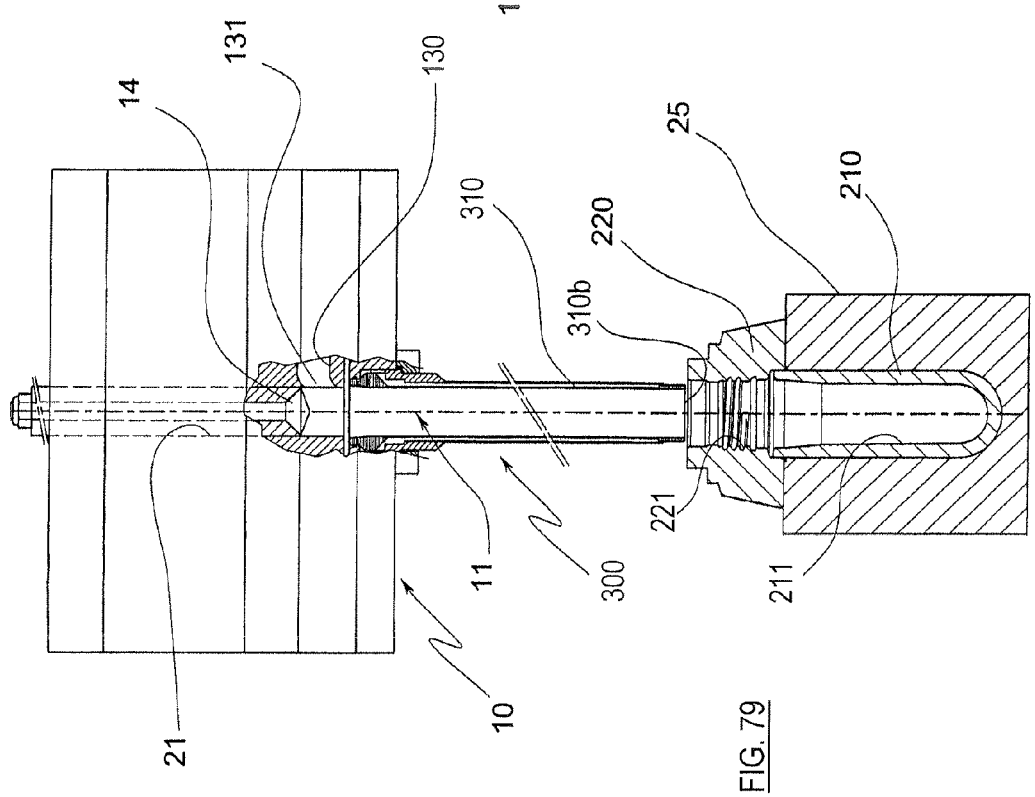
Figures 81, 82, 83:
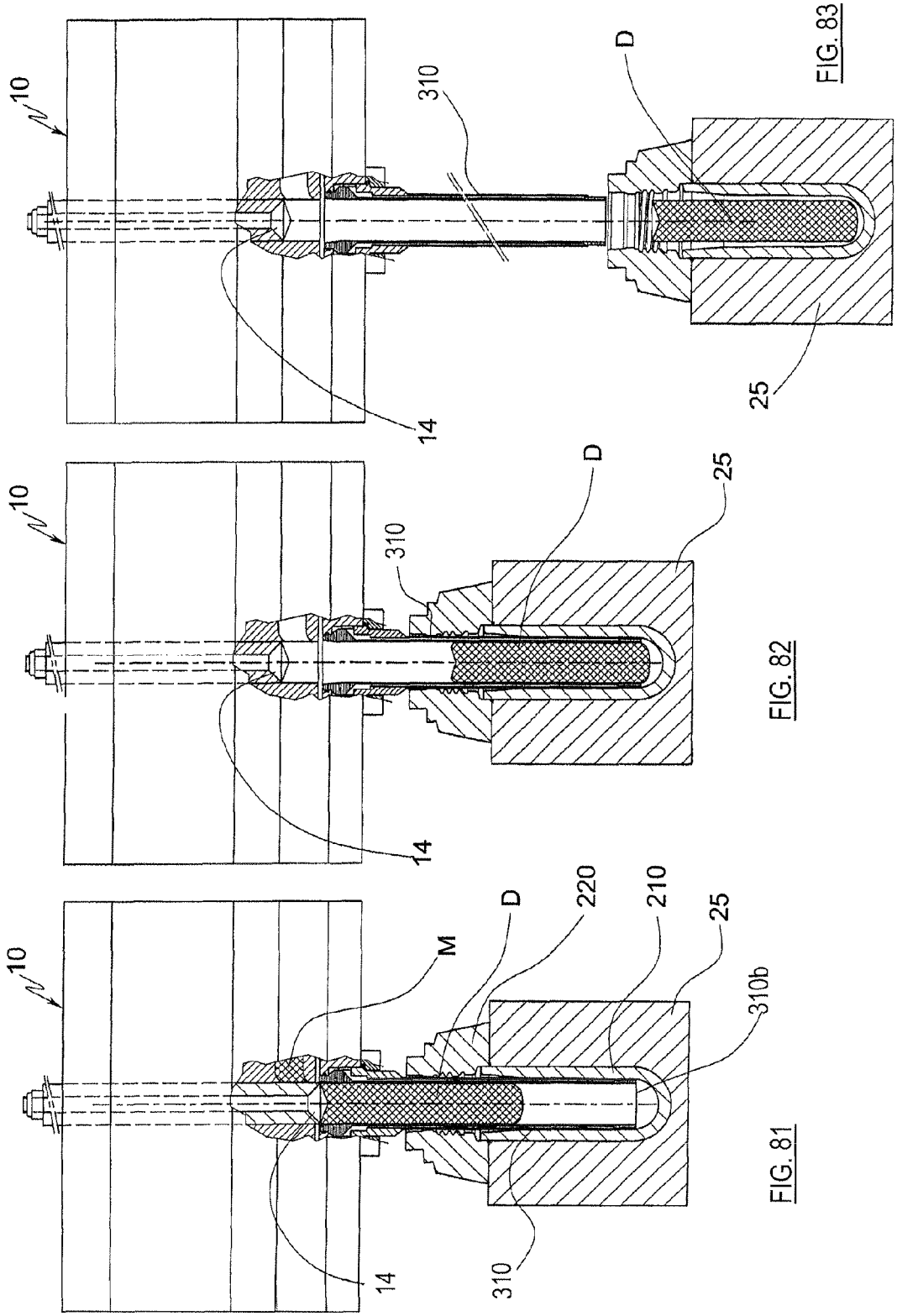

The inserting means 300 is first taken to a die cavity in such a way that the axes of the latter and of the passage conduit 310 substantially coincide (FIGS. 79 and 80). Then, the die and the dispensing means 10 are vertically moved relative to each other in such a way that the passage conduit 310 is positioned into the die cavity (FIGS. 81 and 82).

In the example shown, the dispensing means 10 keeps at a constant level whilst only the die moves vertically. Alternatively, the dispensing means 10 can be moved vertically, or both can be moved. At the same time, the extruded body M is made to advance along the channel 130, then also along the lower end portion of the vertical cavity 150 and finally along the tubular wall 310 (FIG. 80). When the portion of extruded body M placed below the point 131 has reached a preset length, the shutter 14 is made to descend, which intercepts the extruded body M separating the lower end portion thereof, which defines a plastics dose D (FIG. 81). Subsequently (FIG. 82), plastics descend along the passage conduit 310 until the outlet 310b of the latter is reached. At this point, during the exiting from the outlet 310b of the polymeric dose D, the passage conduit 310 is removed from the die cavity with a movement that is substantially the same as and opposite the descent movement of the polymeric dose D in relation to the tubular wall (FIG. 83).

The passage conduit 310 is thus taken completely outside the die cavity, returning to the start position of the cycle shown above (FIG. 79).

The polymeric dose D thus flows accompanied by the passage conduit 310 up to the bottom of the die cavity without coming into contact with the side surface of the latter, as is indeed desired.

Figure 84:
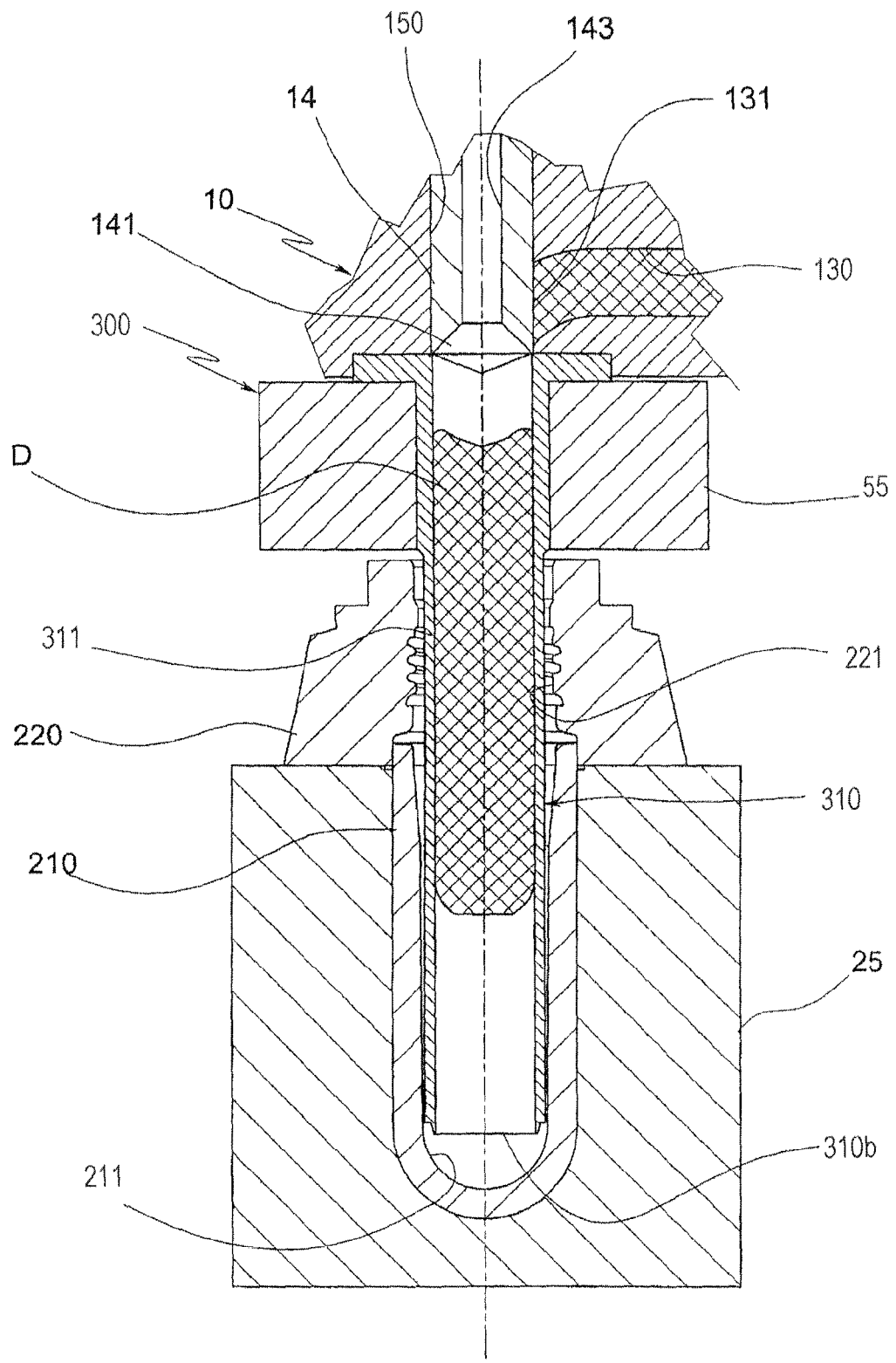
FIG. 84 shows a further version of the inserting means in FIG. 65.

The embodiment shown in FIG. 84, differs from the preceding embodiment through the presence of several anti-adhesion means suitable for promoting the flow of the dose D along the conduit 310.

The passage conduit 310 and in particular the internal surface 320b thereof are vibrated at frequency values such as to avoid or at least reduce the adhesion effect between the dose and the internal surface 320b. It has in fact been noted that with suitable vibration values even if the material is sticky, even if the material produces adhesion points at the microscopic level, these adhesion points have a very small extent and remain for an extremely short time, so that the specific adhesion force between the material and the wall of the conduit 310 is relatively very small. Furthermore, it can be hypothesised that the vibration generates a pressure-wave system that acts as compressed air interposed between the contact surface and the dose, in an equivalent manner to compressed air. The result at the macroscopic level is that the phenomenon of adhesion between the conduit 310 and the dose D is drastically reduced, so that the latter flows almost without friction along the conduit.

In detail, in the embodiment shown in FIG. 84, to the upper end of the conduit 310 vibration generating means 55 is applied suitable for vibrating the conduit 310 at frequency values such as to prevent or at least reduce, as disclosed above, the adhesion effect between the dose and the internal surface. Excellent results have been obtained with vibrations acting on the plane perpendicular to the vertical axis of the conduit 310, with frequency of 300 pulses per second in the case of a PET dose.

FIGS. 85 to 89 show a sequence of phases performed by the apparatus in FIG. 84 whilst a dose D is inserted into a die cavity.

Figure 85:
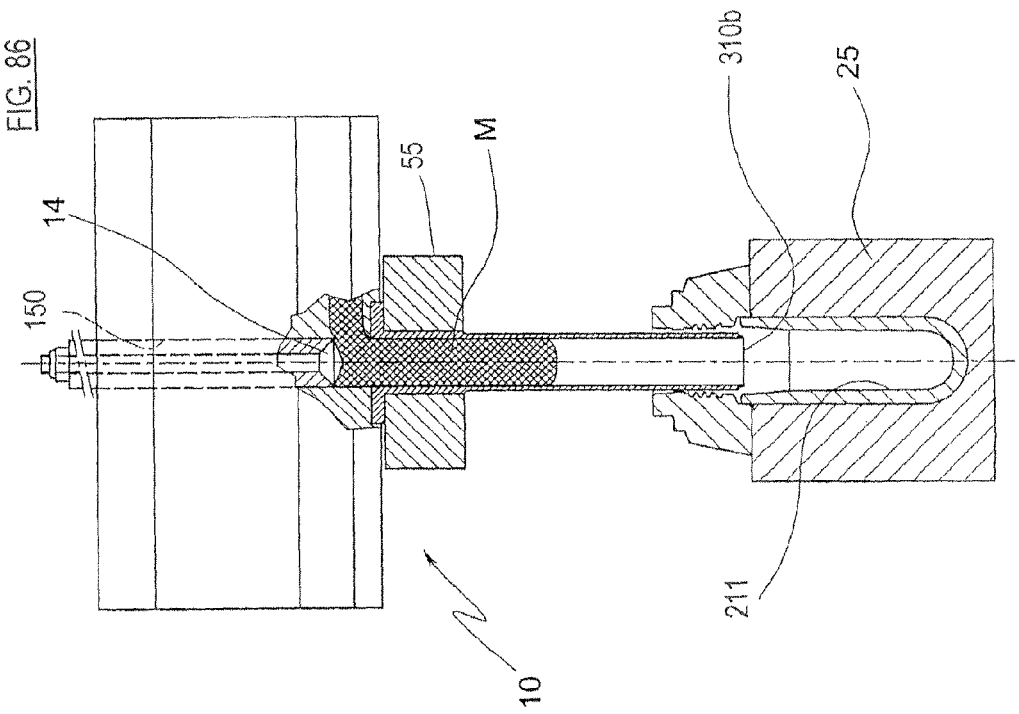
Figure 86:
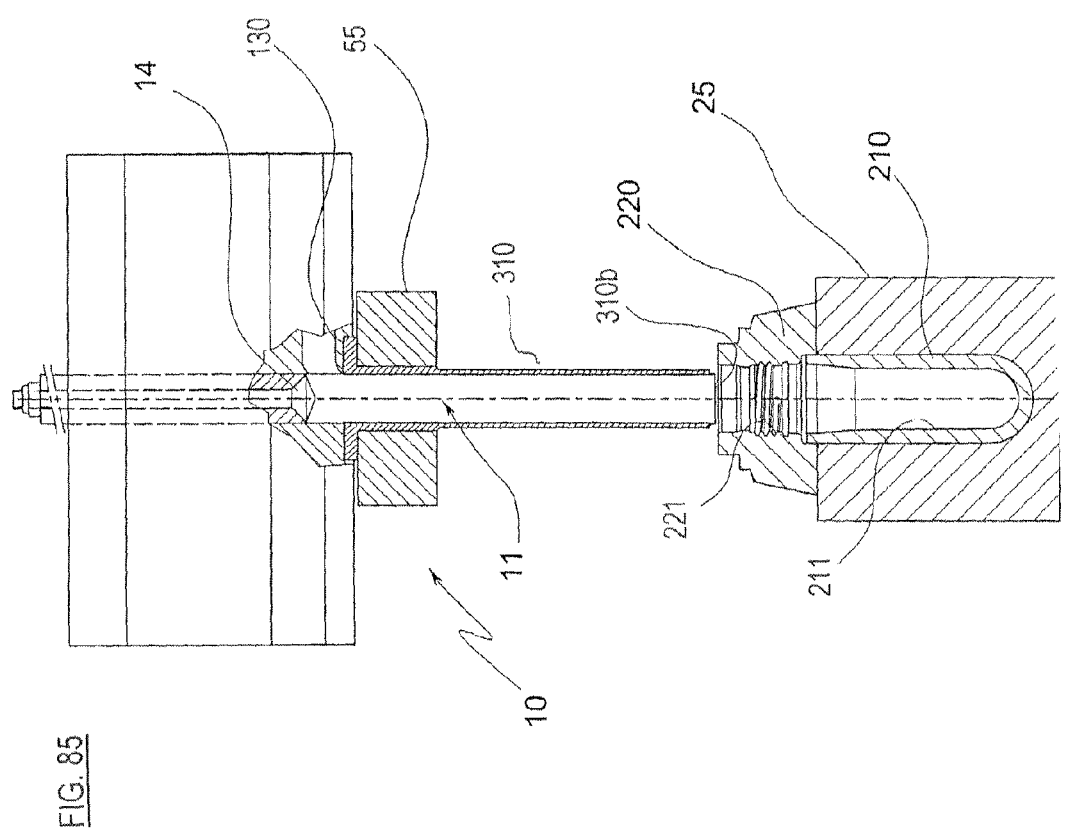

The passage conduit 310 is first taken to a die cavity in such a way that the axes of the passage conduit 310 and of the die cavity substantially coincide (FIGS. 85 and 86). Then, the die and the dispensing means 10 are vertically moved relative to each other in such a way that the lower portion of the passage conduit 310 is inserted into the die (FIGS. 87 and 88). The dispensing means 10 keeps at a constant level whilst only the die moves vertically. It is nevertheless obvious that, alternatively, the dispensing means 10 can be moved vertically or both can be moved.

At the same time, the extruded body M is made to advance along the channel 130, then also along the lower end portion of the vertical cavity 150 and finally along the passage conduit 310 (FIG. 86). When the portion of the extruded body M placed under the point 131 has reached a preset length, the shutter 14 is lowered, which intercepts the extruded body M, separating the lower end portion thereof, which defines a dose D of material (FIG. 87).

Subsequently (FIG. 88), the material descends along the tubular wall 310 until it reaches the outlet 390 thereof. At this point, during exiting from the outlet 310b of the passage conduit 310, the dose D is removed from the die cavity with a movement that is substantially the same as and contrary to the descent movement of the dose in relation to the passage conduit 310 (FIG. 89). Lastly, the passage conduit 310 is taken completely outside the die cavity returning to the start position of the cycle shown above (FIG. 85).

The dose D thus flows accompanied by the passage conduit 310 to the bottom of the die cavity without coming into contact with the side surface of the latter.

Descent of the dose D can be forced by inserting a pressurised fluid at a point upstream of the dose D placed inside the tubular wall 310, with a flow such as to promote the descent and the evacuation of the dose outside the outlet 310b of the passage conduit. If said shutter 14 is provided to separate a quantity of material that defines a dose D from the downstream end from the extruded body M, the shutter 14 can be made in such a way as to be suitable for supplying pressurised air at the lower end surface thereof.

In particular, it is the shutter 14 that, after separating a quantity of material that defines a dose D from the downstream end of the extruded body M exiting from the channel 130, dispenses pressurised air from the lower end surface thereof. For example when the apparatus is in the condition shown in FIG. 87.

The airflow emitted by the head of the shutter 14 can be used only to remove the material of the dose D from the head.

Figure 90:
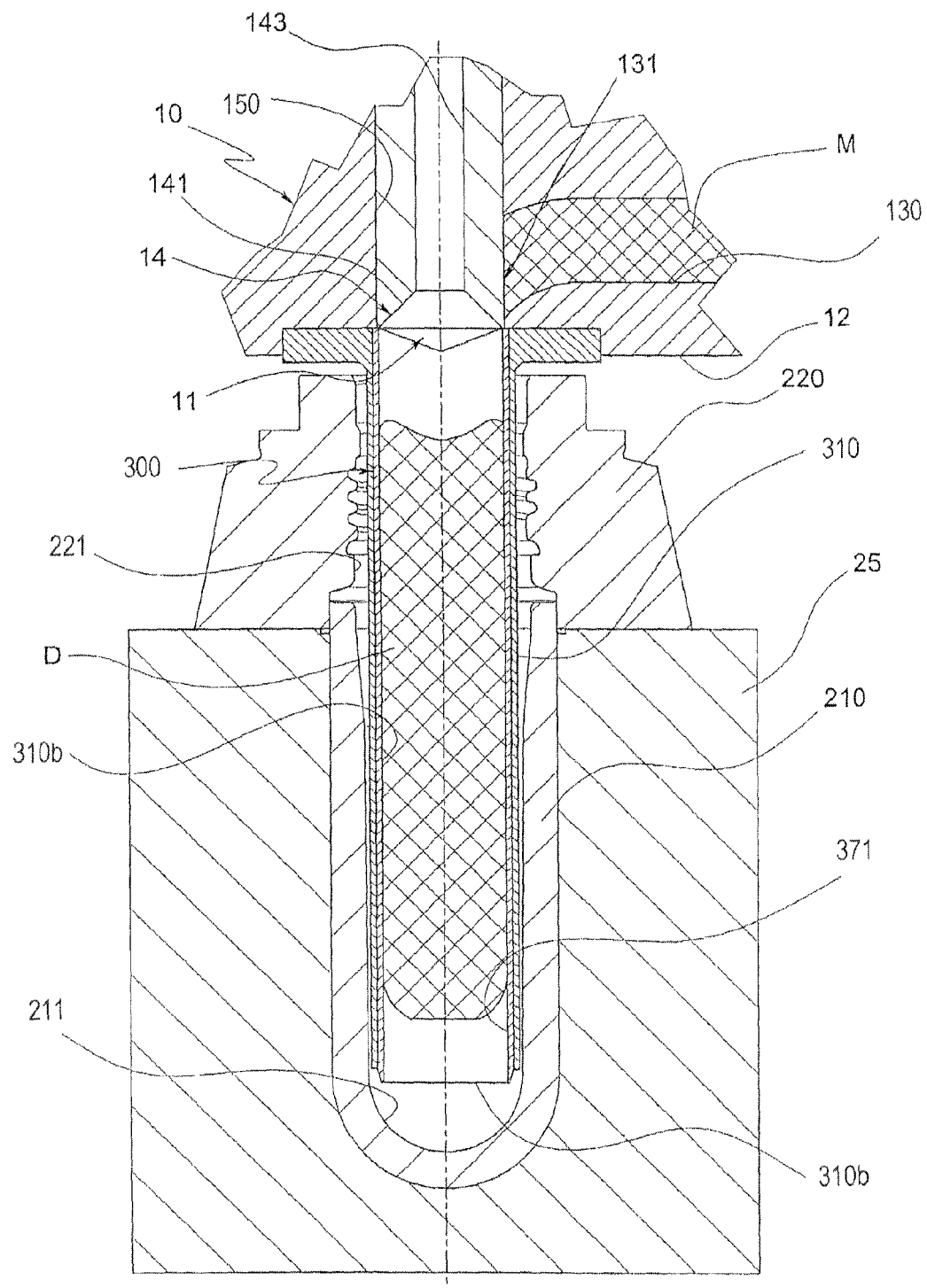
FIG. 90 shows a further version of the inserting means in FIG. 65.

In FIG. 90 another embodiment is shown, that differs from the preceding one because it provides anti-adhesion means of a different type from those previously disclosed to promote the flow of the dose D along the passage conduit 310.

In this case, the passage conduit 310 comprises a thin layer of internal coating 371 of material having anti-adhesion properties with regard to the dose D, for example PTFE (Teflon®), the internal surface of which defines the contact surface with the dose.

Whereas in the embodiments of FIGS. 65 and 84 the upper end of the passage conduit 310 is fixed directly in contact with the lower face 12 of the dispensing means 10, in the embodiment in FIG. 77 a space 170 is left between the inlet 310a of the conduit 310 and the dispensing outlet 11 of the dispensing means 10 which can remain open, although the conduit 310 and the means 10 keep connected to each other.

One of the functions of this space 170 is generally prevent the transmission of heat by conduction between the body of the dispensing means 10 and the conduit 310. In fact, the means 10 is necessarily kept at a relatively high temperature because the plastics that are processed inside the latter must have necessarily a relatively low viscosity. It is thus desired to thermally insulate the conduit 310 in relation to the means 10 to ensure that the temperature of the conduit 310 is relatively low as this promotes the flow of the dose along the conduit. Another function of the space 170 is to evacuate the fluid to the outside that is inserted inside the conduit 310 through the porous wall 320, especially if this fluid is cooled in order to prevent the fluid excessively lowering the temperature of the lower part of the dispensing means 10 with which the fluid comes into contact.

Furthermore, this space 170 can be used to slide a knife (not shown in the Figures) parallel to the lower face 12, which knifw separates the dose D from the material that flows along the cavity 150, alternatively to the shutter shown in Figures 65 and 84.

Figure 91:
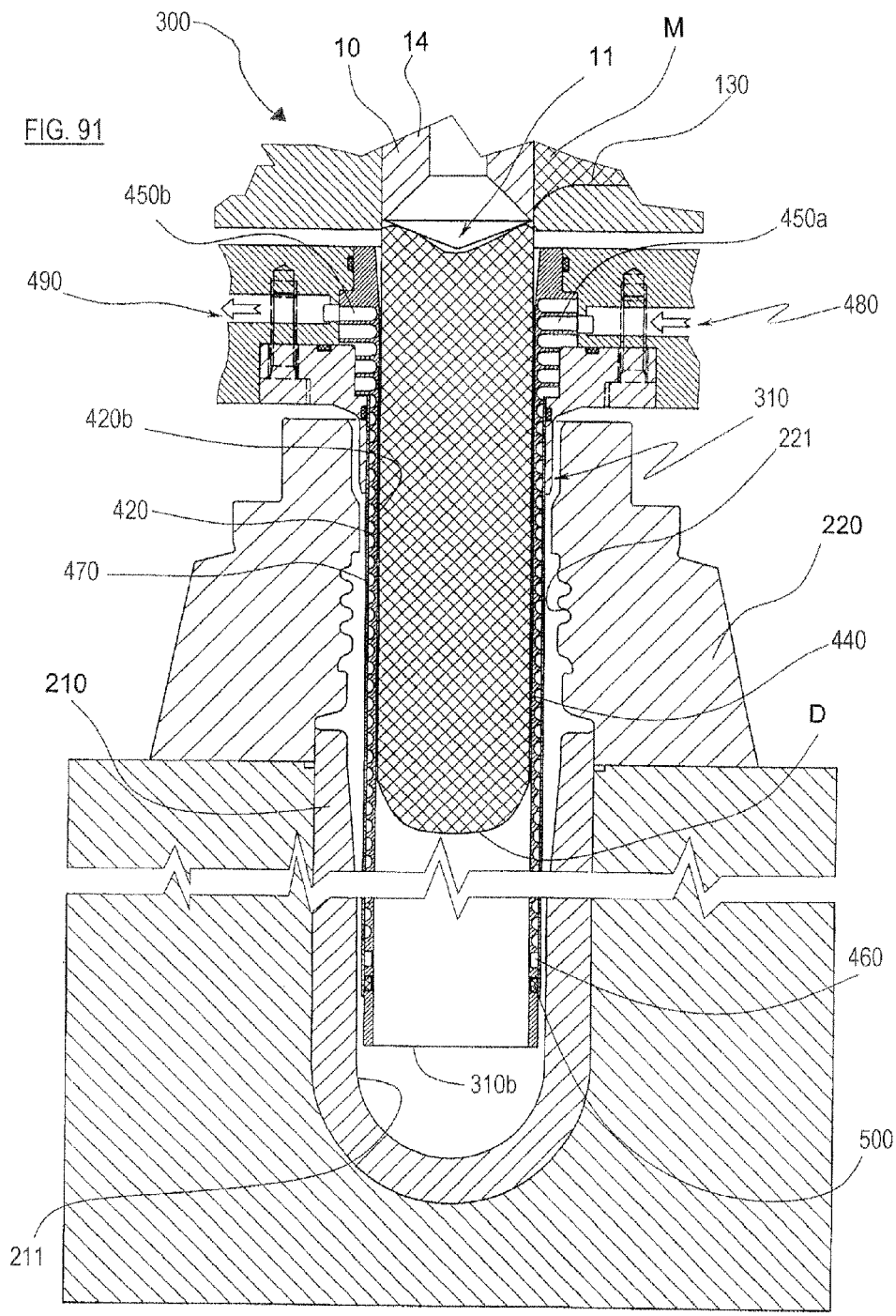
FIG. 91 shows another version of the inserting means in FIG. 65.
Figure 92:
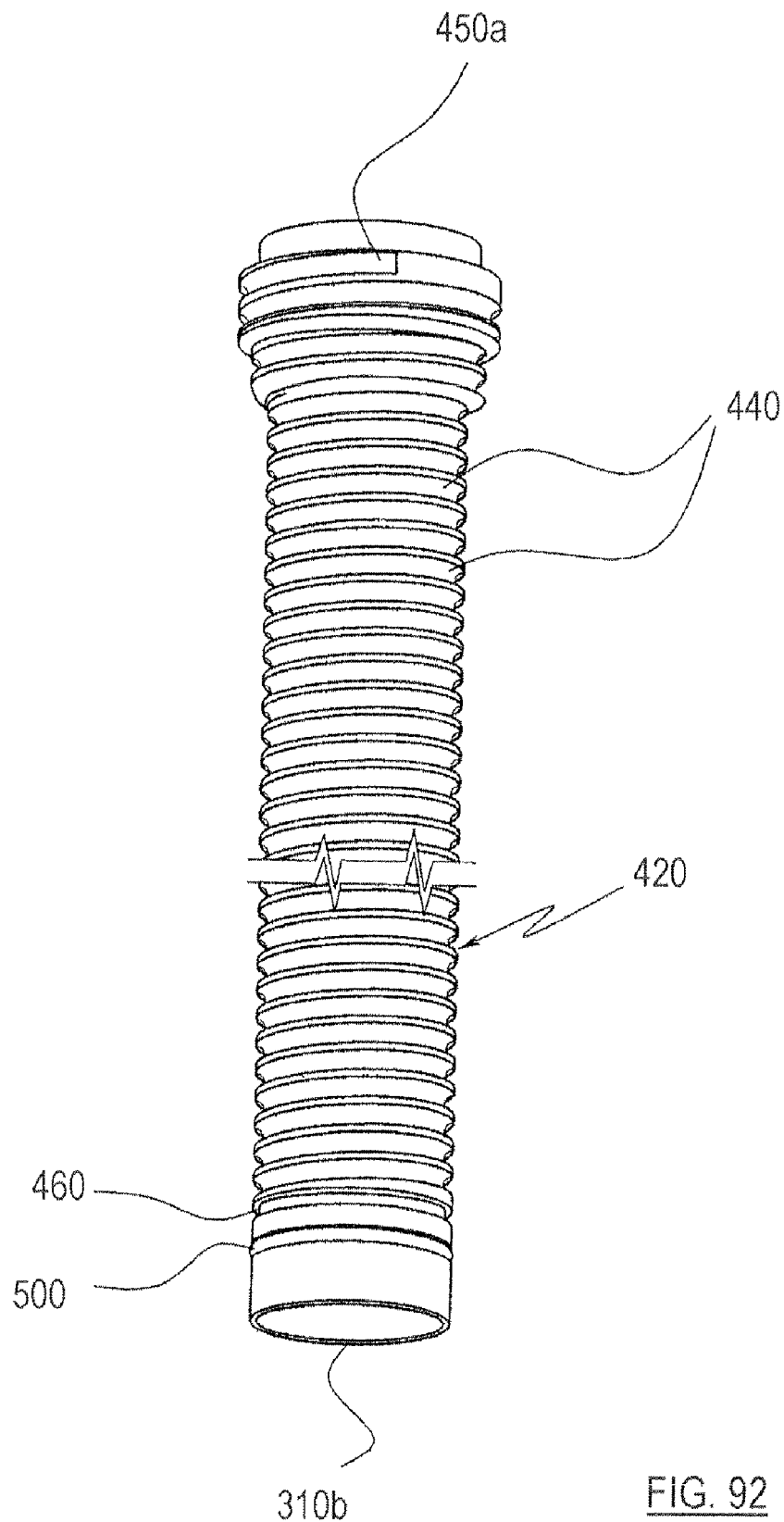
FIG. 92 is an external view of a tubular wall of the inserting means in FIG. 91.

The embodiment shown in FIGS. 91 and 92 differs from the preceding ones because cooling of the conduit 310 is provided, in order to completely or partially reducing adhesion of the polymeric dose D to the internal surface of the conduit 310. By decreasing the temperature of the contact surface, the temperature of the polymeric dose is reduced at least superficially and the viscosity thereof is thus increased, with the consequence that adhesion of the plastics to the contact surface is decreased.

According to the shown embodiment, the passage conduit 310 comprises an internal tubular wall 420, the axial cavity of which defines the passage cavity of the polymeric dose D and the internal surface 420b of which defines the contact surface with the polymeric dose D. The tubular wall 420 has a groove 440, obtained on the external side surface thereof, in the form of a double helix wound on the external side surface of the tubular wall 420, said double helix having two threads 450a and 450b placed at the upper end of the wall 420. The lower ends of the two helixes are connected together via a connecting turn 460 located at the lower end of the tubular wall 420. Underneath said turn 460 there is a seal washer 500.

Lastly, the external side surface of the wall 420 is surrounded by a thin and adherent external liner 470 that acts as an external wall for the channel 440 and for the turn 460. A single continuous closed-section channel is defined in this way that is made in the thickness of the conduit 310, that starts from the thread 450a (or 450b), descends as a helix to the final end of the wall 420, passes into the other helix via the lower turn 460, rescinds as a helix to the upper end of the wall 420, and finally exits through the thread 450b (or 450a). Said channel is connected with means (not shown in the Figures) suitable for sending pressurised cooling fluid along the channel, in such a way that the temperature of the tubular wall 420 is lowered to suitable values. The cooling fluid is supplied to the continuous channel by an inlet 480 and exits from the channel via an outlet 490.

The inserting means 300 can be associated with any suitable polymeric doses supplying means that is different from the dispensing means 10 shown in FIGS. 65-91, that is means able to release single polymeric doses to the inserting means 300 at the inlet of the tubular wall 310. For example, such a supplying means may consist of a second transferring or handling means, a so-called "hand" of the type shown in FIGS. 38-40.

Figure 43:
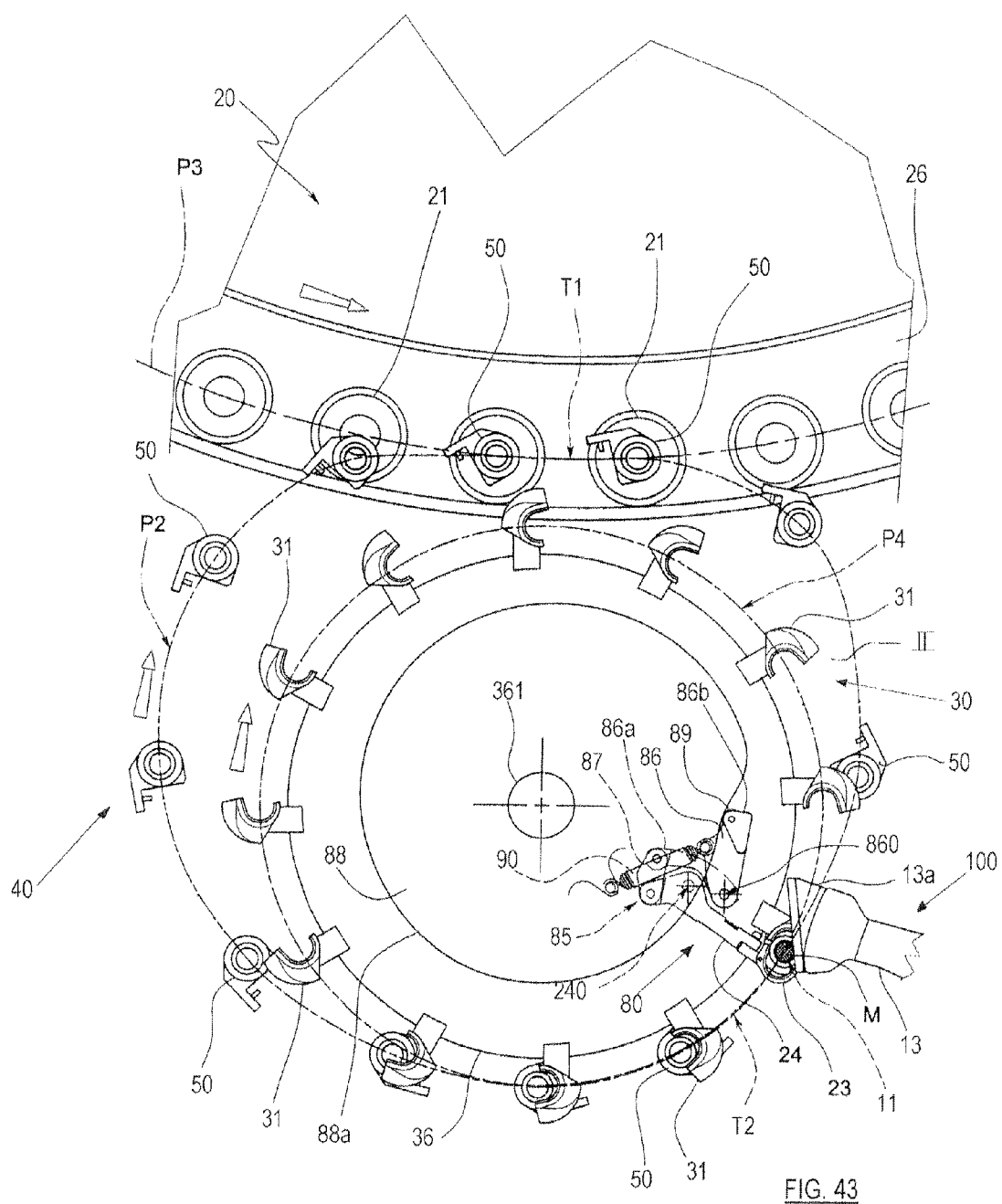
FIG. 43 is a schematic plan view of a version of the apparatus in FIG. 2, comprising cutting means of the doses of plastics exiting from the dispensing means and in which the second transfer means of the doses comprises bounding means.

In FIG. 43 there is shown a variation of the second transferring device 30 to transfer plastics doses D dispensed from a dispensing device 100 comprising an extruder means 10 and a fixed dispensing outlet or port 11.

The dispensing outlet 11 dispenses, in a substantially vertical direction, a continuous extruded body M (typically having a circular cross-section) of fluid plastics, which is divided in a regular manner to create a succession of polymeric doses D of a preset length.

The dispensing device 100 also comprises means for dividing the extruded body M. In particular, as shown in FIGS. 43 and 52-55, said means comprises a knife 13 associated with the extruder means 11, rotating on a transverse plane in relation to the dispensing direction of the extruded body M. The knife 13 is provided with a cutting surface or blade 13a that operates next to the outlet 11 and cuts the extruded body M, thus dividing into a succession of doses d having a preset length and separated from one another.

Figure 44:
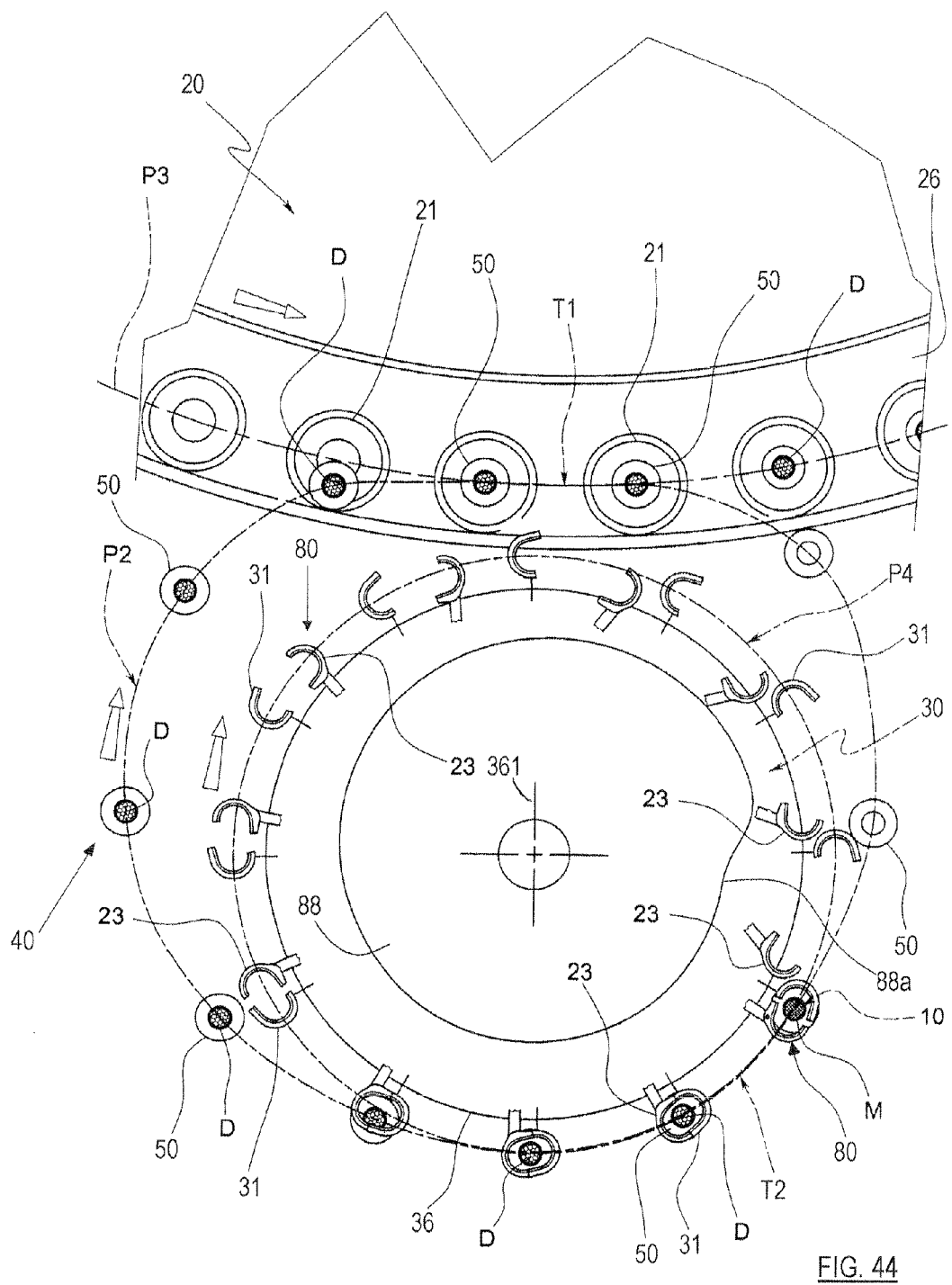
FIG. 44 is a schematic plan view of the apparatus in FIG. 43 in which certain details were eliminated and other details were added, so as to show the kinematic behaviour of the second transfer means.

The second transferring device 30 comprises a plurality of transferring or handling means 31, that are continuously rotated along a circular path P4 that, as shown in FIGS. 43 and 44, intersects the emission zone of the plastics extruded body M.

Figure 58:
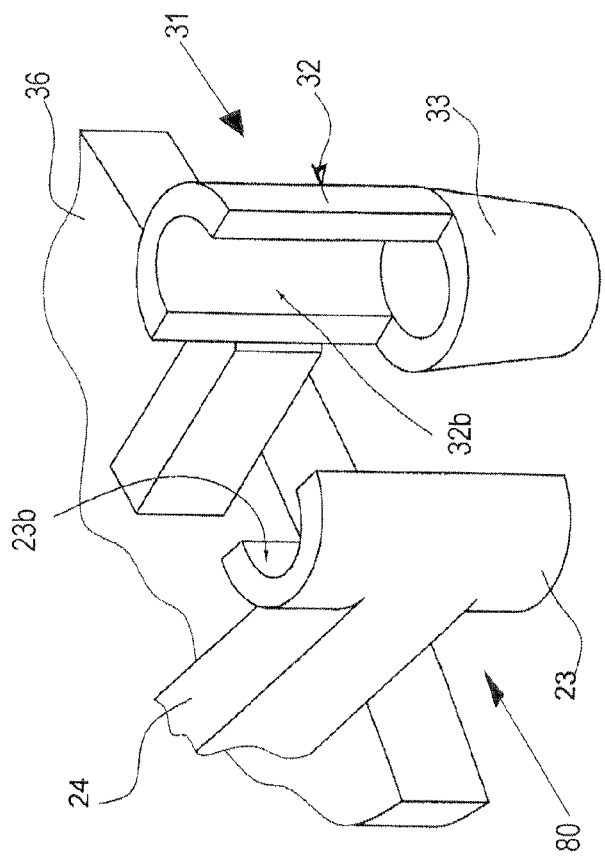
FIG. 58 is a perspective schematic view of the second transfer means in FIG. 43 in a different operating phase.

As shown in FIG. 58, each transfer means 31 has a curved concave wall 32 with a "U"-shaped cross-section that is open on one side and that is intended to come into contact with the polymeric doses D through a respective internal contact surface 32b. The concave wall 32 extends axially according to a substantially vertical axis and is shaped in such a way as to define a channel that is open on one side and is able to accompany the polymeric doses D, making the latter run in contact with the concave wall 32.

Furthermore, as shown in FIGS. 52-58, to perfect the descent of the polymeric dose D, each handling means 31, known as a "hand", is provided with a hollow funnel-shaped lower end portion 33 converging downwards and open at the bottom.

The second transferring device 30 furthermore has moving means suitable for operating the handling means 31 in succession so that the latter transfers in a transverse direction the doses D exiting from the dispensing outlet 11 and releases the doses D one at a time inside the transfer chambers 50 of the first transferring device 40.

Said moving means comprises a circular support 36 that, arranged on a horizontal plane, is suitable for rotating around a vertical shaft 361, having a fixed axis, in synchronized manner with the action of the dispensing device 100.

On the periphery of said rotating support 36 the handling means 31 is fixed, which is arranged with the open side of the surface 32b turned tangentially forwards in relation to the rotation direction.

At each complete revolution of the rotating support 36, the concave contact surface 32b of each handling means 31 goes into a position that is almost coaxial with the dispensing outlet 11 and impacts the polymeric dose D, removing the latter from the dispensing zone immediately after the dose D has been cut by the knife 13.

In particular, with reference to FIGS. 52-55, the circular path P4 runs on a horizontal plane located underneath the dispensing outlet 11, so that the upper end of the contact surface 32b passes a short distance away from the latter, the blade 13a of the knife 13 being interposed.

As shown in FIG. 52, the distance that separates the upper end of the surface 32b from the dispensing outlet 11 is sufficient to prevent the latter from impacting on the lower end of the plastics extruded body M that, after the removal of the polymeric dose D, continues to be dispensed by the outlet 11.

The transferring device 30 comprises bounding means 80 each one of which is suitable for closing at least partially the concavity of the contact surface 32b of a handling means 31 and driving means 85 intended to move said bounding means 80, in a synchronized manner both with the action of the dispensing device 100 and with the movement of the respective handling means 31.

The driving means 85 is suitable for acting in such a way that, in the portion of the path P4 in which each handling means 31 is approaching the removal position, the concavity of the contact surface 32b is open to enable the polymeric dose D to enter, whereas the concavity of the contact surface 32b is substantially shut at about the instant in which the polymeric dose D is released by the dispensing outlet 11.

In this way, despite the impact with the contact surface 32b and despite the thrust exerted by the blade 13a of the knife 13, the polymeric dose D cannot be projected outside the concavity of the advancing handling means 31 because the polymeric dose D is kept in a horizontal direction by the bounding means 80.

According to a first embodiment shown in FIGS. 43 and 44, each bounding means 80 (only one of which is shown in FIG. 43 for the sake of clarity) comprises a door-shaped concave portion 23 that is movable in relation to a corresponding handling means 31 and is suitable for closing the concavity of the contact surface 32b.

As shown in detail in FIG. 58, each concave portion or door 23 comprises a concave surface 23b, having a "U"-shaped cross-section open on one side and axially extending according a substantially vertical axis, which concave surface 23b is intended to close the concavity of the contact surface 32b, defining with the latter a containing recess of the polymeric dose D, in particular having a substantially elliptic cross-section.

The door 23 is fixed to the end of an arm 24 that is pivoted on the rotating support 36 and can oscillate, by rotating around a vertical axis 240, on a horizontal plane between an opening position and a closing position of the concavity of the respective handling means 31, controlled by the driving means. Each driving means 85 is connected to the rotating support 36 and is connected to the free end of a respective oscillating arm 24.

Each driving means 85 has one degree of freedom in relation to the rotating support 36, and is associated with a control member that determines the movement of the driving means 85 according to the angular position of the rotating support 36 in relation to the fixed part of the apparatus, in such a way as to univocally define the movement of the respective door 23 during each revolution of the support 36. As shown in FIGS. 43 and 44, the control member comprises a shaped plate 88 that lies on a horizontal plane, above the rotating support 36 with the oscillating arms 24 and the driving means 85 interposed, which shaped plate 88 is supported by the vertical shaft 361 in such a way as to be stationary in relation to the fixed part of the apparatus.

Each driving means 85 comprises a rocker arm 86 hinged with a substantially vertical axis 860 to the rotating support 36, which rocker arm 86 has a first end provided with a wheel 89 suitable for following the side profile 88A of the shaped plate 88, which acts as a cam, and a second end connected to the oscillating arm 24 through a connecting rod 87.

In detail, when seen in plan view the rocker arm 86 is a substantially "V"-shaped body hinged at the vertex, which has a first branch 86a that is substantially coplanar with the respective oscillating arm 24, and a second branch 86b that is substantially coplanar with the cam 88. The connecting rod 87 lies substantially on the same plane as the oscillating arm 24 and the branch 86a of the rocker arm 86, inasmuch as the connecting rod 87 is connected thereto at respective portions having reduced thickness. The wheel 89 is supported by the portion 86b of the rocker arm 86, in such a way as to be coplanar with the cam 88.

Each driving means 85 lastly comprises a spring 90 that, by connecting the rocker arm 86 to a pivot fixed to the rotating support 36, keeps said wheel 89 in contact with the side profile 88A of the cam 88.

In this way, for each angular position of the rotating support 36 in relation to the cam 88, the position of the driving means 85 and therefore the position of the oscillating arms 24 are univocally determined in relation to the support 36. As a result, the movement of each door 23 in function of the position of the corresponding handling means 31 along the circular path P4 is univocally determined, in combination with the movement of the support 36.

The operation of the second transferring device 30 for transferring polymeric doses D from the dispensing device 100 to the moulds 21 of the moulding device 20, occurs according to the phases disclosed below and shown in FIGS. 43, 44, 45-48, 49-51 and 52-57.

FIG. 44 schematically shows all the handling means 31 of the second transferring device 30 and, for each handling means 31, the corresponding bounding means 80 with the door 23 in the correct corresponding position.

FIGS. 45-48 and 52-57 show in sequence different operating phases of two handling means 31, one of which handling means 31 is in a rear position with the corresponding bounding means 80 in a spaced position, and a handling means 31 in a forward position with the corresponding bounding means 80 drawn only partially for greater clarity, the door 23 of which abuts in a closing position. FIGS. 45-48 and 52-57 furthermore show, by a dash-dot line and schematically, the transfer chambers 50 below of the first transferring device 40.

Figure 45:
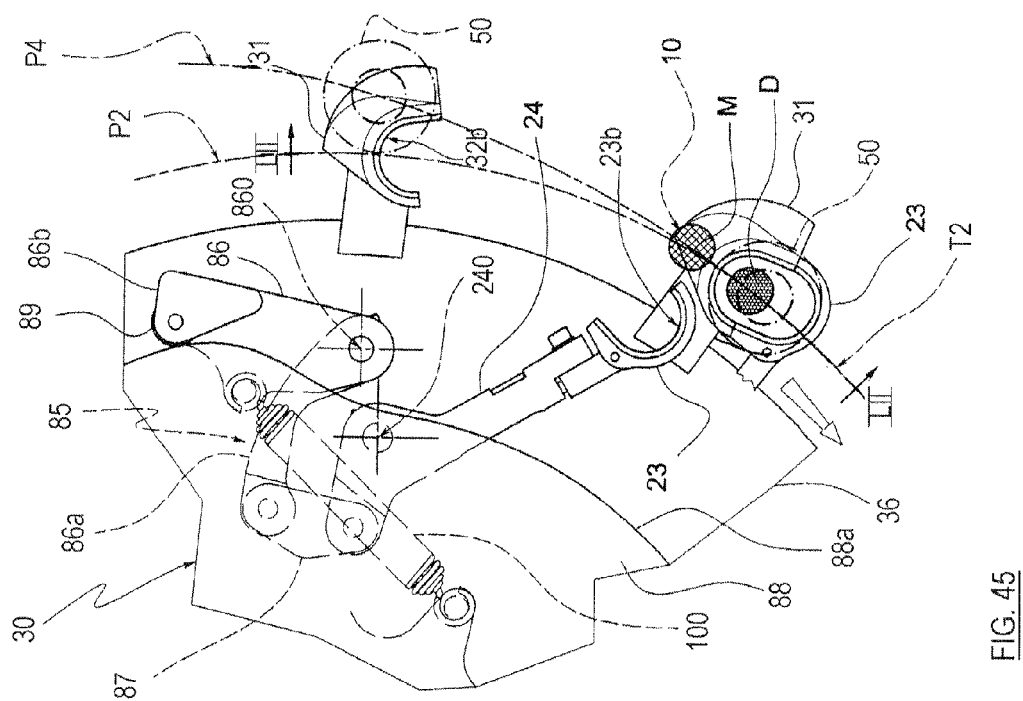

The dispensing outlet 11 is not shown but the extruded body M that exits from the outlet 11 is only shown in section view. With reference to FIGS. 45 and 52, the operating cycle of the apparatus is conventionally made to start immediately after the handling means 31 in the forward position has passed the emission zone of the plastics extruded body M and has removed a polymeric dose D, which is enclosed in the recess formed by the handling means 31 and by the door 23 that is in the closing position.

From this moment, the handling means 31 in the rear position starts to approach the position of removal of the polymeric dose D and therefore, as illustrated in FIG. 45, the door 23 is brought by the respective oscillating arm 24 to the opening position, in order that the cavity of the contact surface 32b be open.

In this position, the door 23 is at a radial distance from the rotation axis of the rotating support 36 that is less than the radial distance between said axis and the plastics extruded body M exiting from the dispensing outlet 11.

Figure 46:
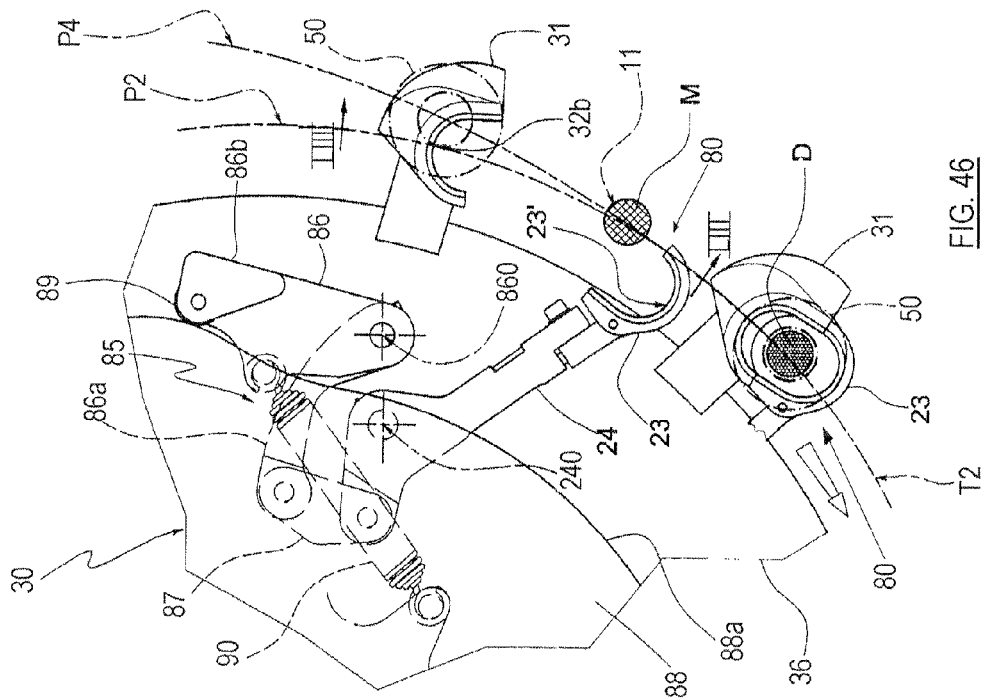
FIGS. 45-48 show on an enlarged scale subsequent operating phases of the transfer means in FIG. 43.

In a first operating phase, shown in FIGS. 46 and 53, owing to the rotation of the rotating support 36, the door 23 progressively goes past the dispensing outlet 11, without interfering with the plastics extruded body M exiting from the outlet 11, whereas the corresponding handling means 31 is still in the rear position in relation to the removal position.

Figure 47:
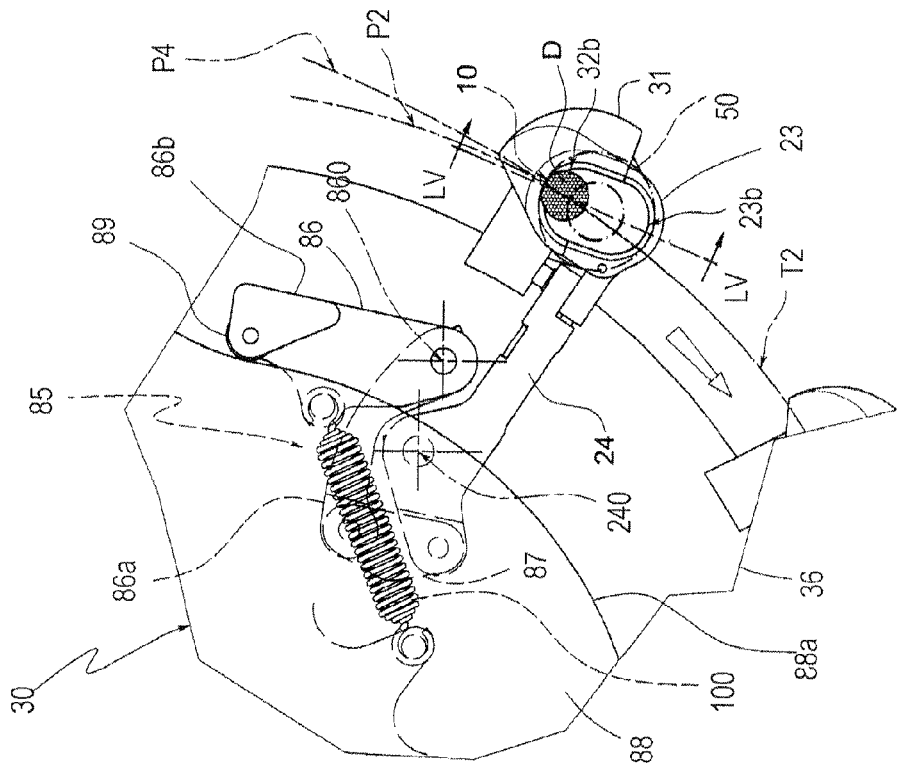
Figure 48:
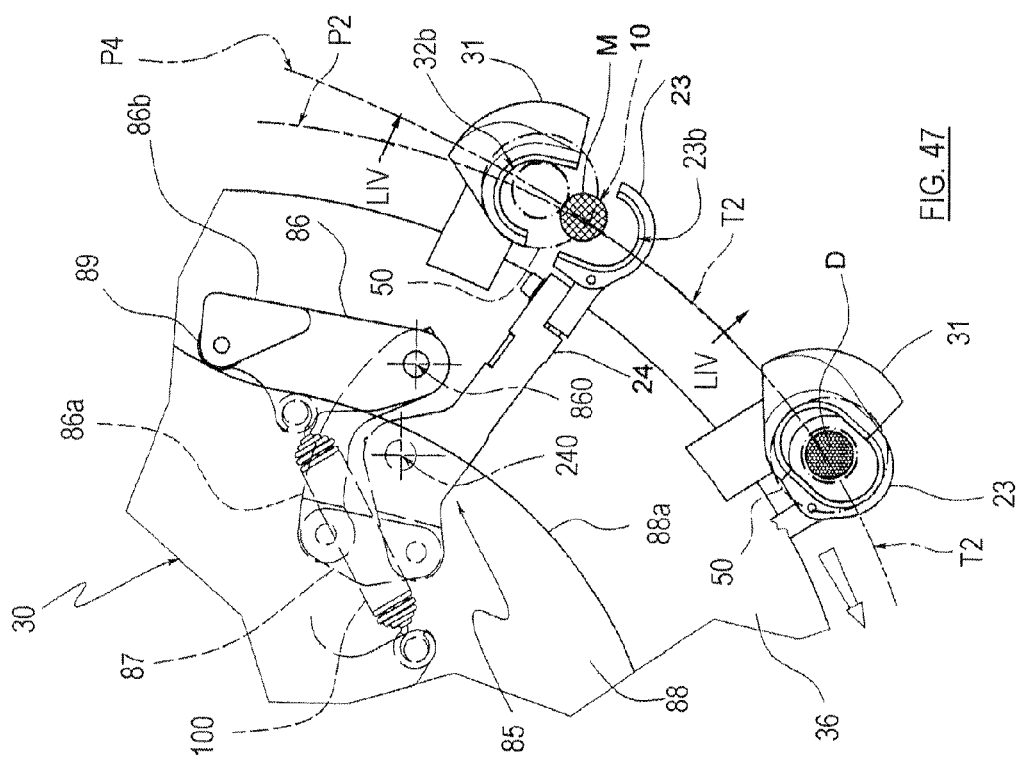

During a second operating phase, shown in FIGS. 47 and 54, owing to the rotation of the oscillating arm 24 towards the closing position, that is in the opposite direction to the rotation of the rotating support 31, the door 23 progressively approaches the dispensing outlet 11 and the corresponding handling means 31, until the door 23 substantially closes the cavity of the contact surface 32b, when the handling means 31 has simultaneously gone near the removal position, as shown in FIG. 48.

During the first phase in particular, rotation of the oscillating arm 24 produces progressive moving away of the door 23 from the rotation axis of the rotating support 36, until the door 23 is positioned along the path P4 of the handling means 31, downstream of the dispensing outlet 11.

Figure 49:
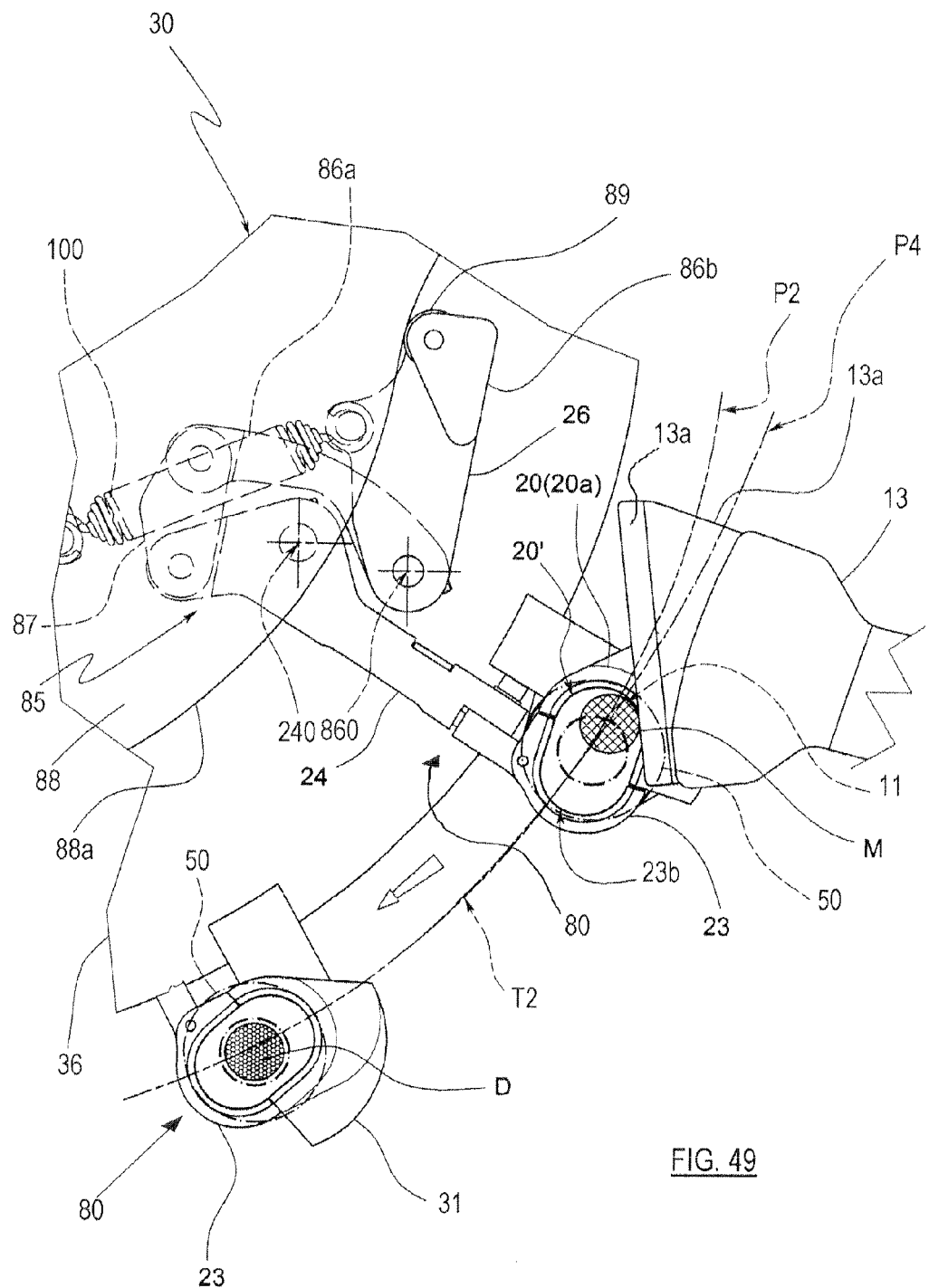

As shown in FIGS. 49-51, in synchronized manner with the movement of the door 23 and of the handling means 31, cutting of the plastics extruded body M by the knife 13 occurs.

In particular, when the handling means 31 is near the removal position, the knife 13 rotates with a very rapid movement around the rotation axis thereof, so that the blade 13a cuts the plastics extruded body M, separating a dose D therefrom. Said cut terminates in the instant immediately preceding the impact between the contact surface 32b of the handling means 31 and the polymeric dose D, which is already inside the cavity of the surface 32b substantially closed by the door 23, as shown in FIG. 51.

Figure 57:
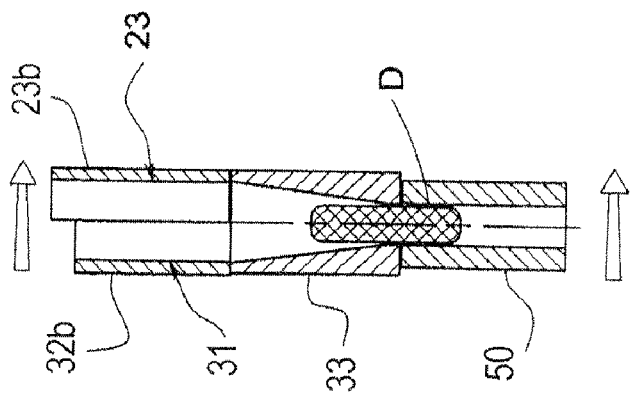
FIGS. 56 and 57 show the section views of the transfer means of FIGS. 51-54 in two further operating phases, after the removal of the dose from the dispensing means.
Figure 56:
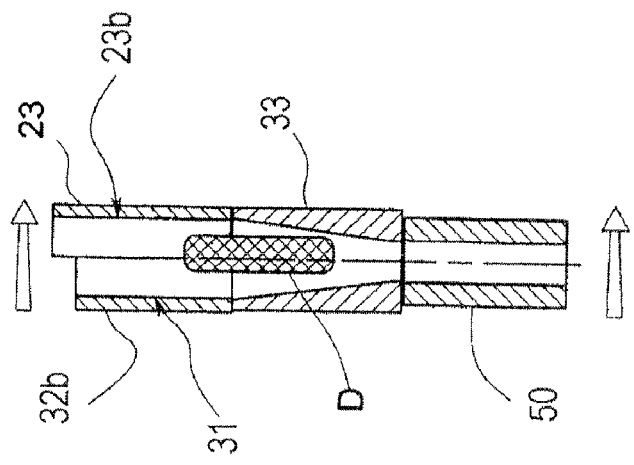
Figure 55:
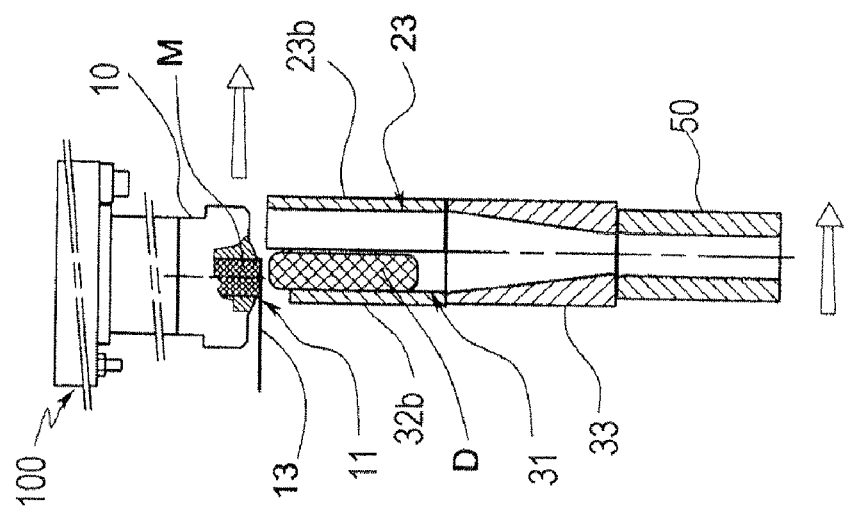

From this instant, as shown in FIGS. 55-57, the polymeric dose D is pushed by the contact surface 32b in a horizontal movement and is simultaneously also moved downwards by gravity until the dose D exits from the handling means 31.

The descent of the polymeric dose D occurs whilst the handling means 31 travels along the portion T2 of the circular path P4 to be transferred inside the transfer chamber 50 below.

As shown in FIGS. 44, 56 and 57, along the portion T2 the door 23 continues to close the concavity of the contact surface 32b of the handling means 31.

At the end of said portion T2, after the transfer of the dose D to the chamber 50 below, the oscillating arm 24 rotates towards the opening position, in order that the door 23 progressively moves away from the handling means 31, until the door 23 is placed again in the initial position to remove a new polymeric dose D.

Figure 59:
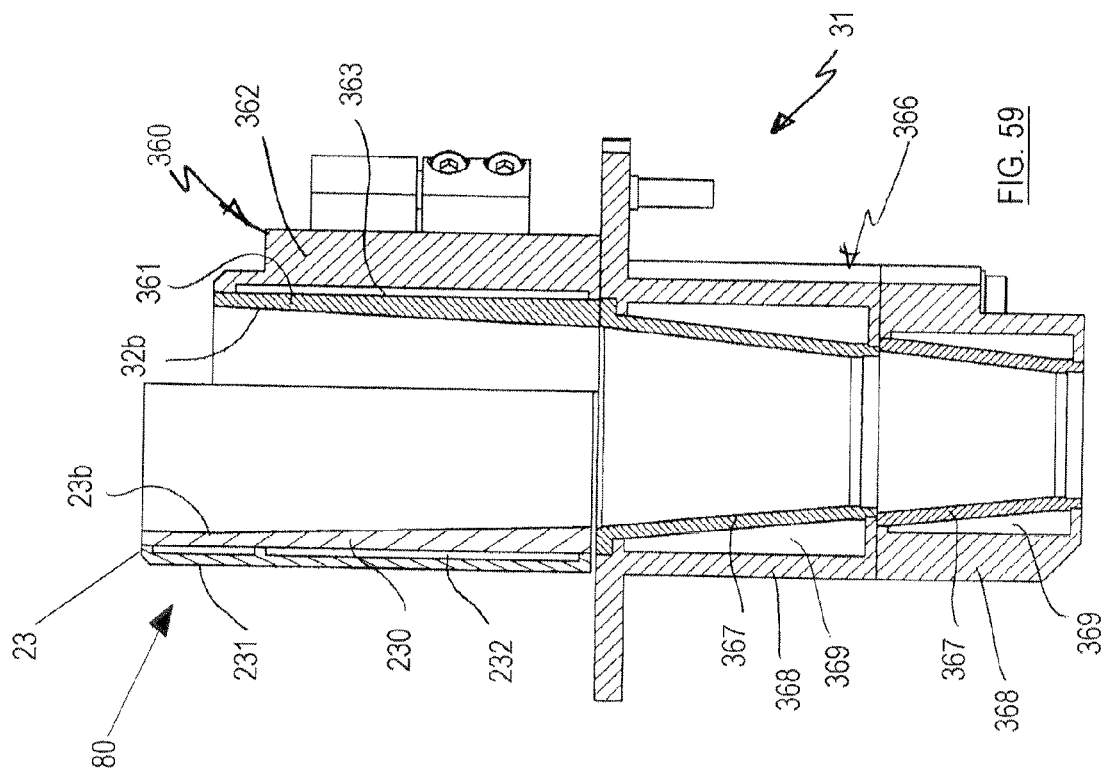
FIG. 59 is an axial section view of a version of the second transfer means.

FIG. 59 shows a version of the handling means 31 and of the corresponding bounding means 80, in which means is provided that is suitable for forming a gap filled with fluid along the contact surfaces of said means to reduce completely or partially the adhesion effect between the polymeric dose and said surfaces and to make the flow of the polymeric dose fast and regular.

The handling means 31 substantially comprises a upper portion 360 and a lower portion 366 that are coaxial with one another. The upper portion 360 has an open curved wall 361 the internal surface of which defines the contact surface 32b with the polymeric dose D.

The door 23 of the bounding means 80 comprises a second wall 230, the internal surface of which defines the surface 23b of the door 23 intended to come into contact with the polymeric dose D. The curved wall 361 is porous in such a way as to enable the passage of a fluid through it. An external tubular wall 362 is furthermore provided that is coaxial with and joined along the end edges to the curved wall 361 to create a closed chamber 363 that surrounds the curved porous wall 361 and extends along the entire length or almost the entire length thereof. The second curved wall 230 is also porous in such a way as to enable the passage of fluid through it and it is furthermore associated with a second tubular external wall 231, which is coaxial with and joined along the end edges to the second curved wall 230 to form a second closed chamber 232 that surrounds the curved porous wall 230 and extends along the entire length or almost the entire length thereof.

The lower part 366 of the handling means 31 comprises a curved wall 367 having a closed-profile cross-section and downward tapered that defines a lower funnel portion, corresponding to the lower part 33 shown in FIG. 58, suitable for guiding the polymeric dose D in the descent thereof. The curved wall 367 is porous in such a way as to enable the passage of fluid through it and is associated with a third external tubular wall 368 that is coaxial with and joined along the end edges to the curved wall 367 such as to form a third closed looped chamber 369, which surrounds the curved porous wall 367 and extends along the entire length or almost the entire length thereof.

Fluid or pressurised gas is sent into the various chambers 363, 232, 369 by channel means, that is not shown. The fluid passes through the porous walls 361, 230, 367 and forms on the contact surfaces a gap or layer of gas suitable for completely or partially reducing adhesion to the dose D.

According to the embodiment illustrated in FIG. 59, the lower portion 366 is subdivided into two consecutive segments, each of which has a respective chamber 369 separated from the other similar chamber 369. Such chambers can be supplied with fluids having different physical features (pressure, temperatures) in order to be able to control better the descent of the dose D. Alternatively, different means can be provided to completely or partially reduce adhesion between the polymeric dose D and the contact surface 32b of each handling means 31.

Said means may comprise a thin coating layer placed to cover the cavity of the handling means 31, of a material having anti-adhesion properties in relation to the polymeric dose D, for example PTFE, the surface of which defines said contact surface 32b with the polymeric dose D.

Figure 60:
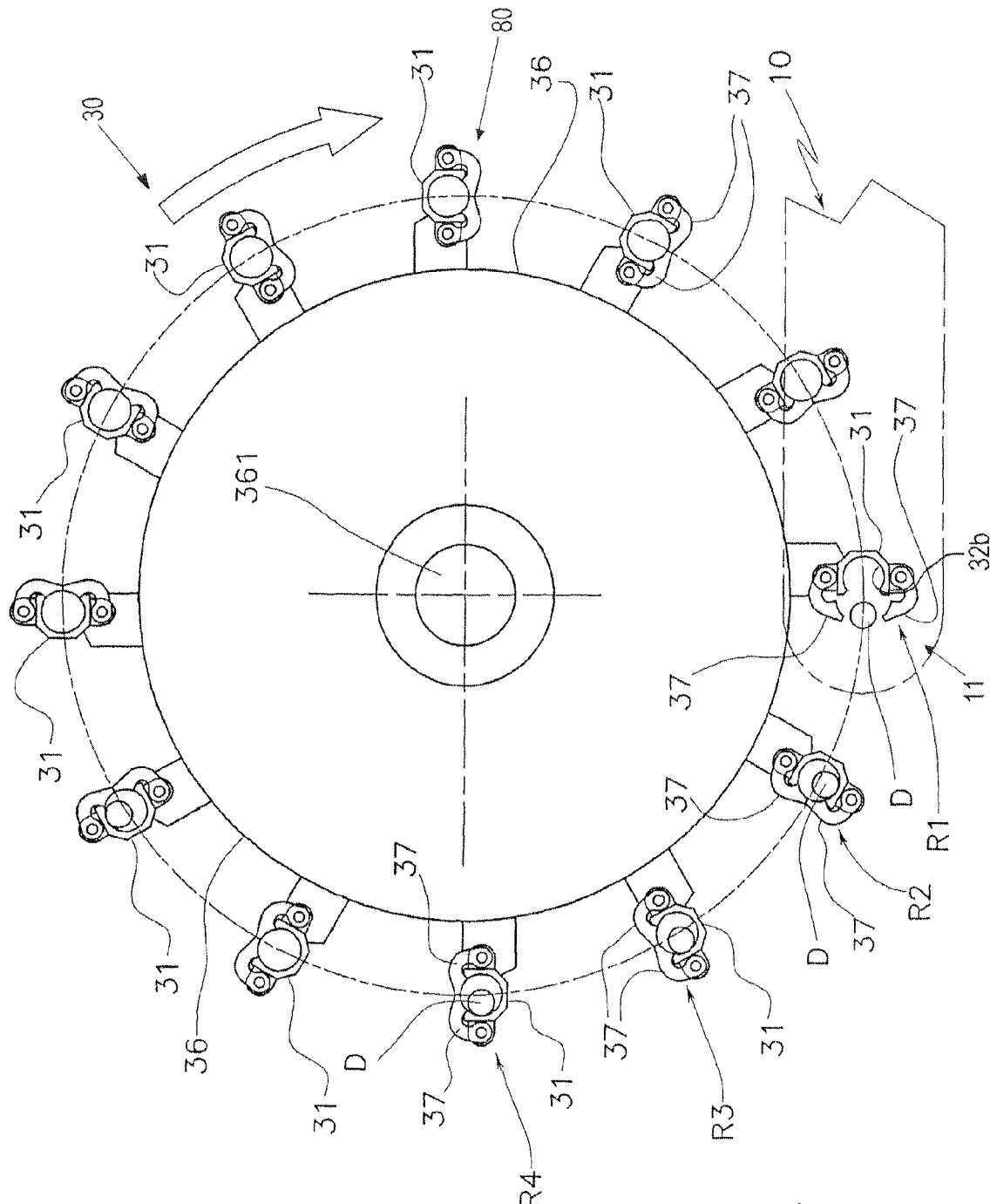
FIG. 60 is a plan view from above of another embodiment of the second transfer means.

According to a particular embodiment of the second transferring device 30, illustrated in FIG. 60, with each handling means 31 bounding means 80 is associated comprising a pair of doors 37 hinged with a vertical axis to the periphery of the contact surface 32b and suitable for closing the concavity of the latter, and means suitable for opening and closing said doors 37 in synchronized manner with the movement of the handling means in such a way that the concavity is open when the surface 32b goes underneath the dispensing outlet 11 and is shut immediately after the polymeric dose D enters the concavity. FIG. 60 schematically shows the device 30, the handling means 31 of which have said doors 37. The means 31 placed in position R1 is on the point of passing underneath the dispensing outlet 11 and the doors 37 are in the open position. The means 31 placed in the subsequent position R2 has the doors 37 already closed, in such a way as to enclose inside itself the polymeric dose D. The means 31 located in the subsequent position R3 also has closed doors 37 and encloses inside itself the polymeric dose D. Between position R3 and position R4 the descent of the dose D outside the means 31 occurs and in the subsequent remaining positions the means 31 keeps the doors 37 in the closed position.

This peculiar embodiment is used if there is a danger that the impact of the polymeric dose D with the contact surface 32b will produce a rebound that takes the dose D away outside the concavity of the surface. In this case, the dose D nevertheless remains trapped within the concavity of the surface 32b.

A version of the disclosed embodiment provides for the use of only one door 37.

Figure 61:
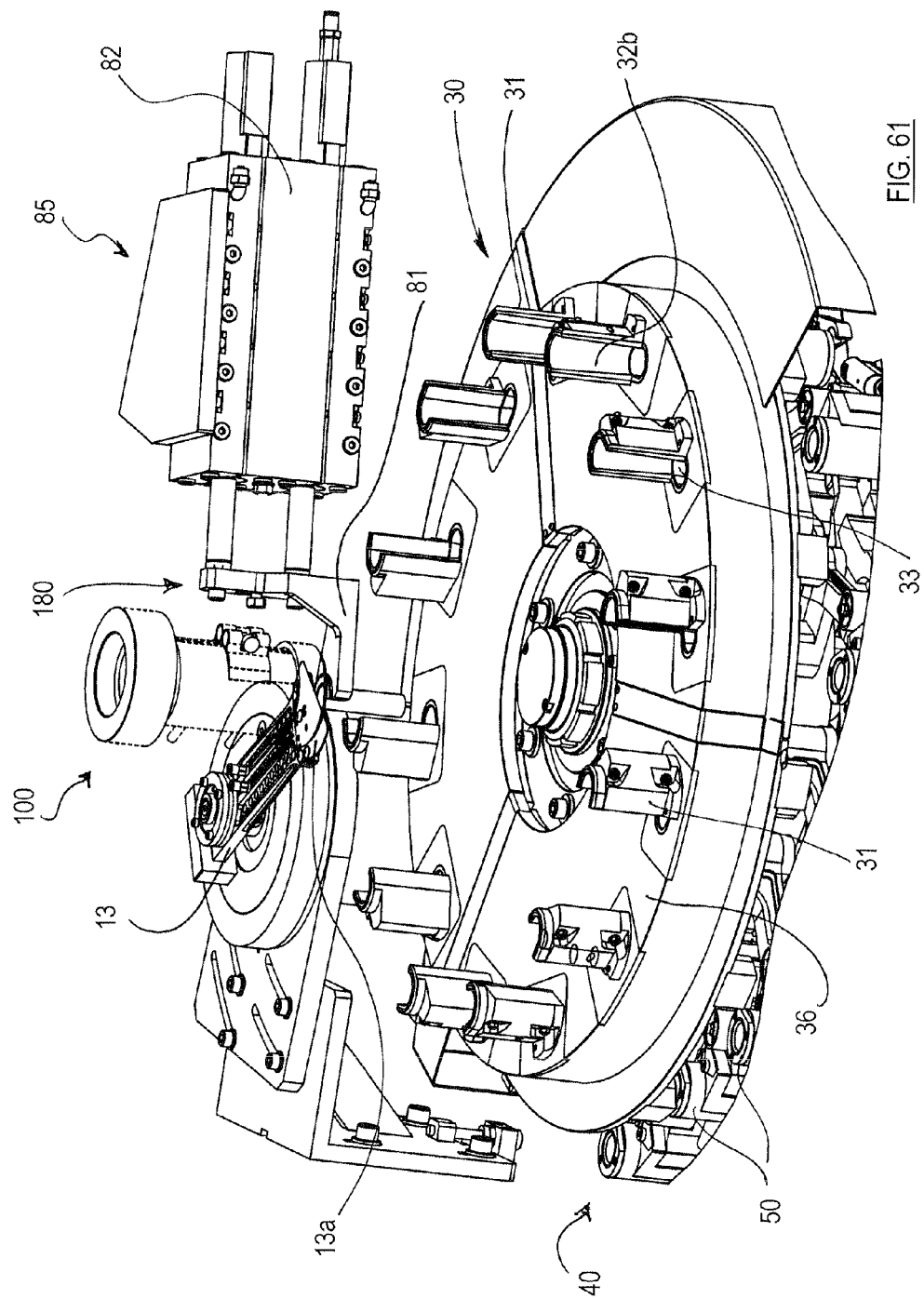
FIG. 61 shows a perspective schematic view of a version of the apparatus in FIG. 42.

In FIG. 61, a further embodiment of the apparatus is shown comprising a dispensing device 100, for example an extruding device, that dispenses extruded plastics in a substantially vertical outlet direction. The plastics may for example exit from the dispensing device 100 by advancing from top to bottom. The apparatus furthermore comprises cutting means that can be provided with a single cutting element, for example a knife 13, fitted to a supporting device that is rotatable around a substantially vertical rotation axis. In this way, the knife 13 moves on a transverse plane and in particular substantially orthogonal to the outlet direction of the plastics from the dispensing device 100.

Below the extruding device 100 and the knife 13 the second transferring device 30 is positioned, comprising a transfer carousel that can rotate around a substantially vertical axis. The transfer carousel comprises a circular support 36, at a peripheral region of which a plurality of transfer means or of handling means 31 is arranged, comprising respective concave elements having a "U"-shaped cross-section. The handling means 31 may be of the type previously disclosed and may be provided with anti-adhesion means.

When the transfer carousel rotates, the handling means 31 moves along a looped path, and more in particular along a circular path. The rotation direction of the handling means 31 along this circular path is discordant with the further rotation direction of the knife 13. In the example shown in FIG. 61, the transfer carousel on which the handling means 31 is mounted rotates in a clockwise direction whilst the supporting device moves the knife 13 in an anticlockwise direction.

Below the second transferring device 30 the first transferring device 40 is arranged, that carries the transfer chambers 50 by means of which it is possible to transfer the doses D to the forming means.

In an embodiment that is not shown, the first transferring device 40 may not be provided. In this case, the handling means 31 delivers the doses D directly to the forming means.

The apparatus shown in FIG. 61 comprises abutment means 180 opposed to the transfer or handling means 31 to interact with the doses D. The abutment means 180 comprises an abutment element 81 on which a concave portion or surface 81*b* is made having a "U"-shaped cross-section open on one side and axial extent according to a substantially vertical axis. The concave portion 81*b* faces the concave surface 32*b* of the transfer means 31, when the transfer means 31 is in the proximity of the dispensing device 100.

Figure 62:
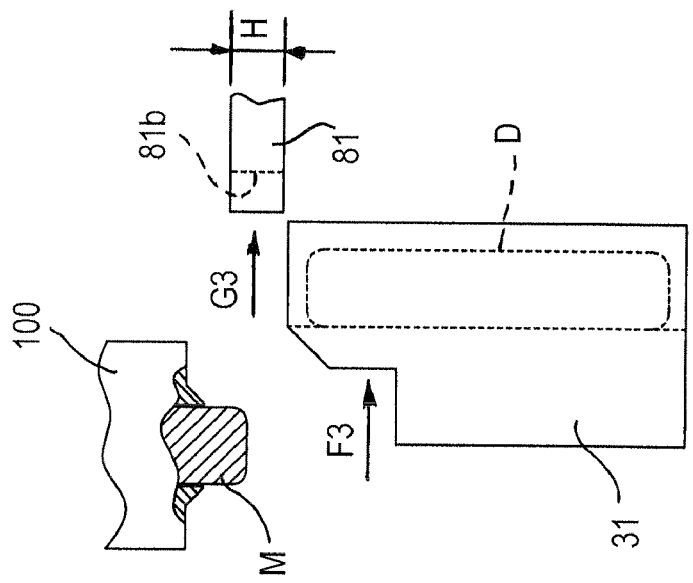
FIGS. 62-64 show enlarged partial views of the second transfer means in FIG. 61, in association with cutting means and dispensing means, in successive operating phases.
Figure 63:
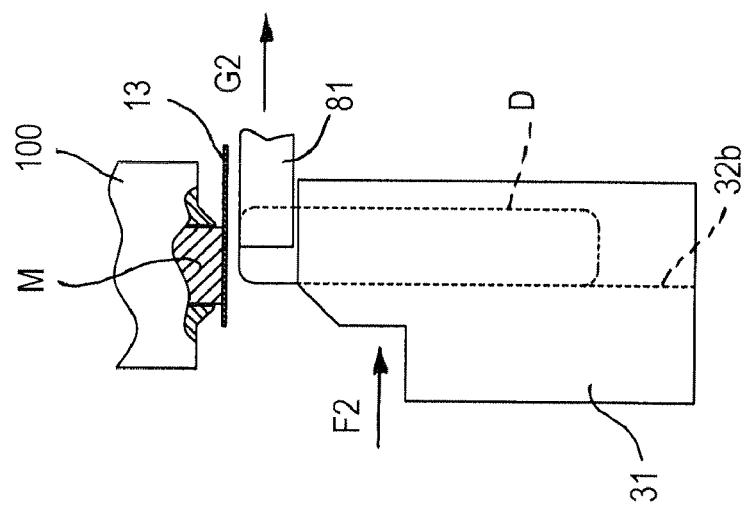
Figure 64:
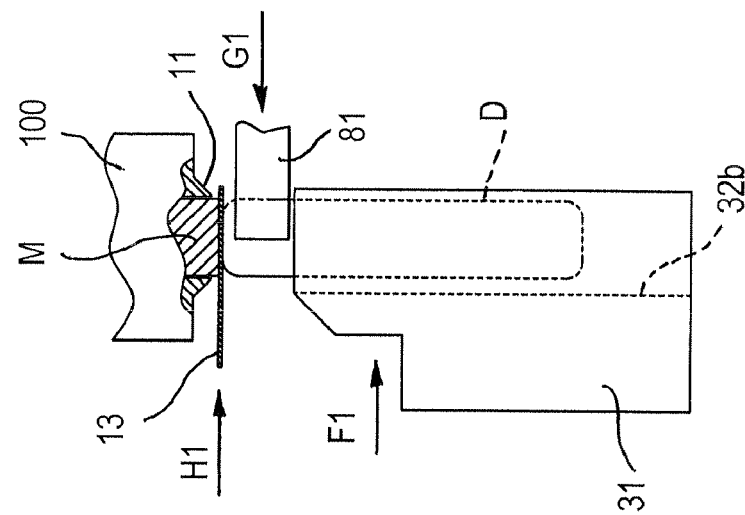

The abutment element 81 is driven with alternating rectilinear movement by means of driving means 85 comprising one or more linear actuators 82, for example of pneumatic or hydraulic type. In particular, the abutment element 81 moves along a rectilinear trajectory that is substantially tangential to the circular path along which the handling means 31 is movable. FIGS. 62 to 64 schematically shown successive operating phases of the apparatus in FIG. 61.

In an initial phase, shown in FIG. 62, the knife 13, by passing below the dispensing outlet 11 of the dispensing device 100, separates a dose D from the plastics extruded body M exiting from the device. As shown by the arrow F1, handling means 31 approaches the dose D to remove the dose D from the dispensing device 100 and transfer the dose D to a corresponding transfer chamber 50. Simultaneously, the abutment element 80 approaches the dose D from the opposite side in relation to the part from which the handling means 31 comes, as shown by the arrow G1. The upper end of the dose D rests on the concave portion 81*b* of the abutment element 80.

In this way, the abutment element 80 acts as an abutment in relation to the knife 13 when the dose D is separated from the plastics extruded body M, which ensures that the cut of the dose D is performed correctly, avoiding lacerations or stretching of the plastics extruded body M. Furthermore, the abutment element 80 limits the shift of the dose D and prevents the latter from moving away from the handling means 31. If the abutment element 80 is not present, the dose D, owing to the great viscosity thereof, could adhere to the knife 13 and be dragged by the latter far from the handling means 31. In fact, the knife 13 rotates in a direction discordant with the transfer carousel and, as shown by the arrow H1, it tends to drag the dose D away from the handling means 31 that is arriving under the dispensing device 100.

When the handling means 31 contacts the dose D, as shown in FIG. 63, the concave surface 32*b* of the handling means 31 exerts on the dose D a thrust in the direction of the arrow F2, i.e. transversely to the outlet direction of the dose D from the extruding device 100. The dose D is so removed by the handling means 31 and is moved away from the dispensing device 100. In this phase, as shown by the arrow G2, the abutment element 81 starts to draw back in relation to the position shown in FIG. 61, but still keeping in contact with the dose D. The abutment element 81 thus prevents the dose D, which was impacted by the handling means 31, from significantly moving away from the handling means 31 due to the thrust that the latter has exerted on the dose D. If this occurs, the dose D could become positioned in an incorrect manner in relation to the handling means 31 and, in the worst cases, the handling means 31 could not be able to transfer the dose D to the transfer chambers 50.

At the same time, the dose D descends through gravity along the concave surface 32*b* of the transfer means 31 until the dose D disengages from the abutment element 81. The dose D continues to move together with the handling means 31, which conveys the dose D to the corresponding transfer chamber 50, as shown by the arrow F3 in FIG. 64. The abutment element 81 is moved by the actuating means 85 in such a way as to move away from the extruding device 100, as shown by the arrow G3.

When the abutment element 81 reaches the end-of-stroke position thereof shown in FIG. 64, the moving means 85 again moves the abutment element 81 to the dispensing device 100, from which a new dose is flowing. The cycle disclosed above is thus repeated, the new dose being removed by a moving means that is not shown.

The abutment element 81 is interposed between the moving means 31 and the knife 13. In particular, the bounding element 81 is arranged immediately below the knife 13, in such a way as to be able to interact with the dose D as soon as the latter starts to be cut by the knife 13 and to continue to interact with the dose D when the latter, after being cut, starts to descend to the corresponding transfer means 31.

The abutment element 80 furthermore has a height H, measured along the outlet direction of the dose D, that is rather limited. Due to this, the abutment element 80 interacts only with an upper portion of the dose D, which is nevertheless sufficient to ensure that the dose D is correctly cut and delivered to the transfer means 31.

The transfer means 31 extends below the abutment element 80 and can pass below the abutment element 80 without engaging with the latter.

The abutment means 181 disclosed above have a particularly simple structure inasmuch as it comprises a single abutment element 80 that can be moved by means of a simple linear actuator. Furthermore, the abutment element 80 has rather reduced mass and can move fast without generating excessive forces of inertia.

Figure 93:
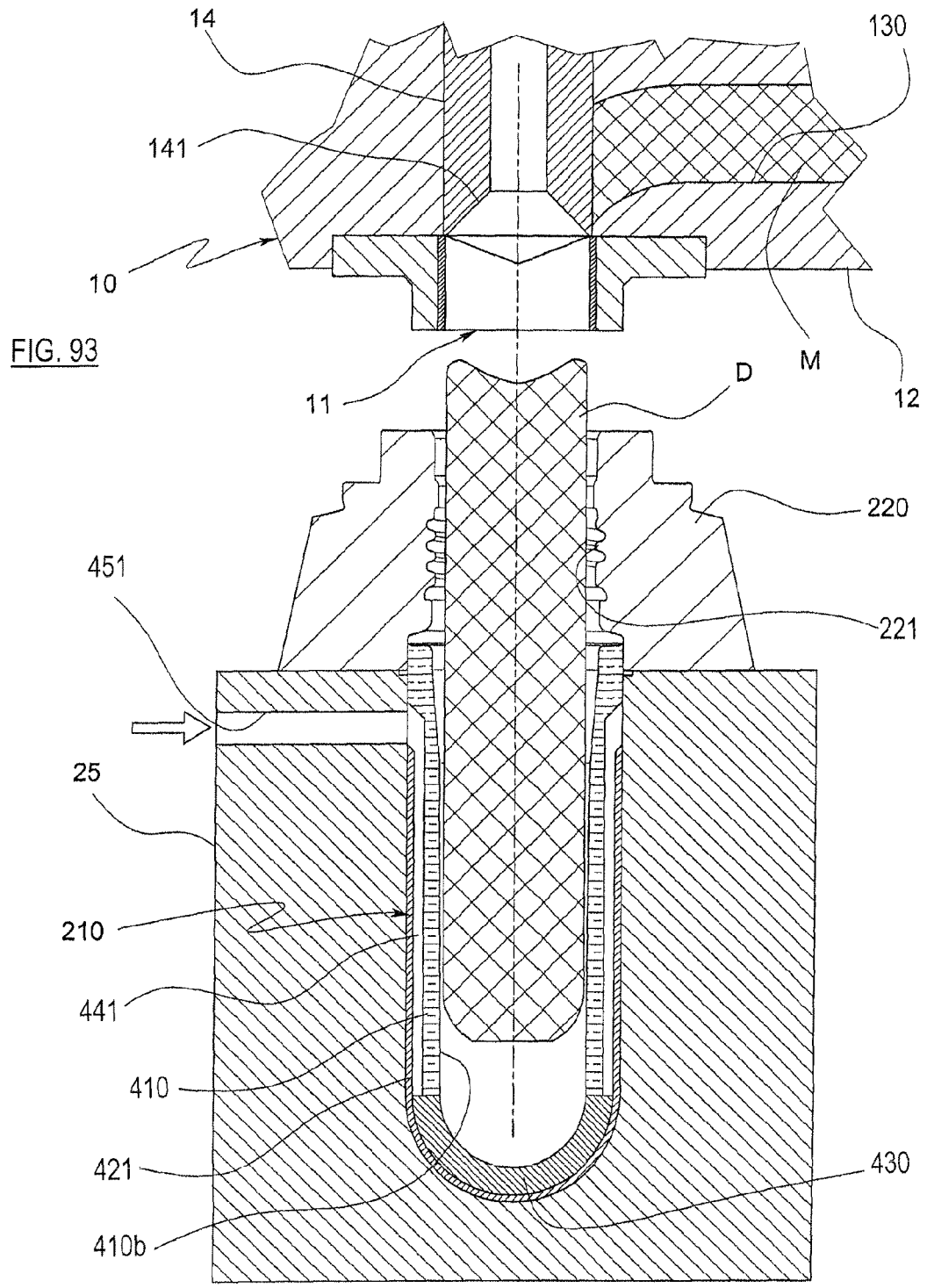
FIG. 93 shows a version of the forming means in FIG. 65.

In FIG. 93 forming means is shown that comprises a die cavity including a tubular-shaped wall 410, the internal surface 410*b* of which completely or partially defines the die cavity.

The tubular wall 410 can be porous in such a way as to permit the passage of gas through it. Gas dispensing means is provided with which pressurised gas is sent through the porous wall 410 from the outside to the inside in such a way that the gas exits at the contact surface.

According to the embodiment shown in FIG. 93, the die is formed of a concave lower part 210 and of an upper part 220 with a through cavity. The lower part 210 has a substantially cylindrical smooth and concave surface 410b, that gives the shape to the external surface of the hollow body of the preform, whilst the upper part 220 has a concave surface 221 that gives the shape to the external surface of the neck. As the latter is provided with radial projections, said upper part 220 is divided into at least two half parts (in the case shown, two half parts) suitable for being moved away transversely to one another to free the preform. The two concave surfaces 410b and 221 form the die cavity.

The lower part 210 of the die comprises an internal tubular-shaped wall that defines said porous tubular wall 410, the internal surface 410b of which defines the tubular portion of the lower part of the die cavity.

The lower end of the cavity is on the other hand closed by a non-porous concave lower plate 430.

The lower part 210 of the die comprises a second tubular wall 421 that is outside and coaxial with the tubular porous wall 410, the upper and lower ends of the second tubular wall 421 being joined to the tubular porous wall 410. Between the two walls 410 and 421 a chamber 441 is defined that surrounds the porous tubular wall 410 by 360° C., and extends along the entire length or almost the entire length thereof, which chamber is connected with means (not shown in the Figures) suitable for sending pressurised gas through an inlet 451 into the chamber 441 and from there through the porous wall 410 to inside the tubular wall 410.

The pressurised gas is sent to the chamber 441, whereas along the internal surface 410b of the wall 410 the polymeric dose D descends. The gas passes through the porous wall 410 to form a gap filled with gas that becomes interposed between the internal surface 410b and the external surface of the polymeric dose D. This gap or layer of gas has the effect of preventing contact between the polymeric dose D and the wall 410 or at least to reduce the time and the extent of the contact zones, thus reducing the macroscopic adhesion effect between the polymeric dose body D and the wall 410, promoting effective downward flow of the polymeric dose D.

Excellent results were obtained by making a wall 410 with a porous material the pores of which have a diameter comprised between $5 \times 10^{-3}$ mm and $20 \times 10^{-3}$ mm and sending to the chamber 441 gas at pressure between 0.5-1 bar.

Means can furthermore be provided (not shown in the Figures) suitable for thermally conditioning the gas in such a way as to lower the temperature thereof. In such a case, the gap filled with gas formed between the internal surface 410b and the external surface of the polymeric dose D also produces an effective heat-exchange with the mass of the wall 410 and with the external surface of the polymeric dose D, which heat-exchange can be used to favour the flow of the polymeric dose. A lowering of the surface temperature of the polymeric dose increases the viscosity thereof and thus reduces adhesion to the wall 410. This beneficial effect is furthermore increased by lowering the temperature of the wall 410.

This temperature is adjusted in such a way as to prevent excessive, albeit localised, cooling of the polymeric dose D such as to produce microcrystalisation of the material or at least of the germs of irregularity in the material.

Alternatively, the gas can be sent inside the tubular wall 410 with a flow that is directed in a tangential manner to the contact surface 410b in such a way that a gap is developed that touches the surface.

Figures 94, 95:
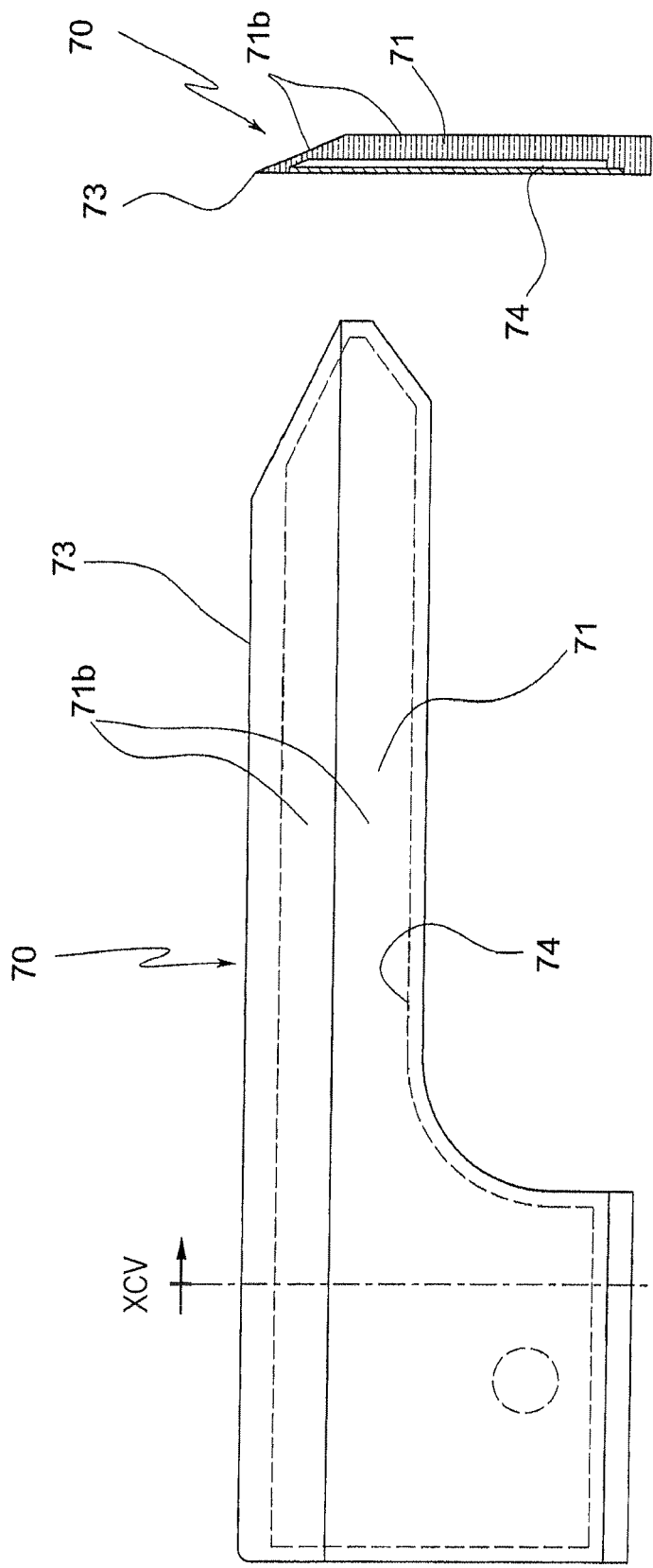
FIG. 94 is a plan view of cutting means of a dose of plastics exiting from a delivery means.
FIG. 95 is a section along the plane XCV-XCV of FIG. 94.

FIGS. 94 and 95 show cutting means suitable for cutting a continuous plastics extruded body M exiting from a plastics dispensing outlet 11 forming doses D.

The cutting means 70 comprises a substantially flat wall 71 on which a cutting profile 73 is obtained. The wall 71 has a smooth surface 71b, which comes into contact with the plastics during cutting of the plastics extruded body M. The cutting means 70 comprises dispensing means suitable for forming a gap or layer of gas along the contact surface 71b in such a way as to completely or partially reduce the adhesion effect between the continuous plastics extruded body M and the surface 71b.

In particular, the wall 71 is porous in such a way as to enable the passage of fluid through it, and means is furthermore provided suitable for sending pressurised gas into a chamber 74 and from there through the porous wall 71, in such a way that the gas exits at the contact surface 71b.

Excellent results were obtained with a wall 71 formed with a porous material having the features disclosed above. Means (not shown in the Figures) can be provided that is suitable for thermally conditioning the gas in such a way as to lower the temperature thereof, with the features and results disclosed above.

Alternatively, the gas can be sent to the contact surface 71b with a flow that is directed in a tangential manner to the surface in such a way that a gap is developed that comes into contact with the surface.

Although the invention, in cases in which it relates to the transfer of plastics doses to the mould cavities, is disclosed in the description and the Figures to transfer doses to the dies, it is understood that the invention may also refer to cases in which these doses are to be arranged on the upper end of a mould punch, which in this case will be arranged below the corresponding die, turned upwards and will give rise, directly or indirectly, to a more or less pronounced cavity that is able to receive the dose.

It is understood that the features disclosed in the description of the Figures with reference to a specific embodiment can also be claimed for any other disclosed embodiments or can also be claimed alone.

The invention claimed is:
1. Apparatus comprising:
 an extruding device for extruding doses of plastics;
 a forming device for compression moulding said doses;
 a plurality of containing elements moveable along a first looped path, each of said containing elements being suitable for containing a dose and transferring said dose to said forming device, each of said containing elements having a substantially tubular shape with upper and lower openings; and
 a plurality of concave elements moveable along a second looped path, each of said concave elements having a concave internal surface having a cross-section that is open on a side and at the bottom, each concave element being arranged with the open side of said concave internal surface facing forward in relation to the movement direction along said second looped path, wherein, during use, a dose severed from said extruding device enters the concave internal surface of a concave element and then leaves the concave element entering a containing element below.
2. Apparatus according to claim 1, wherein said plurality of containing elements is supported by a support rotatable in synchronized manner with said forming device, said plurality of concave elements being supported by a further support which is rotatable coaxially with said support or is rotatable parallelly with said support around a further rotation axis that is encompassed by said first looped path.

3. Apparatus according to claim 1, wherein said plurality of containing elements is supported by a support rotatable around a rotation axis that is encompassed by said second looped path.

4. Apparatus according to claim 1, wherein said plurality of concave elements is supported by a further support rotatable around a further rotation axis that is encompassed by said first looped path.

5. Apparatus according to claim 1, wherein said forming device is moveable along a third looped path.

6. Apparatus according to claim 5, wherein said third looped path is circular.

7. Apparatus according to claim 1, wherein said forming device is mounted on a continuously rotatable carousel.

8. Apparatus according to claim 1, wherein said forming device comprises a die device and a punch device interacting together to form a preform of a container from said dose.

9. Apparatus according to claim 1, wherein each containing element is provided at the bottom with a closing device suitable for assuming a closing position when the containing element receives the dose, and an opening position when the containing element dispenses the dose to the forming device.

10. Apparatus according to claim 1, wherein each containing element is provided at the top with a closing device suitable for assuming a closing position when the containing element dispenses the dose to the forming device, and an opening position when the containing element receives the dose.

11. Apparatus according to claim 5, comprising a plurality of arms, each arm being associated with a corresponding containing element for moving said containing element along said first looped path so that said first looped path has a portion substantially coinciding with a further portion of said third looped path.

12. Apparatus according to claim 11, wherein said arms are supported by a rotatable support.

13. Apparatus according to claim 12, wherein each arm is movable with two degrees of freedom in relation to said support.

14. Apparatus according to claim 12, wherein each arm is moveable with only one degree of freedom in relation to said support.

15. Apparatus according to claim 11, wherein each arm comprises a first arm pivotally connected to a second arm, said containing element being associated with said second arm.

16. Apparatus according to claim 15, wherein said first arm is further pivotally connected to a rotatable support.

17. Apparatus according to claim 15, comprising a first actuating device acting on said first arm and a second actuating device acting on said second arm for moving said containing element along said first looped path.

18. Apparatus according to claim 17, wherein said first actuating device comprises a first cam arrangement and said second actuating device comprises a second cam arrangement.

19. Apparatus according to claim 15, comprising a further arm pivotally connected to said support and to said second arm so as to define an articulated quadrilateral for moving said containing element.

20. Apparatus according to claim 19, wherein said articulated quadrilateral is actuated by a single cam.

21. Apparatus according to claim 12, wherein each arm has an end associated with said support and a further end supporting said containing element.

22. Apparatus according to claim 21, wherein the arms of said plurality of arms are actuated by a single cam.

23. Apparatus according to claim 21, comprising a guide element that allows each arm of said plurality of arms to slide in relation to said support.

24. Apparatus according to claim 23, wherein said guide element comprises a sleeve inside which said arm is slidable, said sleeve being connected to said support.

25. Apparatus according to claim 21, wherein each arm is pivotally connected to said support.

26. Apparatus according to claim 11, wherein each containing element is fixed to respective ends of each arm.

27. Apparatus according to claim 1, wherein said second looped path is circular.

28. Apparatus according to claim 1, wherein said concave elements are mounted on a further carousel which is continuously rotatable.

29. Apparatus according to claim 28, wherein said concave elements are connected to a peripheral region of said further carousel.

30. Apparatus according to claim 1, wherein said concave elements have a substantially U-shaped cross-section.

31. Apparatus according to claim 1, wherein said extruding device is arranged in a fixed position.

32. Apparatus according to claim 1, wherein said plurality of concave elements and said forming device are arranged on opposite sides of said plurality of containing elements.

33. Apparatus according to claim 1, wherein said plurality of containing elements is moveable on a plane which is intermediate between a first plane on which said forming device is moveable and a second plane on which said plurality of concave elements is moveable.

34. Apparatus according to claim 33, wherein said first plane is arranged below said second plane.

35. Apparatus according to claim 1, wherein said first looped path has a part substantially coinciding with a further part of said second looped path.

36. Apparatus according to claim 1, wherein said extruding device is arranged above said plurality of concave elements.

37. Apparatus according to claim 1, wherein each said containing element is cyclically movable along the first looped path, whereby after one loop each containing element is structured to receive another dose from one of said concave elements.

* * * * *